F. M. CARROLL.
CASHIER'S REGISTERING MACHINE.
APPLICATION FILED JUNE 16, 1913.
1,230,861.
Patented June 26, 1917.
30 SHEETS—SHEET 12.
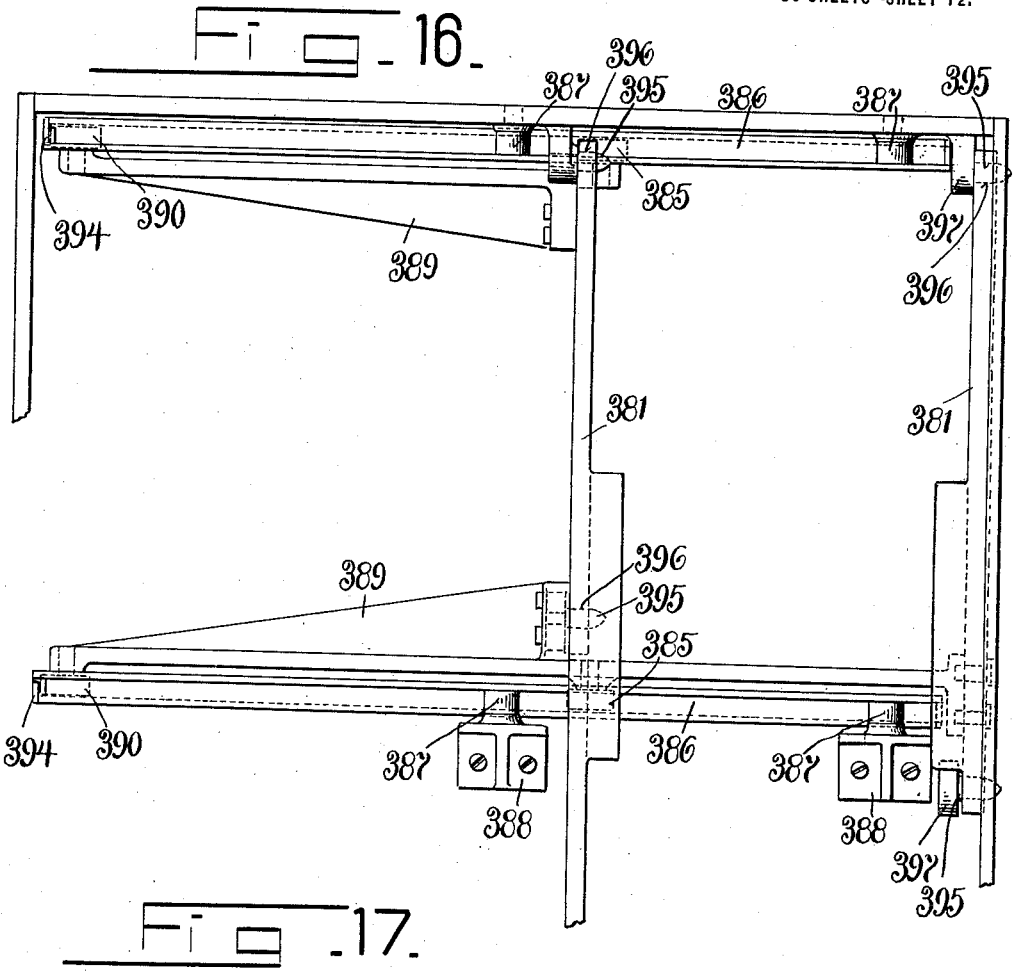
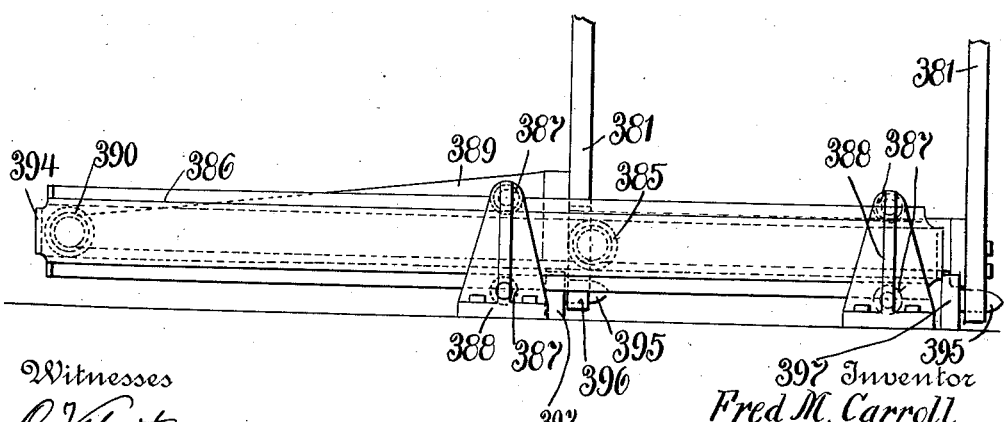

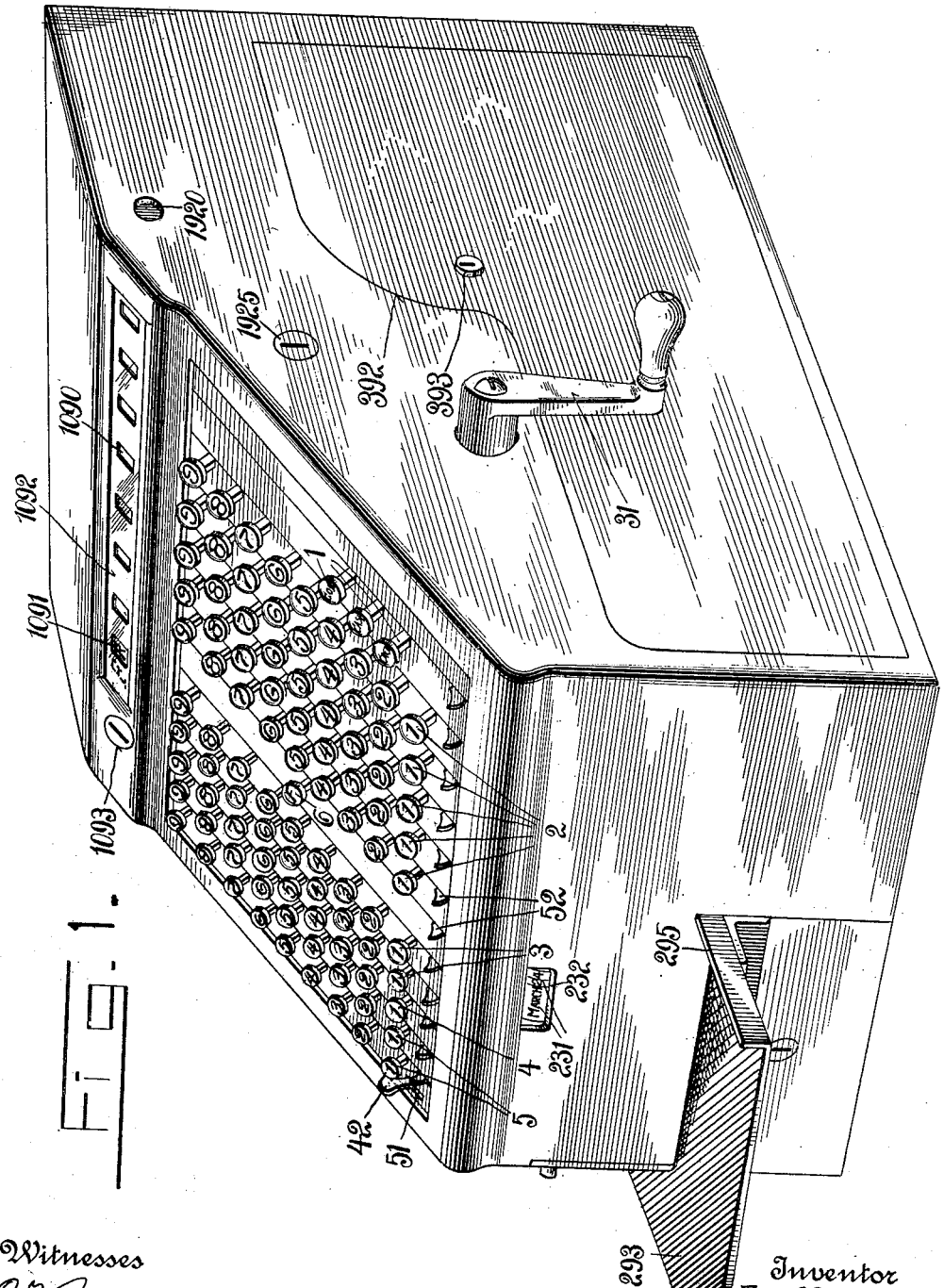

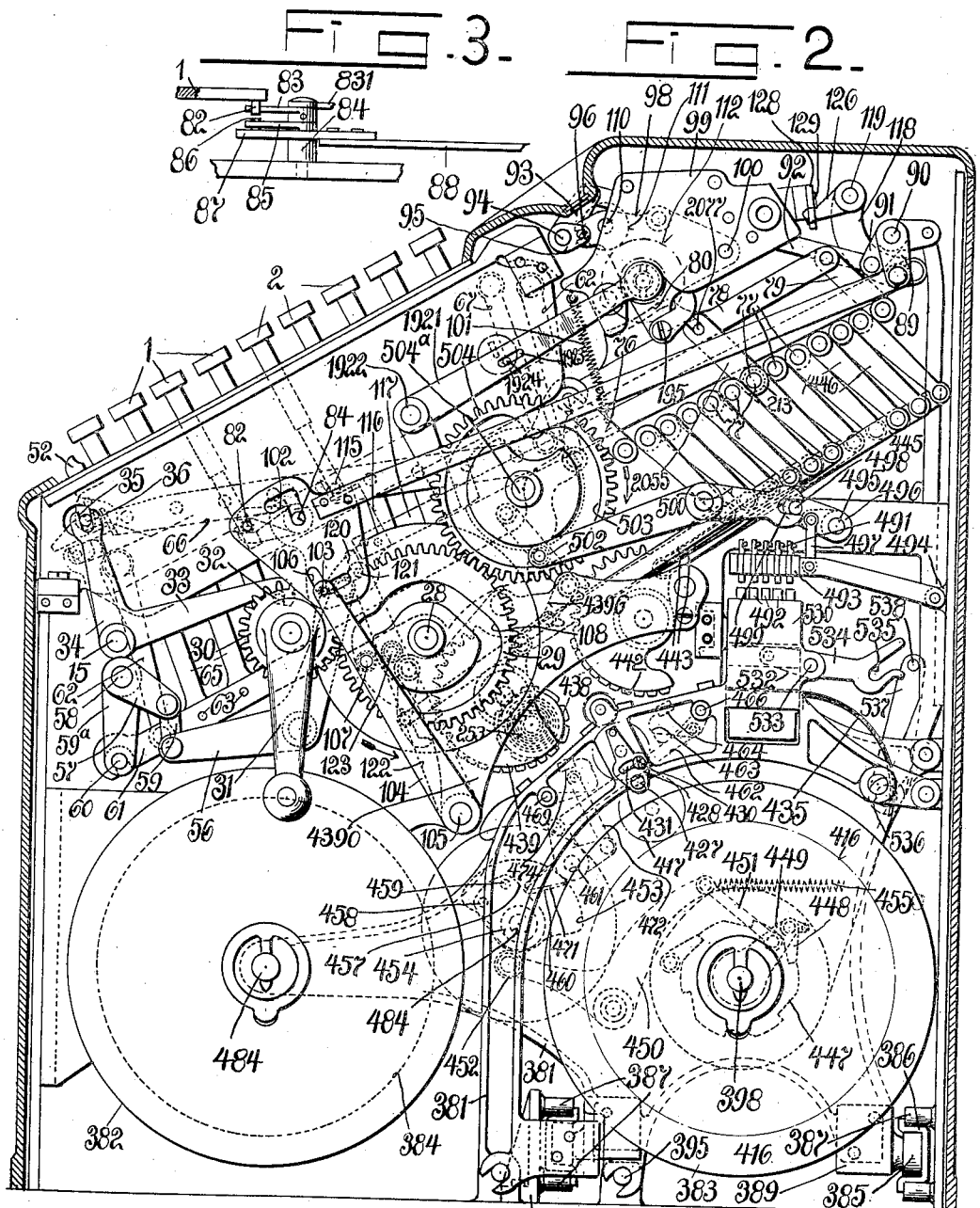

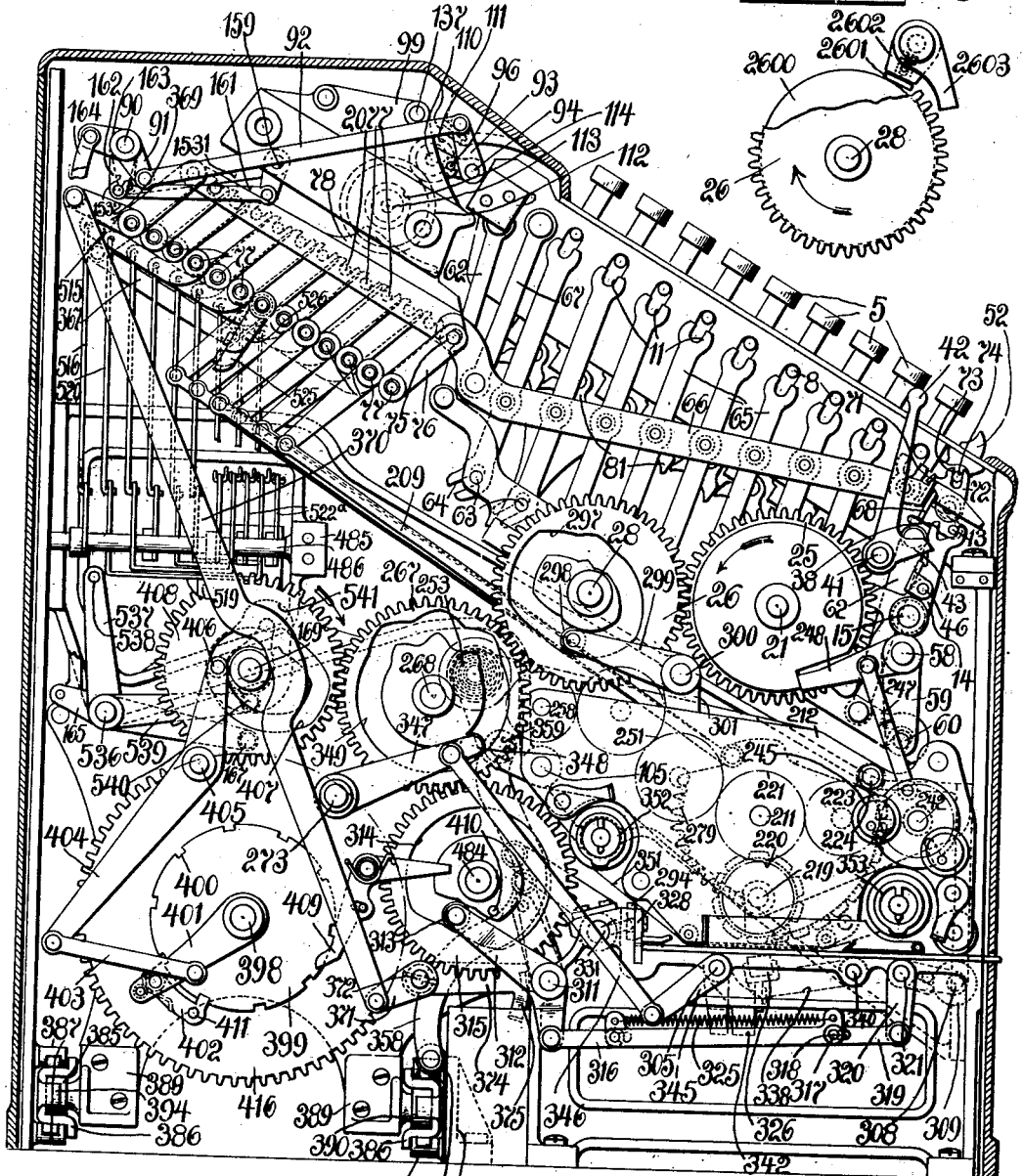

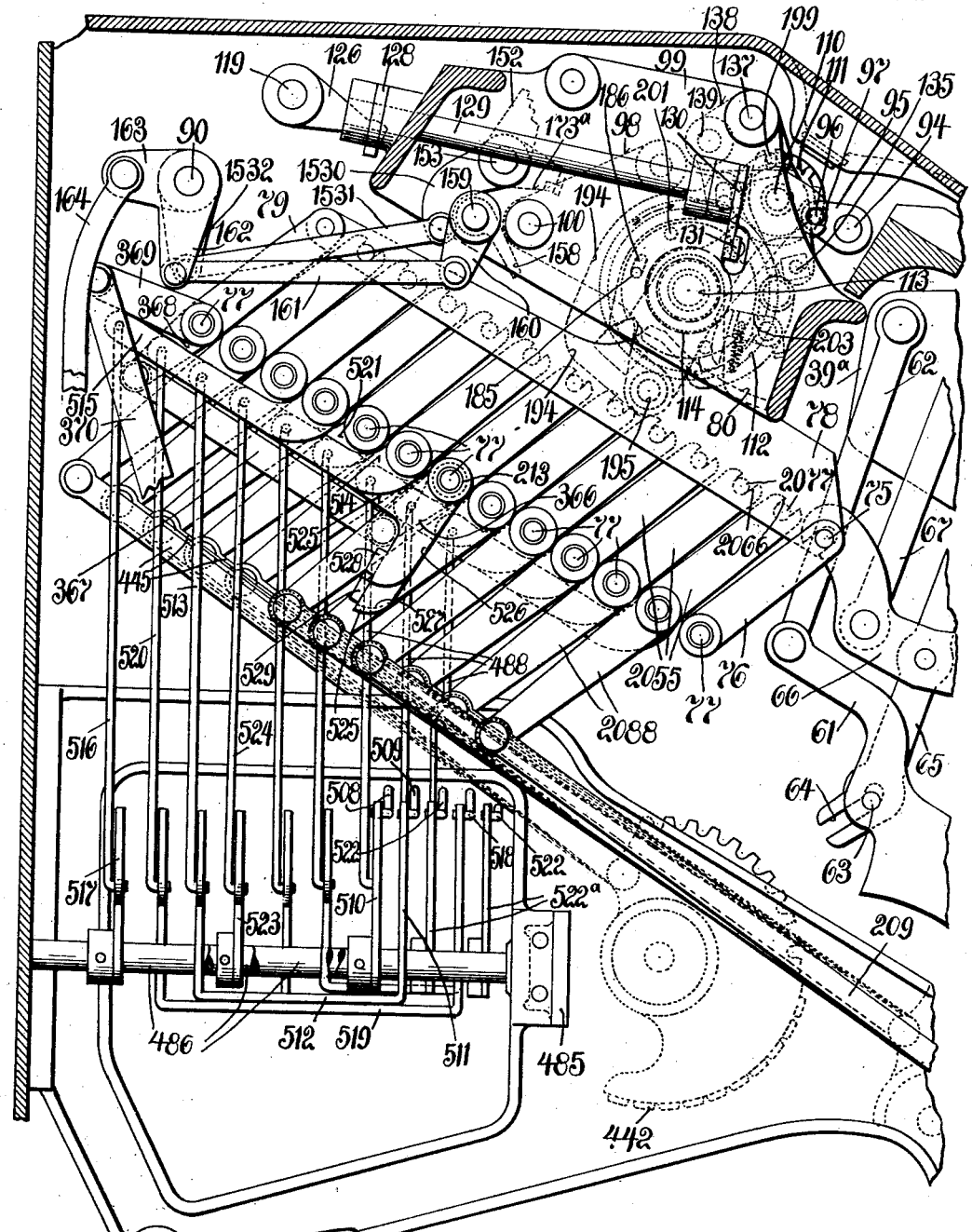

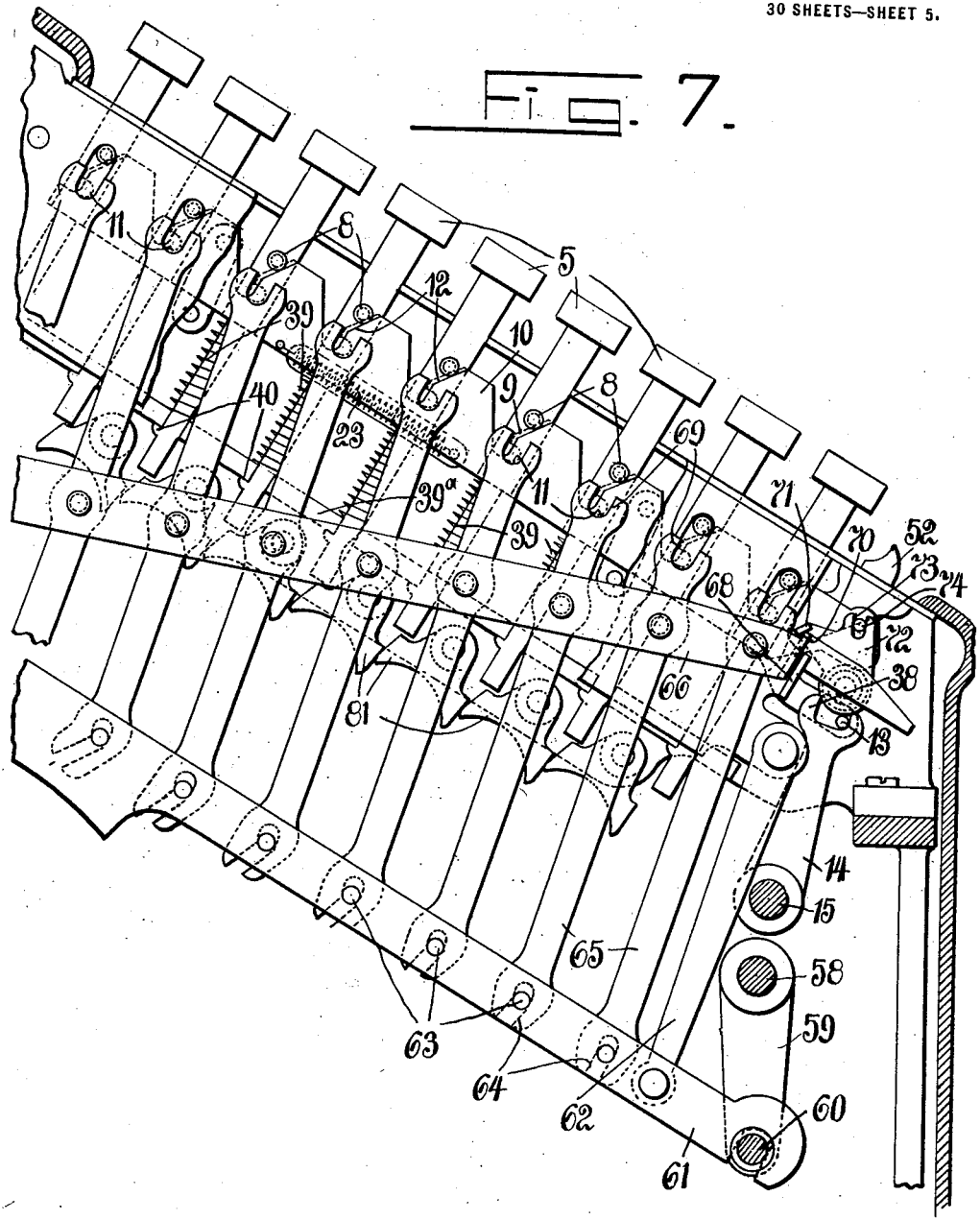

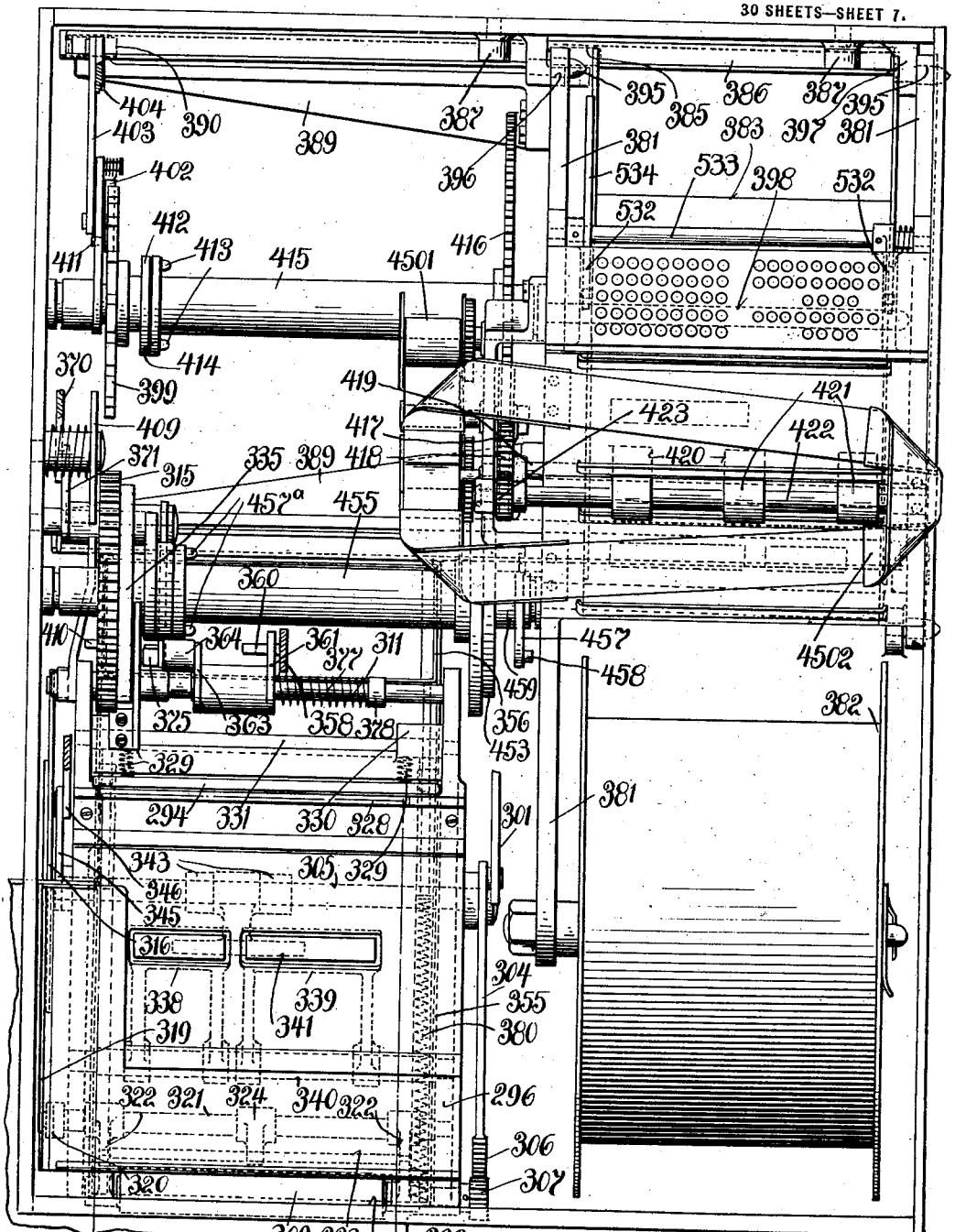

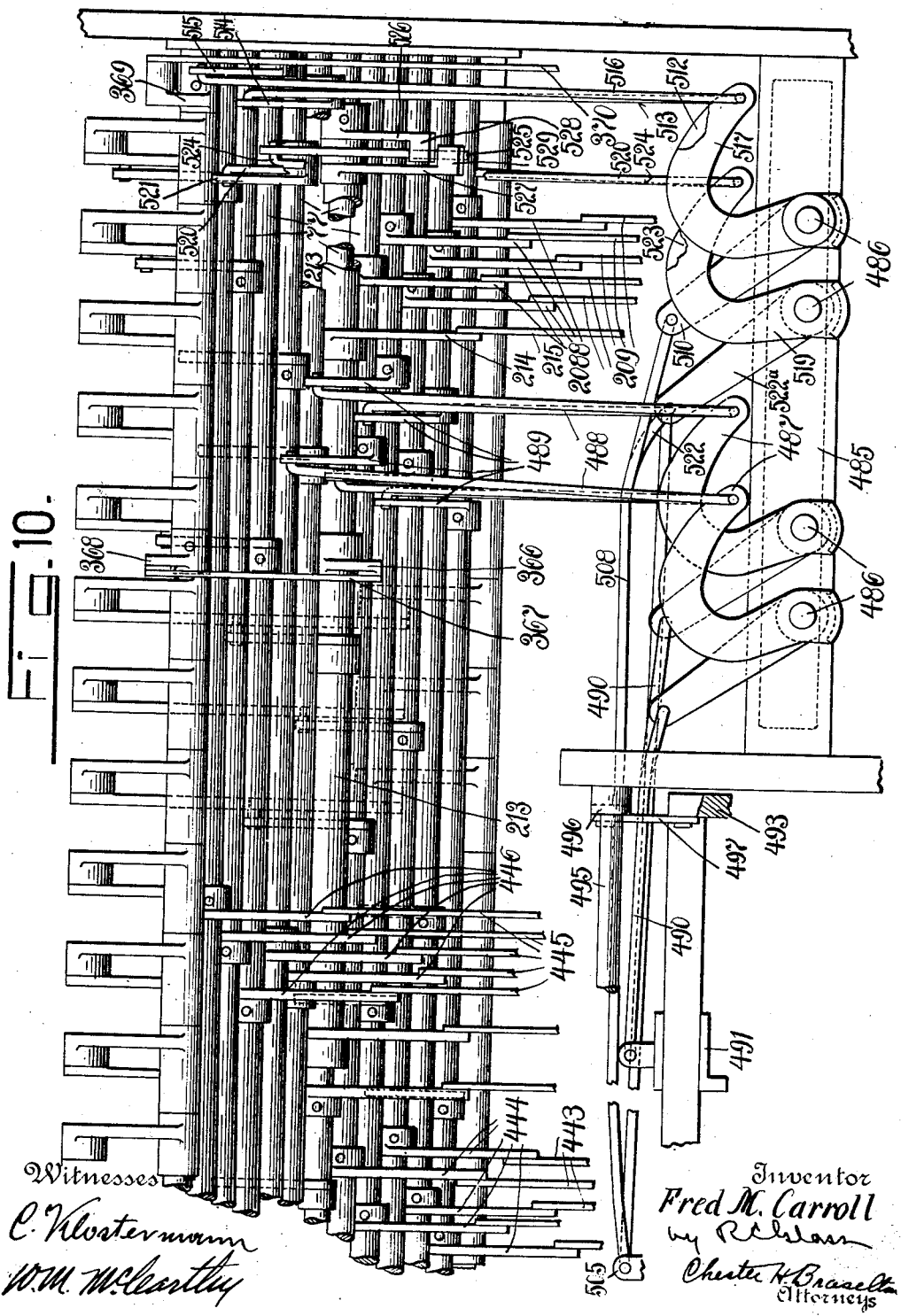

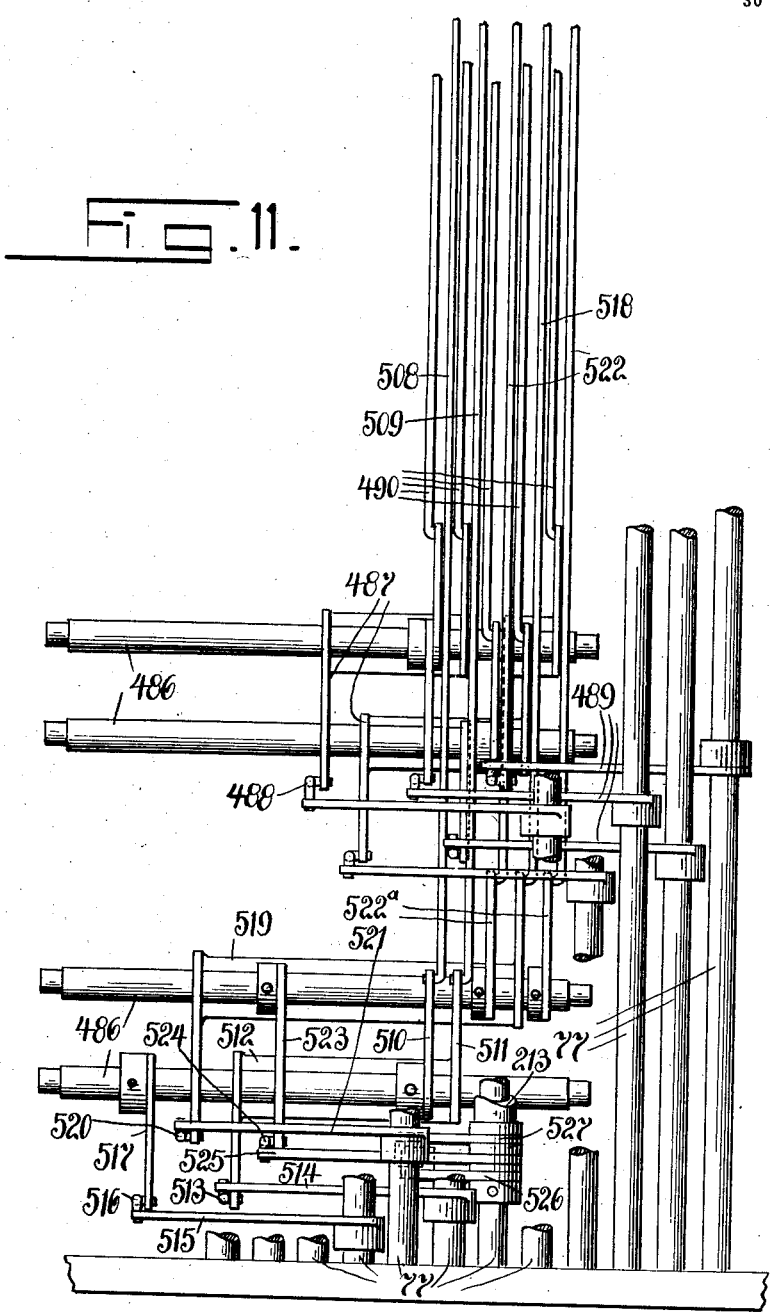

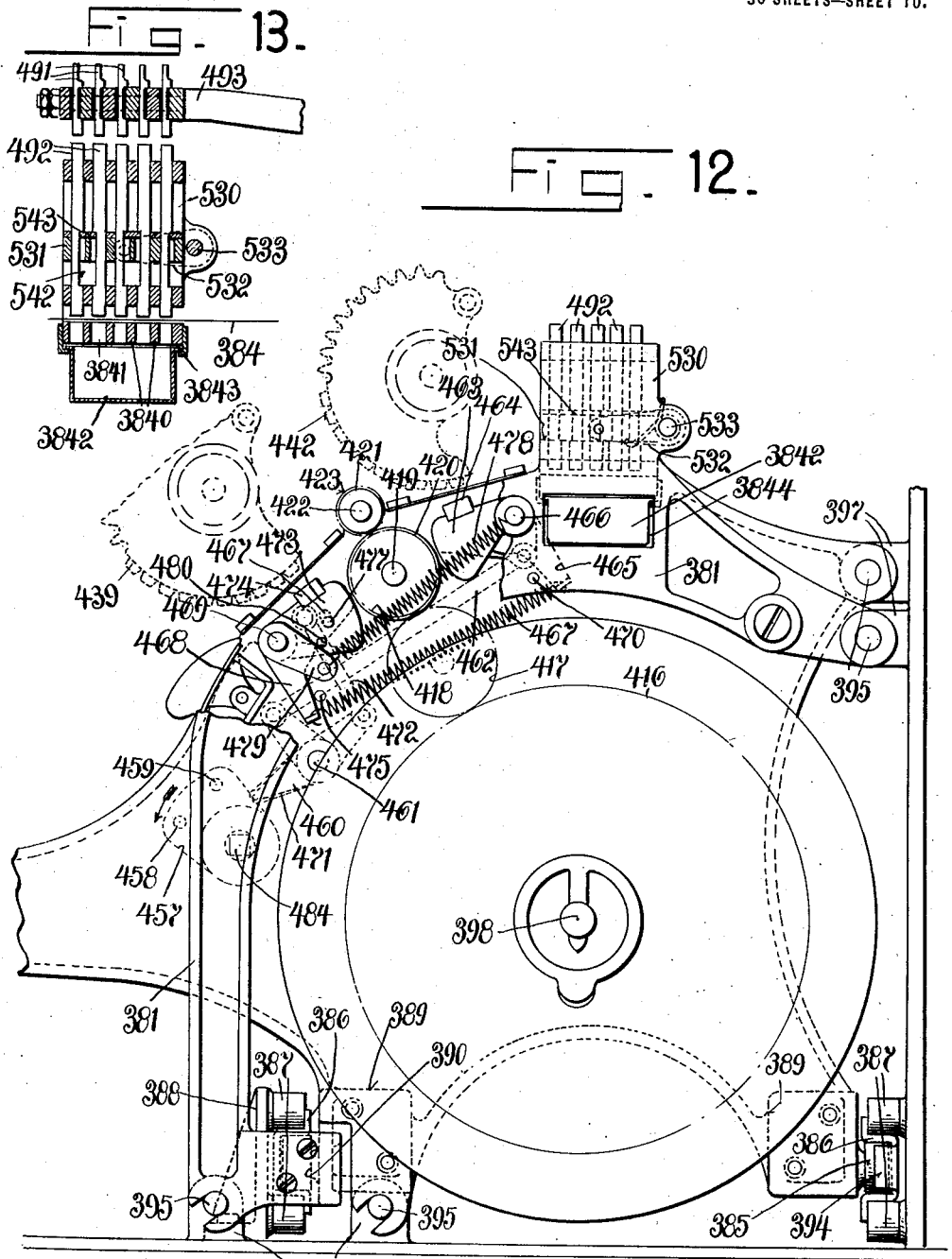

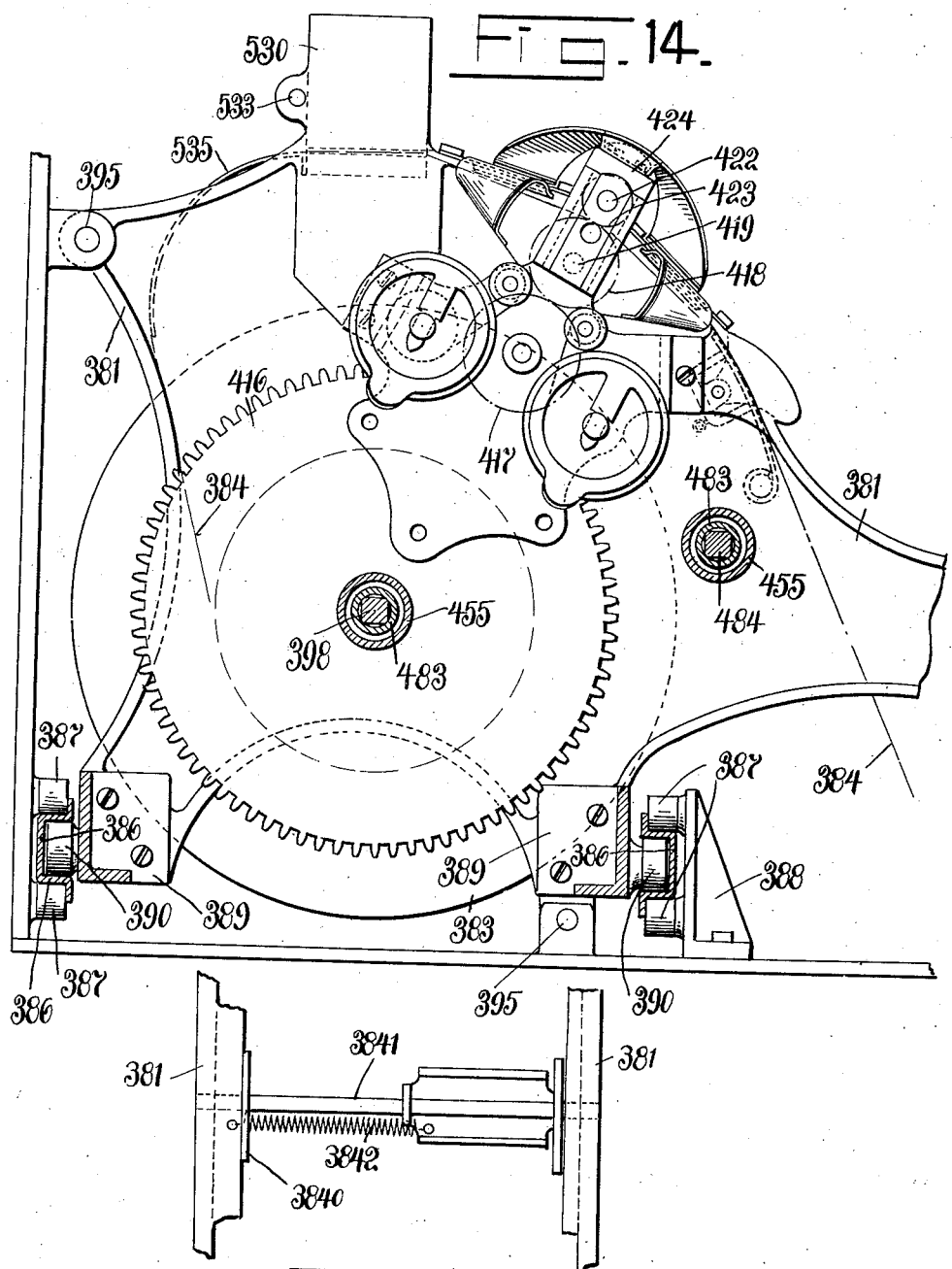

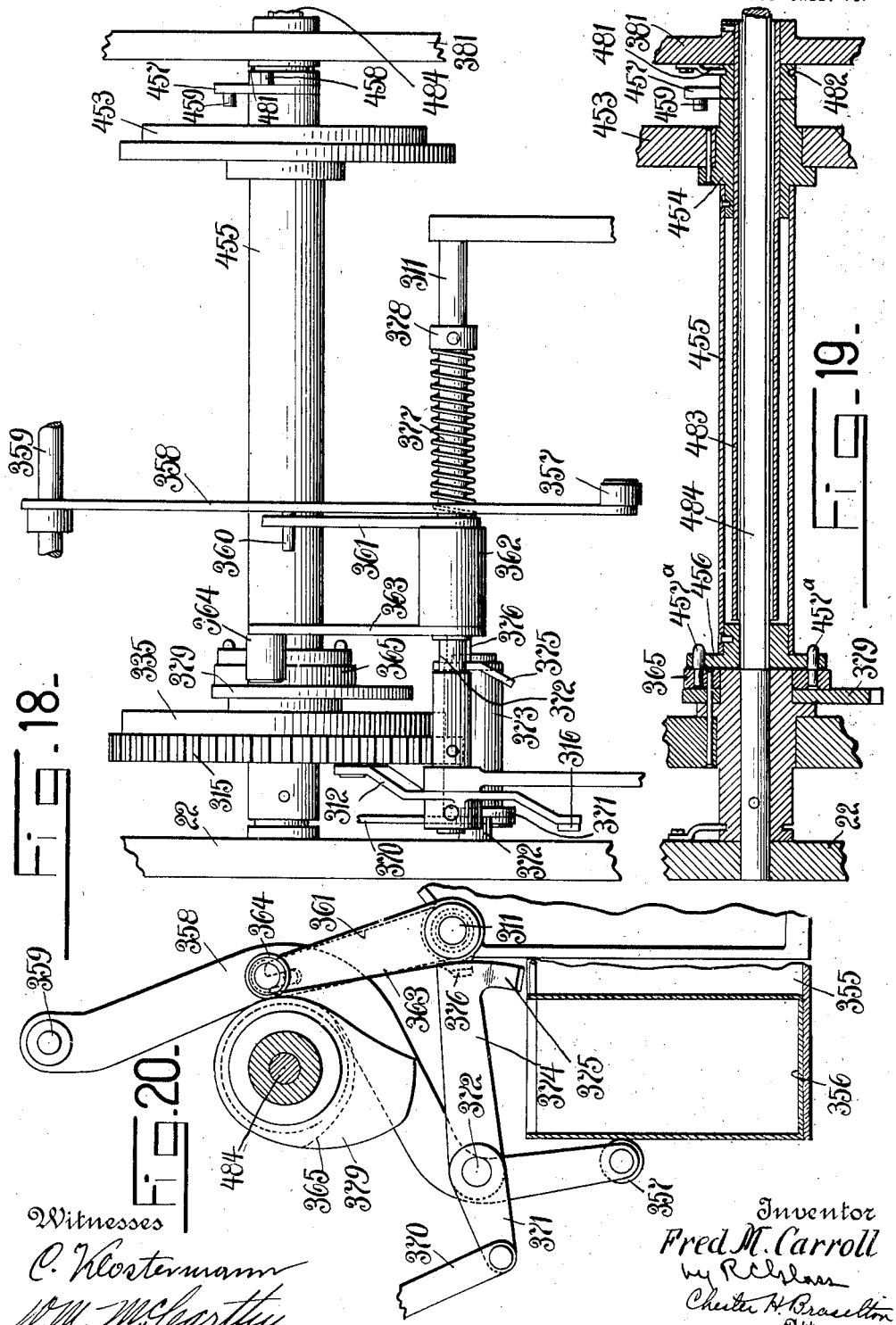

F. M. CARROLL.
CASHIER'S REGISTERING MACHINE.
APPLICATION FILED JUNE 16, 1913.
1,230,861.
Patented June 26, 1917.
30 SHEETS—SHEET 14.
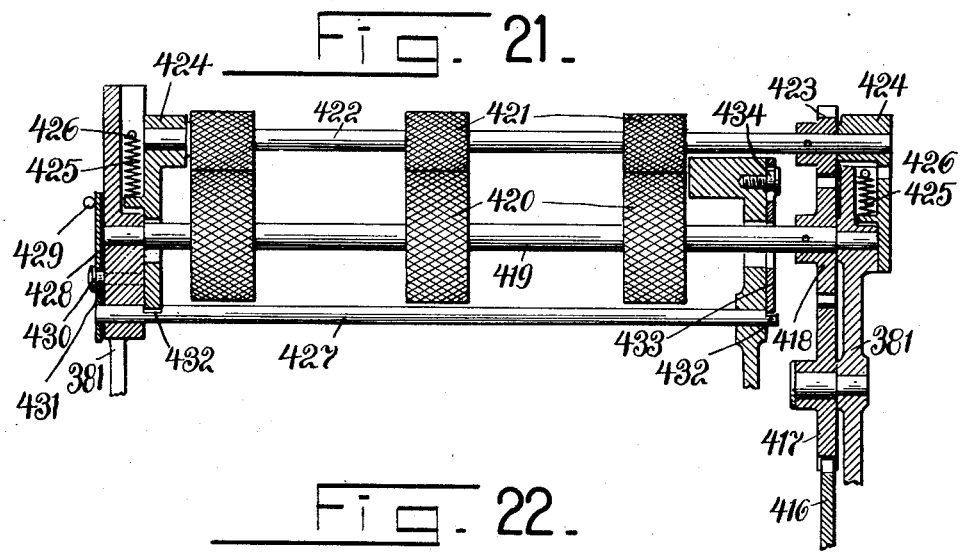
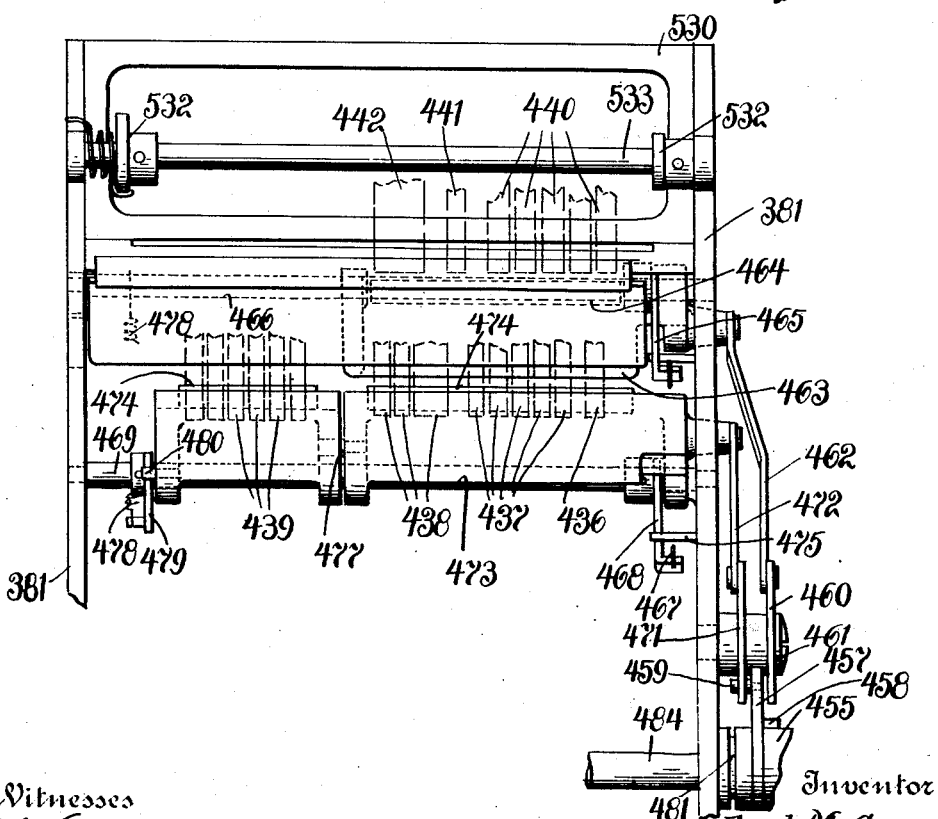

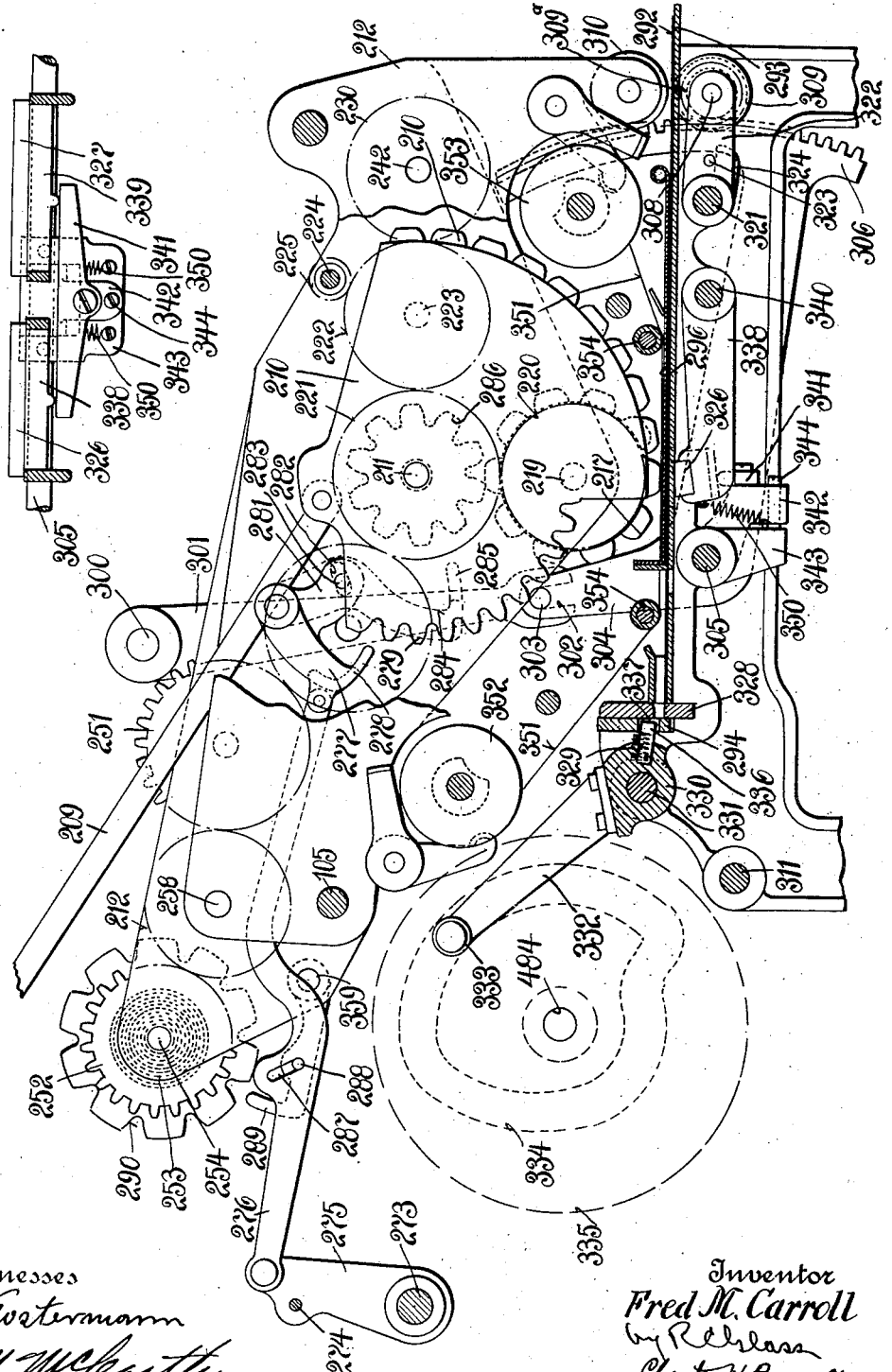

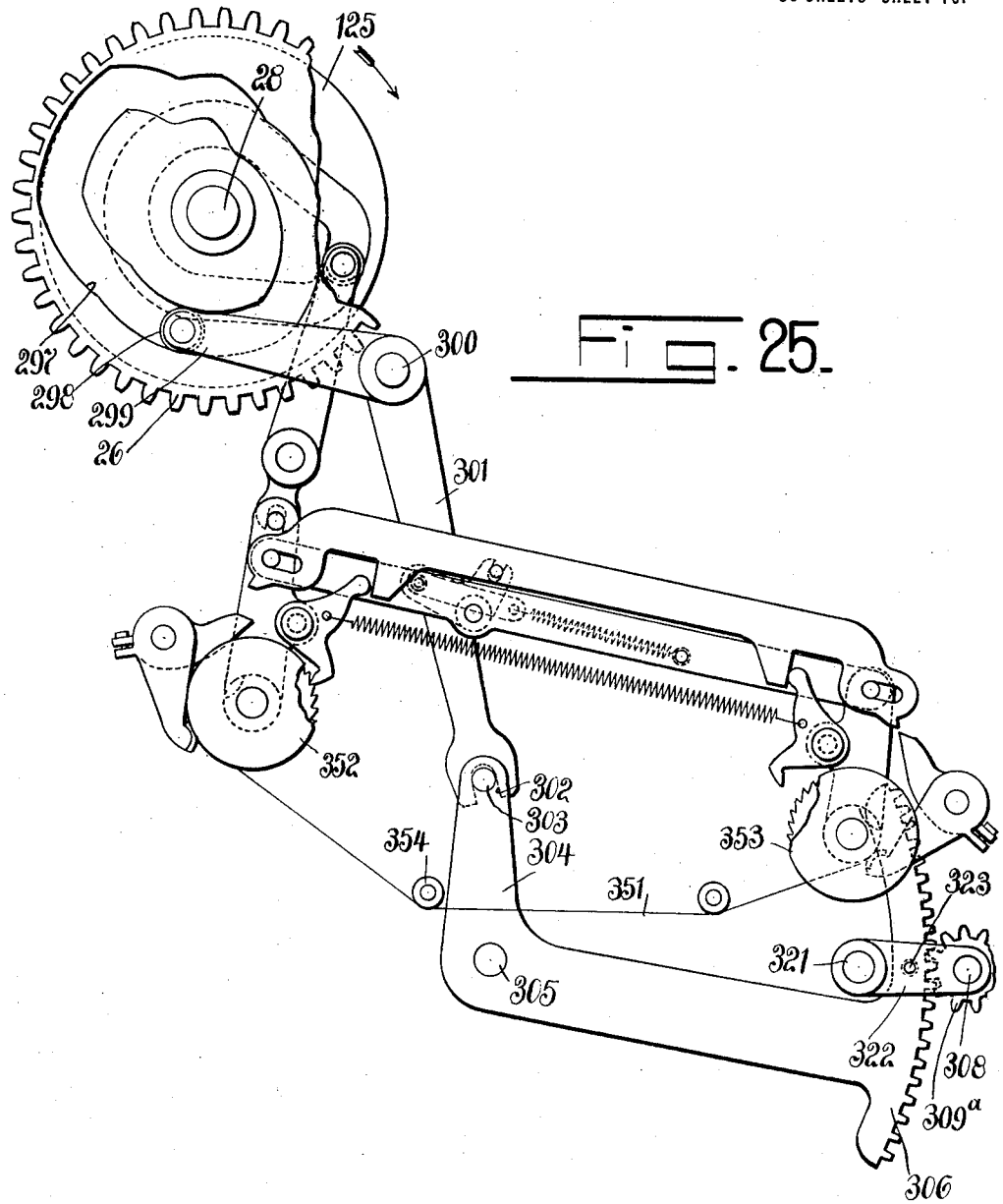

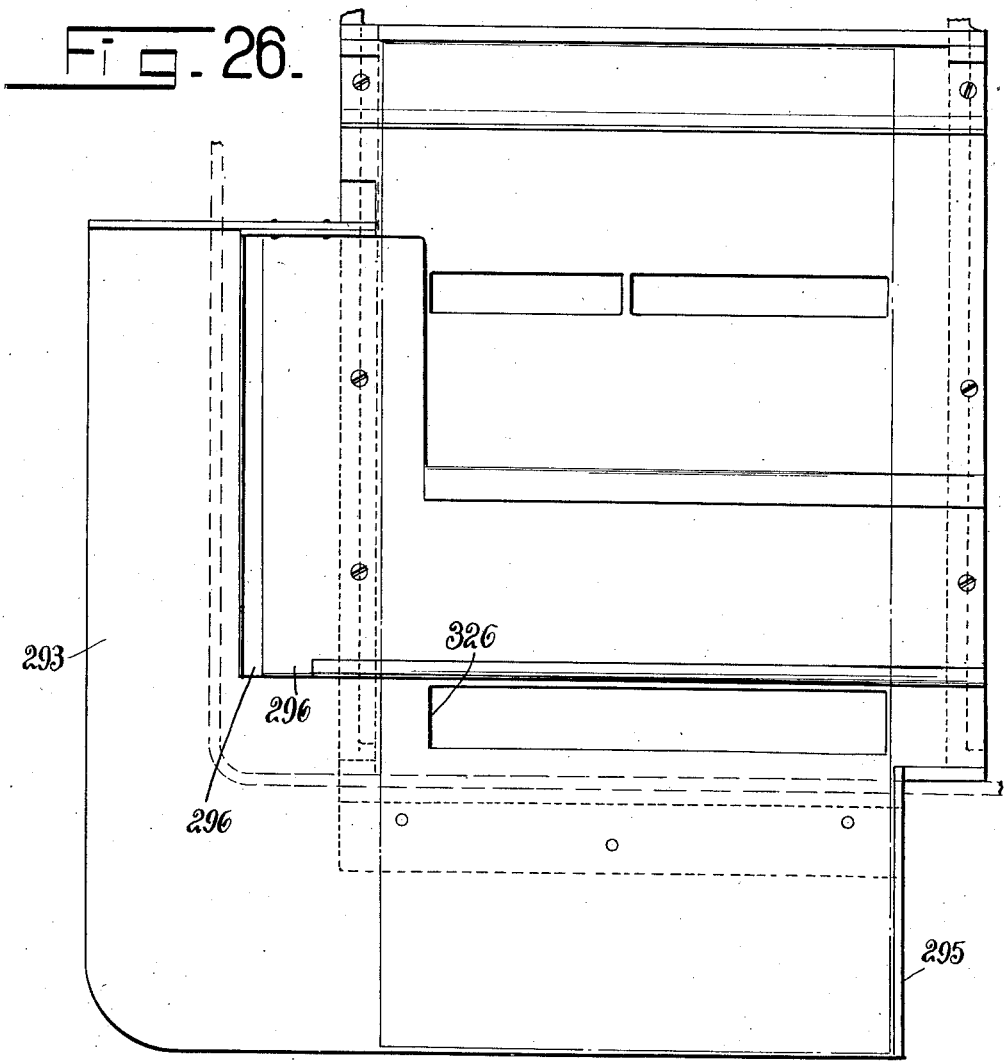
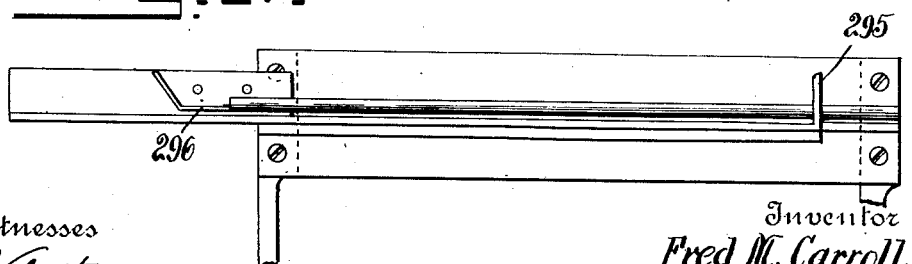

F. M. CARROLL.
CASHIER'S REGISTERING MACHINE.
APPLICATION FILED JUNE 16, 1913.
1,230,861.
Patented June 26, 1917.
30 SHEETS—SHEET 18.
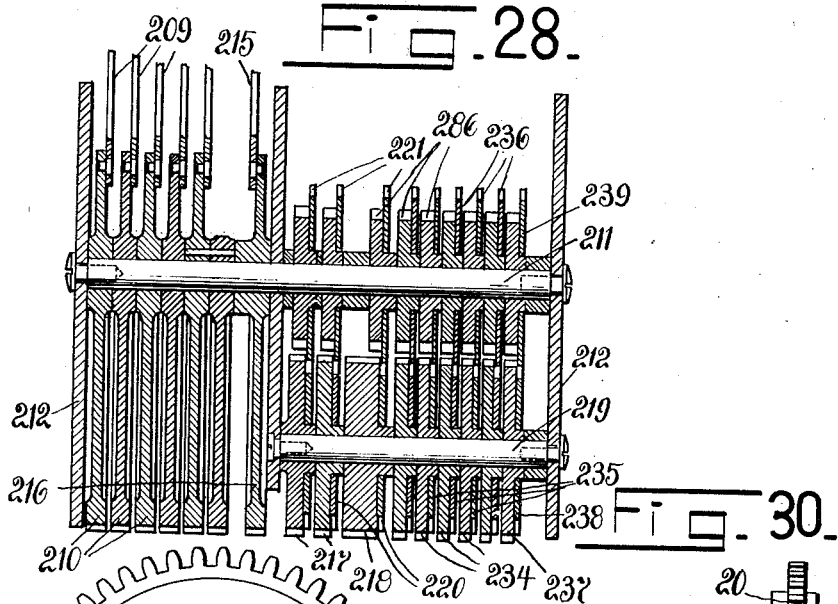
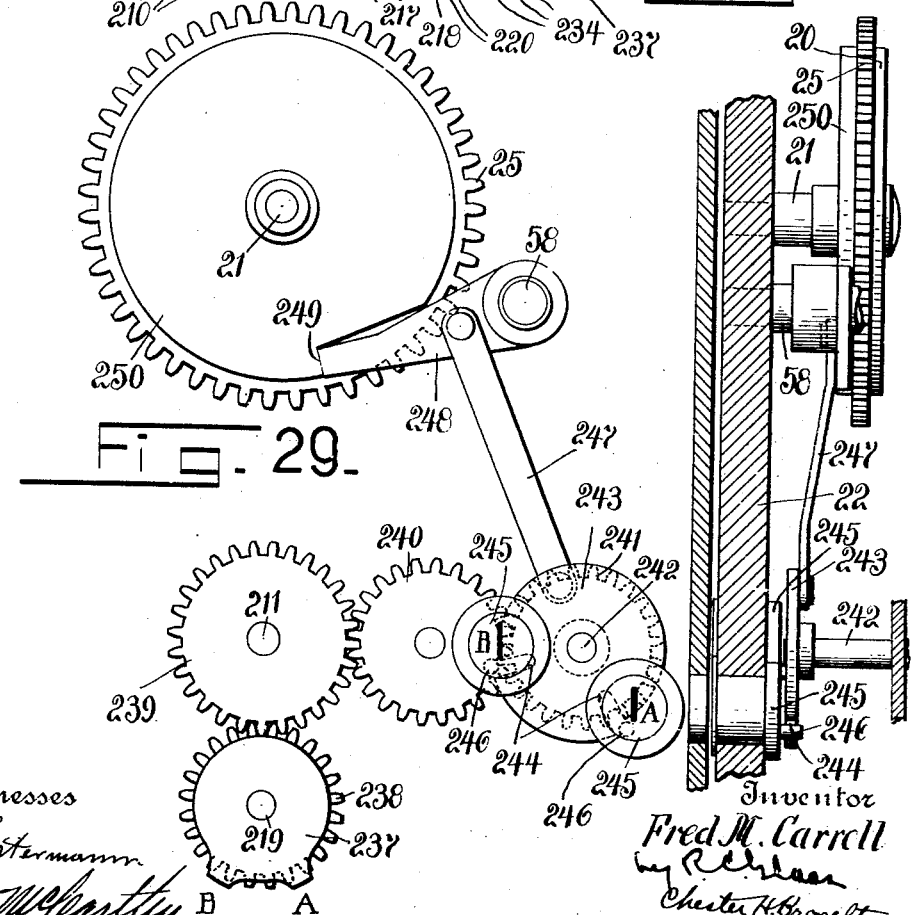

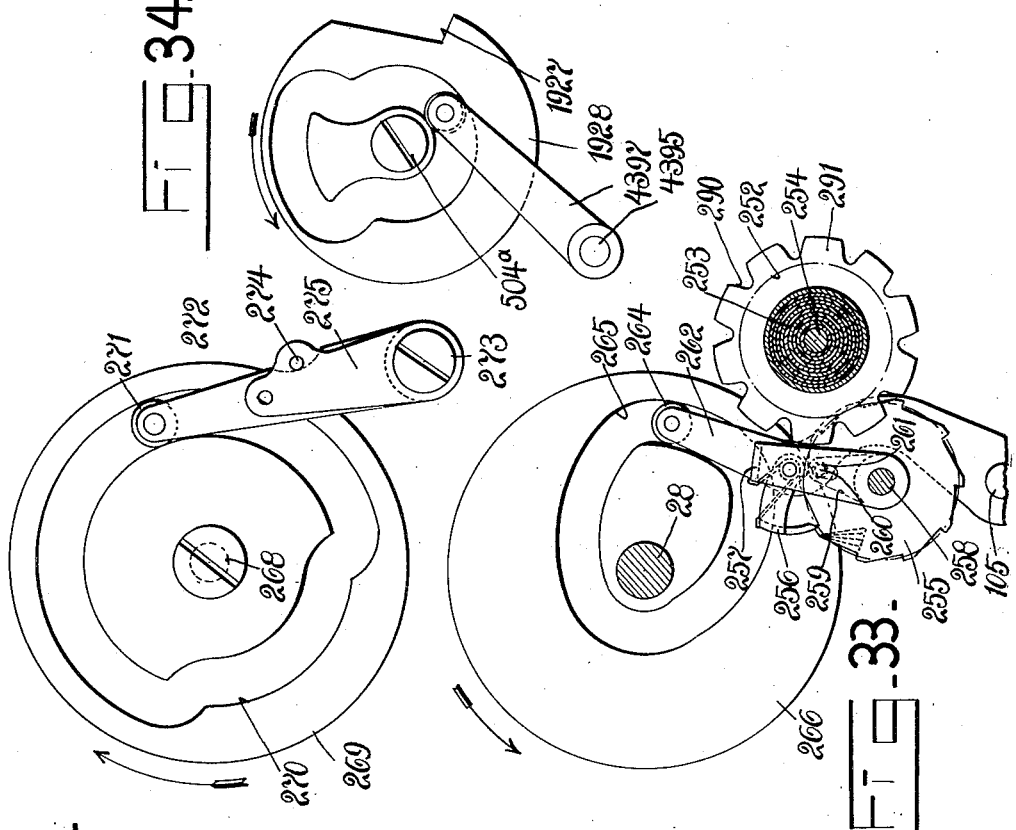

F. M. CARROLL
CASHIER'S REGISTERING MACHINE.
APPLICATION FILED JUNE 16, 1913.

1,230,861.

Patented June 26, 1917.
30 SHEETS—SHEET 20.

Witnesses
C. Klostermann
W. M. McCarthy

Inventor
Fred M. Carroll
by R. L. Shaw
Chester H. Braselton
Attorneys

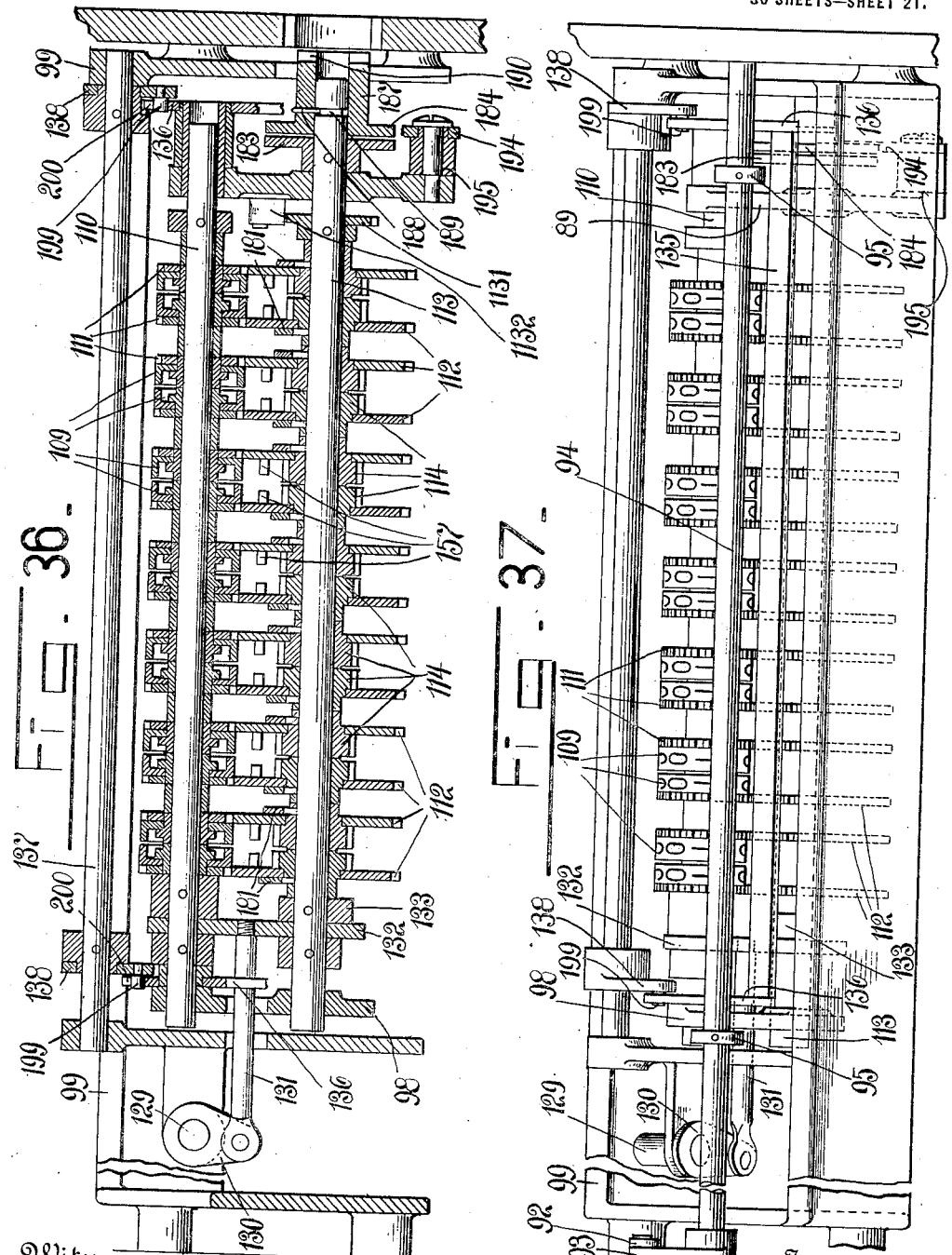

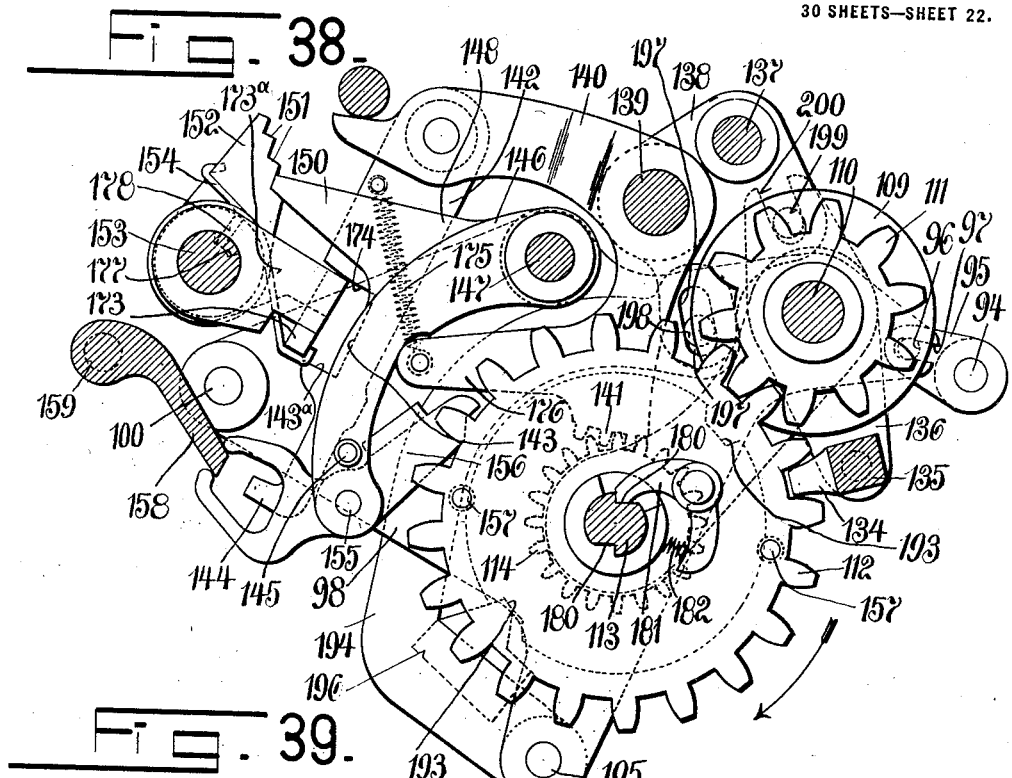
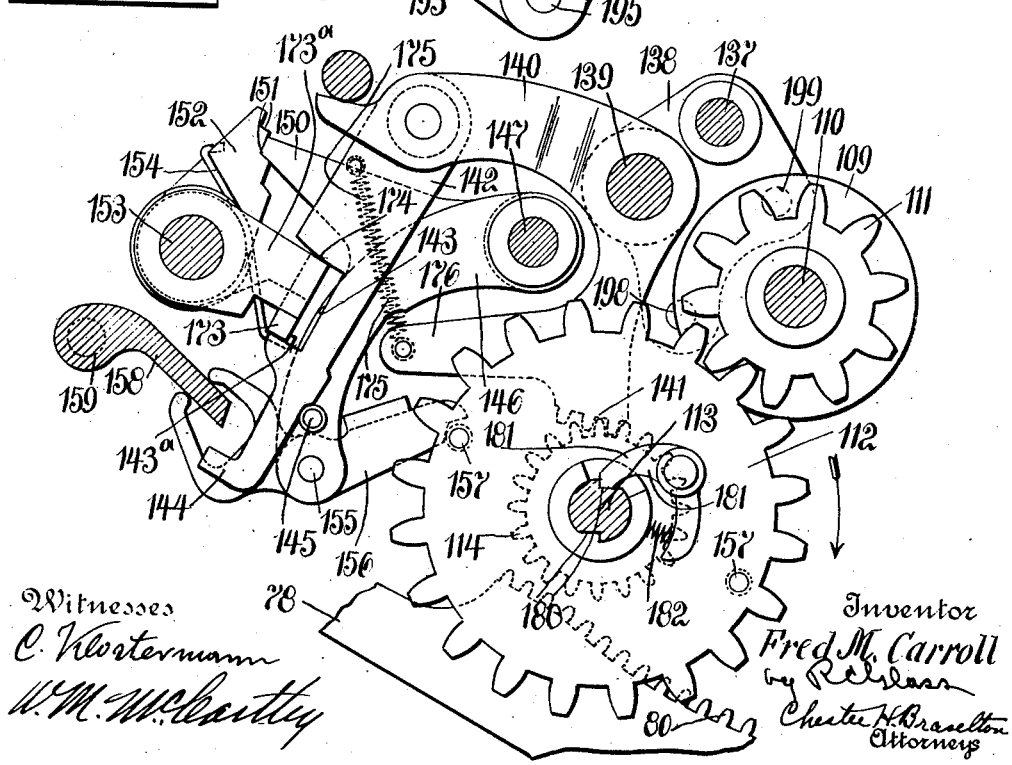

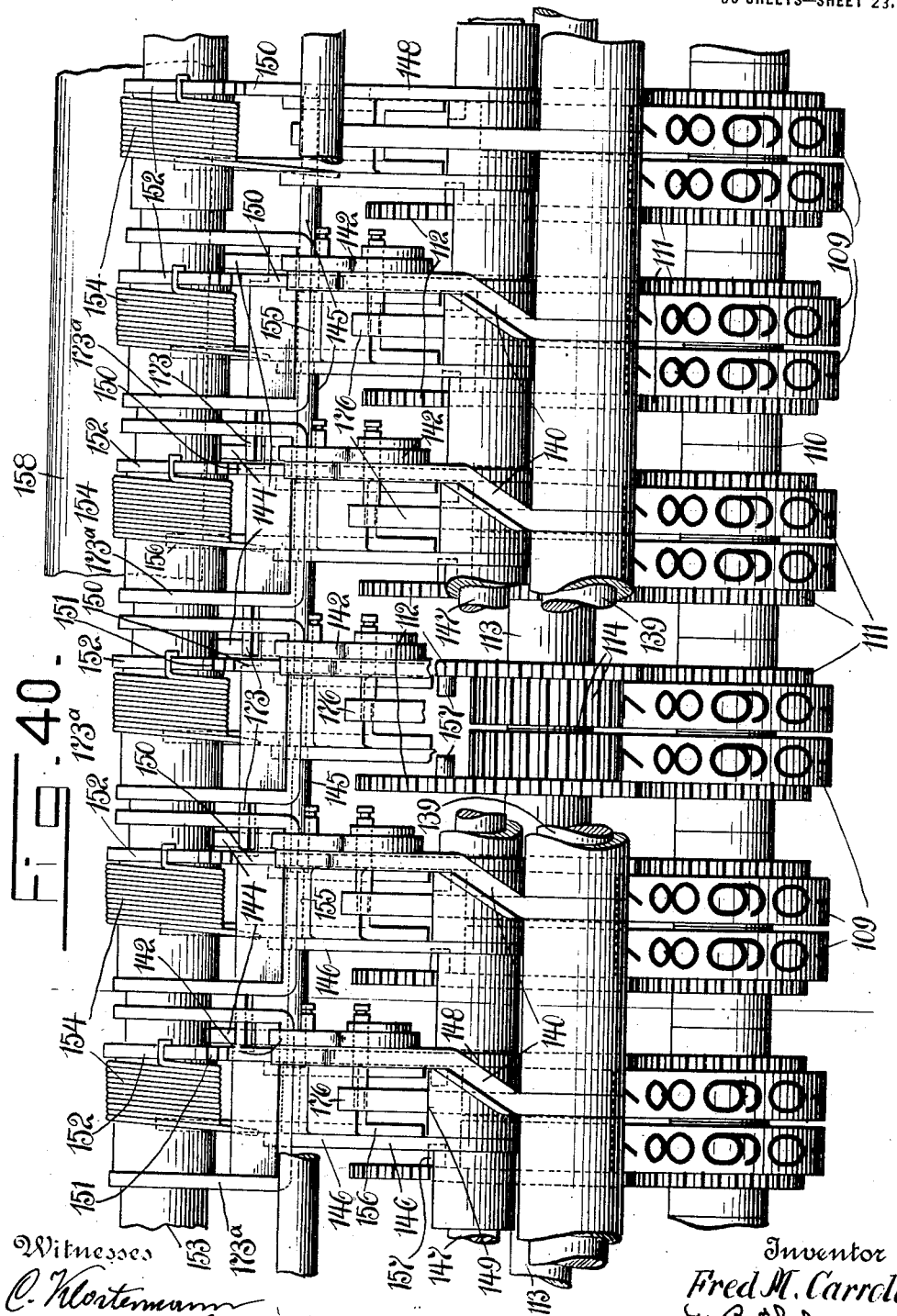

F. M. CARROLL.
CASHIER'S REGISTERING MACHINE.
APPLICATION FILED JUNE 16, 1913.
1,230,861.
Patented June 26, 1917.
30 SHEETS—SHEET 24.
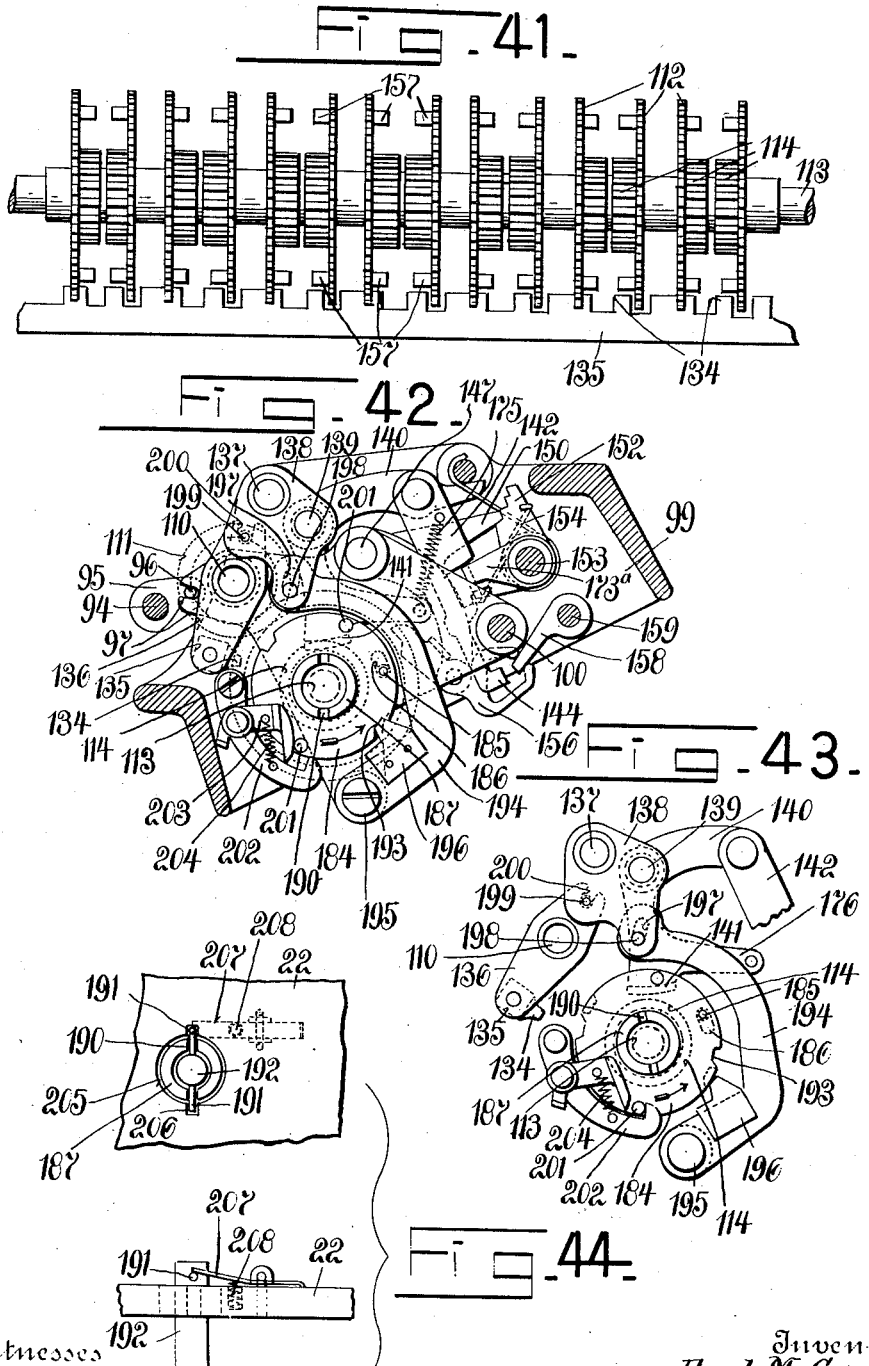

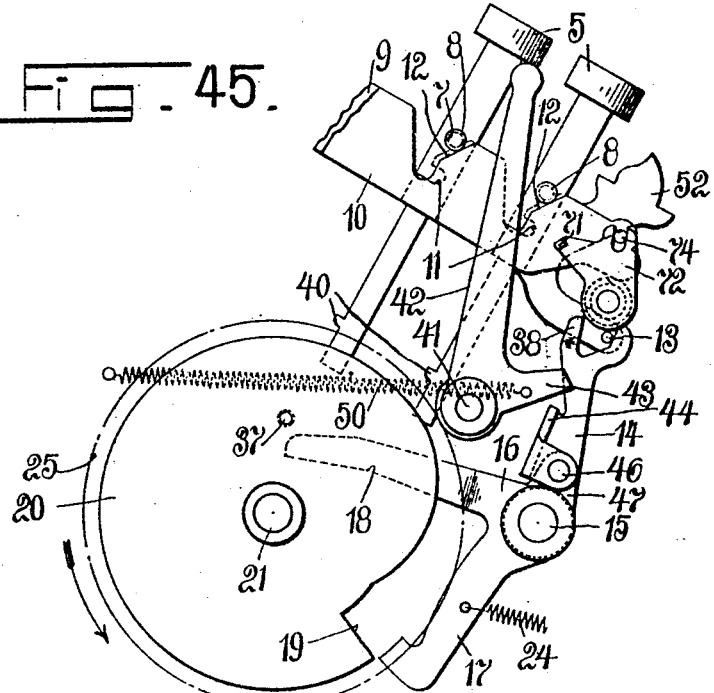
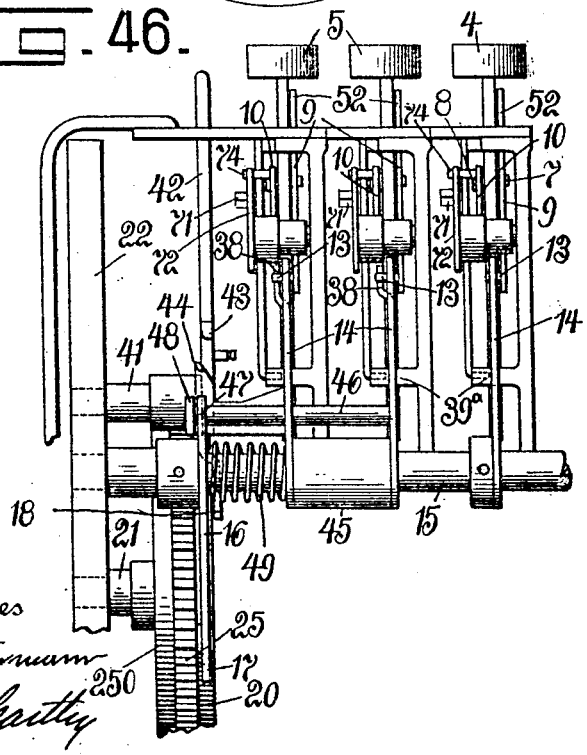

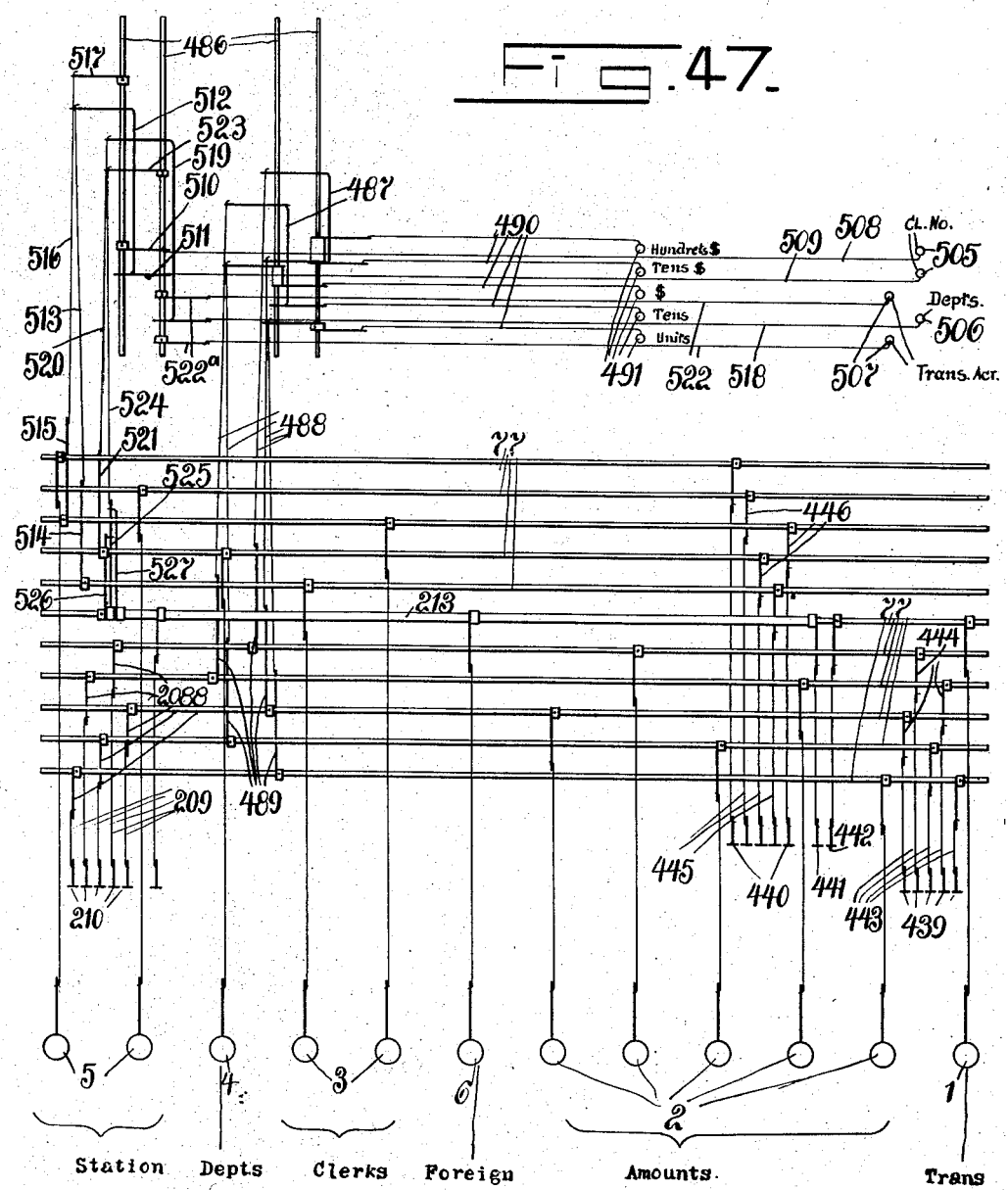

F. M. CARROLL.
CASHIER'S REGISTERING MACHINE.
APPLICATION FILED JUNE 16, 1913.

1,230,861.

Patented June 26, 1917.
30 SHEETS—SHEET 27.

Witnesses

Inventor
Fred M. Carroll
Chester H. Braselton
Attorneys

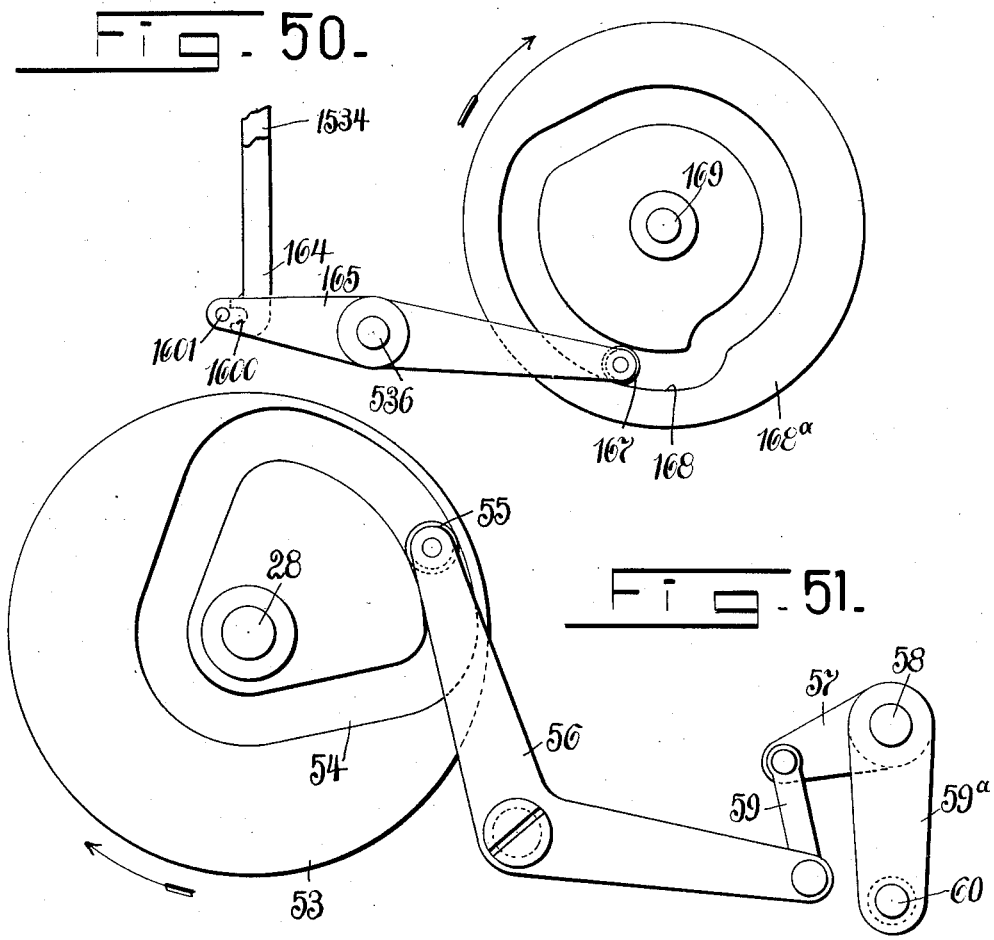

F. M. CARROLL.
CASHIER'S REGISTERING MACHINE.
APPLICATION FILED JUNE 16, 1913.
1,230,861.
Patented June 26, 1917.
30 SHEETS—SHEET 29.
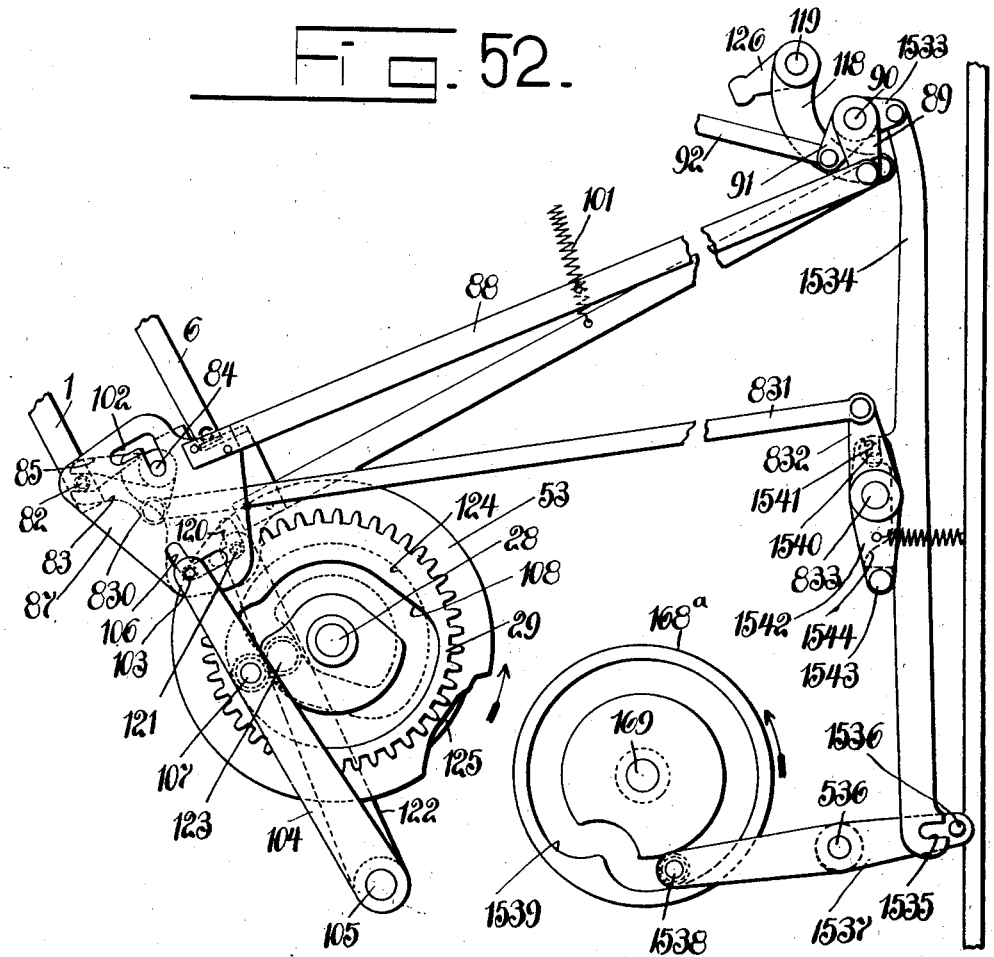
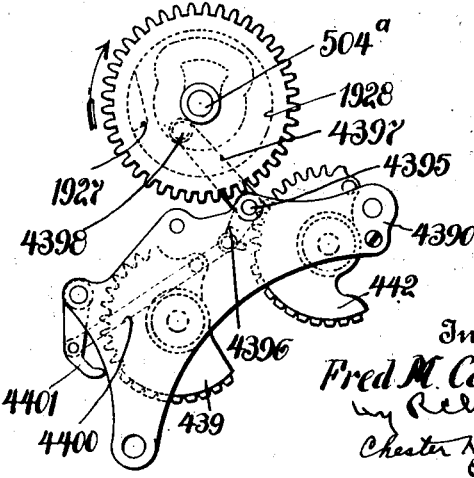

F. M. CARROLL.
CASHIER'S REGISTERING MACHINE.
APPLICATION FILED JUNE 16, 1913.

1,230,861.

Patented June 26, 1917.
30 SHEETS—SHEET 30.

Witnesses
C. Klostermann
W. M. McCarthy

Inventor
Fred M. Carroll
by R. C. Slass
Chester H. Braelton
Attorneys

UNITED STATES PATENT OFFICE.

FRED M. CARROLL, OF DAYTON, OHIO, ASSIGNOR TO THE NATIONAL CASH REGISTER COMPANY, OF DAYTON, OHIO, A CORPORATION OF OHIO, (INCORPORATED IN 1906.)

CASHIER'S REGISTERING-MACHINE.

1,230,861.     Specification of Letters Patent.     Patented June 26, 1917.

Application filed June 16, 1913. Serial No. 773,943.

*To all whom it may concern:*

Be it known that I, FRED M. CARROLL, a citizen of the United States, residing at Dayton, in the county of Montgomery and State of Ohio, have invented certain new and useful Improvements in Cashiers' Registering-Machines, of which I declare the following to be a full, clear, and exact description.

The primary object of this invention is to provide an improved form of accounting machine for use in department stores, the embodiment of which as herein shown is arranged to print the total of each transaction upon the original of a sales slip and also print said total in duplicate upon a copy of the original slip, the said duplicate being severed between the totals recorded thereon and a portion thereof deposited in a suitable receptacle in the machine. This machine also is designed to print upon a record strip suitably stored within the machine, the class of each transaction, the amount thereof, and consecutive number, the date, and a composite number representing the station and department in which the machine is located and the clerk's number making the sale as well as a character to identify the cashier operating the machine.

Another object of the invention is to provide means under the control of manipulative devices for perforating a strip with characters representing amounts of each transaction as well as the class of transaction, and, furthermore, with characters representing the department and the clerk's number, these perforated characters being for the purpose of selecting and actuating one of a plurality of totalizers located in an auditing machine whereby the sales made by each clerk in the various departments operating under the particular cashier's machine may be segregated as well as the class of transaction.

Another object of this invention is to provide a novel form of feeding devices for the sales slip and record strip whereby the records are properly recorded thereon.

A further object of this invention is to provide a machine of the kind above described with a plurality of totalizers whereby all of the sales of the various clerks operating under the cashier in charge of the machine may be recorded upon one of said totalizers and sales made by foreign clerks in departments assigned to the cashier operating this particular machine may be recorded upon another totalizer, each of the totalizers being arranged to be actuated differentially by an improved form of mechanism under the control of manipulative devices such as keys; these totalizers further being provided with an improved form of transfer mechanism common to all of said totalizers whereby said transfers are turned in simultaneously instead of successively as is done in the vast majority of accounting machines heretofore patented.

Another object of this invention is to provide separate receptacles for the segregation of the vouchers severed from the duplicate portion of the sales slip whereby the sales made by the clerks operating under the cashier in charge of the machine are kept separate from the sales made by clerks not assigned to this particular cashier.

A further object is to provide an improved mechanism whereby the impression taken from the type carriers is equalized although the printing surface of the said type carriers may be slightly out of alinement.

Another object of this invention is to so construct releasing mechanism for the manipulative devices that a part of said releasing mechanism may be disabled, so as to avoid the necessity of depressing the manipulative devices for recording certain data, which manipulative devices after being set are not likely to be changed during the progress of a day's business.

With these and incidental objects in view, the invention consists in certain novel features of construction and combinations of parts, the essential elements of which are set forth in appended claims, and a preferred form of embodiment of which is hereinafter described with reference to the drawings which accompany and form part of the specification.

Figure 1 is a perspective view of the improved machine.

Fig. 2 is a side elevation of the right hand side of the improved machine with the cabinet in section and showing the mechanism for recording and perforating upon the record strip.

Fig. 3 is a detail view of the mechanism coöperating with the "cash" key for the purpose of controlling the engagement of the totalizer with the actuating mechanism therefor.

Fig. 4 is a side elevation of the left hand side of the machine with the cabinet in section and showing the mechanism for recording upon the sales slip.

Fig. 5 is a detail view of the full stroke mechanism.

Figs. 6 and 7 are enlarged views of the upper portion of the mechanism shown in Fig. 4 and illustrating the improved form of differential mechanism for actuating the totalizers.

Fig. 9 is a plan view showing the relative location of the slip printing table and the movable frame carrying the record strip and feeding devices therefor.

Fig. 10 is a partial rear elevation showing the series of cross shafts with connections therefrom leading to the printing and perforating devices.

Fig. 11 is a partial top plan view showing the connections from the cross shafts to the perforating devices.

Fig. 12 is an enlarged side elevation of the devices for perforating the record strip and also of the feeding devices for said strip in connection with mechanism for taking an impression upon said strip from the type carriers.

Fig. 13 is a sectional view through the carriage carrying the punches for perforating the strip and also through the frame carrying the devices for selecting the punches.

Fig. 14 is a view similar to Fig. 12 looking in the opposite direction.

Fig. 15 is a plan view of the mechanism for guiding the record strip from the storage to the feeding rollers.

Fig. 16 is a plan view of the movable frame carrying the record strip.

Fig. 17 is a front view of Fig. 16.

Fig. 18 is a front elevation of the mechanism for selecting the receptacle in which the severed voucher is to be deposited.

Fig. 19 is a longitudinal sectional view through the tubing surrounding one of the drive shafts, which tubing and devices connected thereto operate the mechanism for taking an impression upon the record strip and also the feed devices for said strip.

Fig. 20 is an end elevation of the mechanism shown in Fig. 18 with several of the parts left off for the sake of clearness.

Fig. 21 is a front elevation, partly in section, of the feed devices for the record strip.

Fig. 22 is a rear view of the platen operating mechanism for the record strip.

Fig. 23 is an enlarged view of the printing and feeding devices for the sales slip.

Fig. 24 is a detail view of mechanism for equalizing the impression taken upon the sales slip from the several sets of type carriers.

Fig. 25 is an end elevation of the feeding devices for the inking ribbon forming a part of the sales slip printing mechanism.

Fig. 26 is a top plan view of the table for supporting the sales slip.

Fig. 27 is a front elevation of Fig. 26.

Fig. 28 is a sectional view through the several sets of type carriers for printing upon the sales slip.

Fig. 29 is a detail view of the locking mechanism for the main operating mechanism controlled by the cashiers.

Fig. 30 is a front elevation of the mechanism shown in Fig. 29.

Fig. 31 is a top plan view of the alining mechanism for the several sets of type carriers.

Fig. 32 is the cam and connections for operating the alining mechanism of Fig. 31.

Fig. 33 is a detail sectional view taken on line 33—33 of Fig. 8 and looking in the direction of the arrow of the cam and coöperating mechanism for actuating the consecutive numbering devices which print upon the sales slip and the record slip.

Fig. 34 is a detail view of the operating mechanism for the alining devices for the type carriers which record upon the record strip.

Fig. 36 is a vertical transverse section taken through the registering mechanism.

Fig. 37 is a front elevation of the registering mechanism.

Fig. 38 is an enlarged cross sectional view taken through the registering mechanism and showing the transfer devices in normal position.

Fig. 39 is a view somewhat similar to Fig. 38 with the transfer devices in partially operated condition.

Fig. 40 is an enlarged partial top plan view of the mechanism shown in Figs. 38 and 39.

Fig. 41 is a detail view of the locking plate for the totalizer elements that are out of coöperative relation with the actuators.

Fig. 42 is an end elevation of the registering mechanism showing the turn to zero devices.

Fig. 43 is a partial end elevation of the mechanism shown in Fig. 42, said mechanism being shown in operated condition.

Fig. 44 illustrates detail views of the devices requiring a slight backward movement of the turn to zero wrench before the same can be removed.

Fig. 45 is an elevation illustrating the key release mechanism and devices for disabling a part of said mechanism.

Fig. 46 is a front elevation of Fig. 45.

Fig. 47 is a diagrammatic view illustrating the connections from the manipulative devices to the various sets of type carriers and perforating devices.

Fig. 48 is a plan view of the record strip.

Fig. 49 shows plan and side elevation of one of the sales slips.

Fig. 50 is a view of the cams and coöperating devices for operating the transfer mechanism.

Fig. 51 is a view of the cam and connections for driving the invariably movable members of the differential mechanism.

Fig. 52 is a detail side elevation of the mechanism for shifting and rocking the totalizers.

Fig. 55 is a detail view of the alining devices and operating means therefor for the record strip type carriers.

Figure 8:
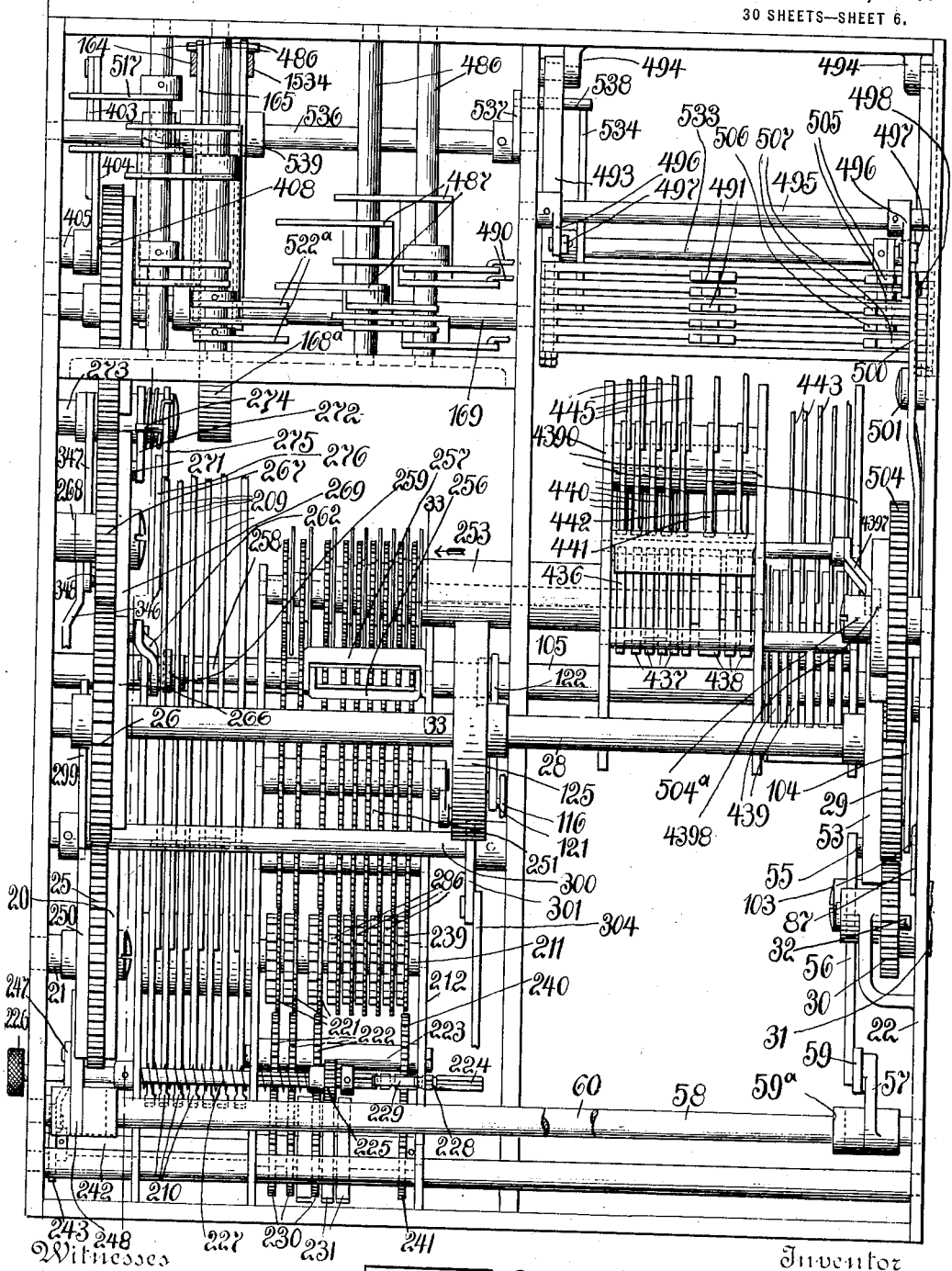
Fig. 8 is a top plan view of the printing devices for recording upon the sales slip and also upon the record strip as well as the devices for selecting the punches for the purpose of perforating the record strip.

The system commonly employed in department stores is one in which a plurality of departments are assigned to a cashier, each of which departments has a number of clerks operating therein. As each clerk makes a sale she forwards a sales slip to the cashier having supervision over her department and the cashier sets up in the cash register manipulative devices corresponding to the total of the sale and the class of sale as well as manipulative devices designating the clerk and the department. After setting up these various manipulative devices the machine is operated and data corresponding to the manipulative devices is recorded upon the sales slip and also upon a record strip contained in the machine, after which a portion of the sales slip containing the printed record is wrapped with the goods and returned to the clerk making the sale, who in turn hands the package to the customer.

In order that the detail description which is to follow may be better understood, a general description of the functions performed by the improved machine and the mode of operation thereof will be here given.

The machine herein shown is provided with a set of special keys such as "C. O. D.," "cash," and "credit," and five banks of amount keys, and also with five banks of keys for setting up a composite number, the first two banks of the latter keys reading from the left, Fig. 1, representing the station in which the machine is located, the third bank the departments assigned to a particular cashier, and the fourth and fifth banks the clerks operating in these various departments. A foreign key having the caption "F" is provided, which key is operated by the cashier when a clerk other than those assigned to the particular cashier, makes a sale in any one of the departments over which that particular cashier has charge. These various keys determine the extent of movement imparted to differential mechanism which is actuated upon the operation of the crank handle. The machine herein shown is provided with two totalizers upon one of which all the cash transactions made by the clerks operating under that particular cashier are accumulated, while the other totalizer is used for the purpose of accumulating the "cash" sales made by foreign clerks or those not operating under this particular cashier. When transactions other than "cash," such as "C. O. D.," and "credit" transactions are recorded no entries of such transactions are made upon the totalizers but they are recorded on the sales slips and record strip.

The differential mechanism controlled by the various manipulative devices above described are connected to type carriers for recording upon a record strip the kind of transaction, the amount of same, and a composite number representing the station or clerk and the department in which the sale is made. A cashier's symbol is also set up by the cashier operating the machine, there being provided in this particular machine two of such symbols, one of which has to be in position for the purpose of printing upon the record strip and also upon the sales slip before the machine can be manipulated. In addition to printing the above data upon the record strip the consecutive number of the sale and the date thereof is also recorded upon said strip. The sales slip is arranged to have printed thereupon in triplicate the cashier's symbol, the consecutive number of the sale, the date thereof and the amount. One of these impressions is taken upon the original of the said slip while the remaining two are taken upon the duplicate and the latter severed between said impressions and the severed portion deposited in one of two receptacles depending upon whether the transaction is made by a regular clerk or a foreign clerk.

The transaction and the amount manipulative devices as well as the department and clerks' manipulative devices control devices for selecting punches which perforate the record strip with characters identifying the transaction, the amount thereof, and the clerk by whom the transaction is made, and the department in which it is made, these perforations being used for the purpose of controlling subsequent accounting operations as hereinafter described.

*Keyboard.*

As previously mentioned, this machine is provided with a plurality of banks of keys or manipulative devices, one of which banks represents the transactions likely to occur in a department store, such as "C. O. D.," "cash," "credit," five banks of amount keys 2 and five other banks of keys, comprising two banks of the clerks' keys 3, one bank of department keys 4 and two banks 5 representing the various stations, which when taken collectively represent a composite number. A foreign key 6, having the caption "F" is also provided, which key is used by the cashier when a clerk other than those assigned to the cashier makes a sale in one of the departments over which the cashier has supervision.

Projecting from the sides of each key are pins 7 and 8 (Figs. 7, 45 and 46); the pins 7 of each bank coöperating with a detent 9 and the pins 8 coöperating with the slide 10. The detent 9 coöperating with each bank of keys is provided with a series of notches 11 which, when any one of the keys is depressed, engages with its pin 7 and holds said key in depressed position, as is well understood in the art. The pins 8 of each bank of keys engage the inclined walls 12 of the slide 10 and move said slide forwardly as any one of said keys is depressed and holds said slide in its forward position as long as the key remains in operated condition. During the depression of any one of the keys the detent 9 will be moved forward and a pin 13 projecting from a forward extension of said detent will engage with an upright 14 secured to a cross shaft 15 suitably mounted in the frame work of the machine, and rock said shaft in a clockwise direction. This shaft (Fig. 45) near its left hand end has secured thereto a member 16 having prongs 17 and 18. As said shaft is rocked as above described, the lower end of the prong 17 will move into engagement with a shoulder 19 formed upon a disk 20 secured to a stub shaft 21 projecting from the left hand side frame 22 of the machine and thereby prevent the rotation of the disk 20. As the key is fully depressed the detent 9 will be returned to its normal position by a spring 23 (Fig. 7) and latch said key in its depressed position while the member 16 will also be returned to its normal position by a spring 24 connected to the prong 17 so as to withdraw said arm from engagement with the shoulder 19.

Fast to the disk 20 and stub shaft 21 is a gear 25 (Figs. 4 and 46), which gear meshes with a similar gear 26 secured to a shaft 28, which shaft extends through the machine and has secured thereto near its right hand end (Fig. 2) a gear 29, which gear meshes with a gear 30 of half the diameter of gear 29, the said gear 30 having secured thereto the operating handle 31. As stated, the gear 30 is half the diameter of the gear 29 and consequently two rotations of the crank handle 31 are necessary to impart a full rotation to the shaft 28. Projecting from the gear 30 (Fig. 2) is a pin 32 which is engaged by the hook end of a horizontal arm 33 of a bell crank 34, the vertical member of which bell crank is provided at its upper end with a slot 35 into which enters a pin 36 projecting from the slide 10 coöperating with the bank of special keys 1. As may be seen by reference to Fig. 2, the operating handle 31 is normally locked by the hook end of the horizontal arm 33 of the bell crank 34 and is only released by an operation of one of the special keys 1. When one of the latter keys is operated its slide 10 will move forwardly and the pin 36 projecting therefrom will rock the bell crank in an anti-clockwise direction withdrawing the hook portion of the arm 33 of said bell crank out of engagement with the pin 32, thereby freeing the operating handle.

As the handle 31 is rotated the shaft 21 (Fig. 45) by the above described gearing will be rotated in the direction of the arrow shown in said figure. Near the end of the rotation of the shaft 21 a pin 37 projecting from the disk 20 secured to said shaft, will engage with the prong 18 of the member 16 secured to the shaft and rock said member and shaft in a clockwise direction against the tension of spring 24. This rocking of the shaft 15 will cause a prong 38 projecting from the upper end of each of the arms 14, to contact with the pin 13 projecting from the adjacent detent 9 and move said detent in a forward direction so as to release the operated key of that particular bank, it being understood that there is one of the arms 14 for each bank of keys. The operated keys after being released are returned to their normal outermost position by springs 39 (Fig. 7) coiled about the shanks of the keys, the ends of which abut against the key frames 39$^a$ through which said keys project and shoulders formed upon the enlarged portions of said keys. The keys are limited in the outward movement by projections 40 which contact with the under sides of the key frames 39$^a$.

Secured to the gear 26 (Fig. 5) is a disk 2600, upon the surface of which rides a spring-pressed plunger 2601, that is mounted in an arm 2602 suitably supported upon the left hand side frame of the machine. Secured to this arm 2602 is a pawl 2603 which is arranged to engage with the teeth of the gear 26 when a retrograde movement of the crank handle is attempted, thereby preventing such retrograde movement of said handle. When the gear 26 and the disk 2600 secured thereto are rotated in the direction of the arrow (Fig. 5), the friction between the disk and the spring-pressed plunger 2601 will move said pawl so as to free it from engagement with the teeth of the gear and thereby prevent any unnecessary noise during the proper operation of the machine. If an attempt is made to reversely rotate the shaft 28 carrying the gear 26, the pawl 2603 will instantly be rocked in engagement with the teeth of the gear, due to the friction between the disk 2600 and the plunger 2601 and lock said gear and shaft from reverse rotation.

It frequently happens in department stores that upon days on which special sales are advertised more machines are required in the departments having such special sales than are usually employed, and as these machines remain at these departments or stations for the entire time of the sale, it is desirable to avoid the necessity of depressing the manipulative devices for designating the station at which the machine is located and therefore a special lever is provided for disabling that part of the releasing mechanism, which coöperates with the key banks for designating the station numbers so that when keys representing the station are once depressed they remain depressed until the operator desires to release them. The operation of this disabling mechanism is as follows:

Mounted upon a stub shaft 41 projecting from the left hand side frame 22 (Figs. 45 and 46) is a lever 42, the upper end of which protrudes through the cabinet of the machine as shown in Fig. 1 adjacent to the extreme left hand bank of keys. This lever 42 has extending forwardly therefrom (Fig. 45) an arm 43 which, when said lever is moved in a clockwise direction, engages with a bevel offset 44 of the arm 14 which coöperates with the detent of the extreme left hand bank of keys. This arm 14 is loosely mounted upon the shaft 15 and is connected to one end of the sleeve 45 surrounding said shaft, which sleeve at its other end has extending upwardly therefrom another arm similar to the arm 14 and which coöperates with the pin 13 projecting from the detent 9, which coöperates with the second bank of keys from the left, which two extreme left hand banks of keys represent the station numbers. A rod 46 extends from the arms 14 coöperating with the station number detents 9 through an extension 47 of the member 16 which is secured to the shaft 15 and has connected to its extreme left hand end (Fig. 46) an ear 48 of the offset having formed thereon the bevel upright 44. A spring 49 surrounding the shaft 15 is interposed between the member 16 and the arm 14 coöperating with the detent of the extreme left hand bank of keys so as to hold said arm normally in coöperative relation with its companion detent in which position the station number keys will be released upon each operation of the machine.

When it is desired to disable this releasing mechanism for the station number keys the lever 42 is moved in a clockwise direction about the shaft 41 so that the forward projection 43 will engage with the bevel upright 44 and shift the arms 14 coöperating with the station number detents laterally such a distance that when the shaft 15 carrying the said arms is rocked rearward, prongs 38 of said arms will not engage with the pins 13 of the station number detents, and consequently will not release the keys. As the lever 42 is moved into this position for disabling the releasing mechanism for the station number detent, the forward end of a spring 50 will pass below the center of the stub shaft 41 and thereby hold said lever in its adjusted position, it being understood that the spring 50 also holds the lever in its normal position as shown in Fig. 45, because of the fact that when the lever is in this position the spring is above the center of the shaft 41. A slot 51 (Fig. 1) limits the movement of the lever 42.

Each of the detents 9 is provided with an upward and forward extension 52 by which any desired detent may be moved forwardly independently of the operation of the machine in order that a key depressed by mistake may be released.

Differential mechanism.

The differential mechanism herein shown comprises an invariably movable driving member and a driven member capable of being connected thereto by a series of links having different leverages, which links are normally ineffective and are rendered effective by a series of keys for determining the extent of movement of the driven member.

The gear 29 secured to the shaft 28 (Figs. 2 and 8) has secured thereto a disk 53 provided with a cam groove 54 (Fig. 51) in which plays a roller 55 projecting from the upper end of a bell crank lever 56, which is suitably pivoted upon the right hand side frame 22 of the machine. The forward end of the horizontal arm of the bell crank 56 (Figs. 3, 8 and 51), is connected to an arm 57 secured to a rock shaft 58 by a link 59. This rock shaft 58 has extending downwardly therefrom an arm 59ª which supports at its lower end one end of a rod 60, the said rod extending across the entire keyboard and being supported at its other end by an arm similar to the arm 59 which is also secured to the rock shaft 58. Connected to the rod 60 is a series of links 61, there being one of these links for each bank of keys. At their rearward ends each of the links 61 is connected to the lower end of an arm 62, (Figs. 4 and 6) pivoted at its upper end to the key frame 39ª on which are mounted the companion set of keys. Arms similar to the arms 62 project downwardly from the forward end of the different key frames and are connected at their lower ends to their respective links 61.

Projecting from each of the links 61 is a series of pins 63 (Fig. 7), corresponding in number to the keys of the respective bank coöperating with said link. These pins extend into slots 64 formed in the lower end of links 65 which are pivoted to a slide 66, the latter being connected at its rearward end by a link 67 to its companion key frame 39ª. The forward end of the slide 66 is suitably supported and guided in an offset 68 of its key frame 39ª. The links 65 extend upwardly various distances from where they are pivoted to the slide 66 and are provided at the upper ends with notches 69 in which the key pins 8 enter when the keys are depressed. Each of the slides 66, near its forward end, is notched as at 70 in which notch projects an offset 71 of an arm 72 pivotally mounted upon the companion key frame 39ª. Each of these arms 72 is provided with a notch 73 into which enters a pin 74 projecting from the companion slide 10 which coöperates with the keys as heretofore described. From this it will be seen that normally the slides 66 are locked by the offsets 71 of the arms 72, which arms are rocked in a clockwise direction to release the slide 66 upon the manipulation of the keys coöperating therewith.

By reference to Fig. 51 it will be seen that the cam disk 53 secured to the shaft 28 will impart to the frame comprising the shaft 58, arms 59, and the cross rod 60 an oscillatory movement of invariable extent at each rotation of said cam disk, which movement will be transmitted to the links 61 connected at the forward ends to said cross rod 60, this movement also being transmitted to the links 65 which are pivotally mounted upon the driven member or slide 66. If no keys are depressed, the movement of the links 65 will be ineffectual as far as the slide or driven member 66 is concerned. When a key is depressed its pin 8 will enter the notch 69 of the companion link 65 and when the link 61 is moved rearwardly by the cross-rod 60 the pin 8 of the depressed key will act as a fulcrum for the link 65 and thereby move the slide or driven member 66 an extent determined upon the key depressed. It will be noted that the leverage of the link 65 relative to the driven member 66 varies in accordance with the denomination of the key, that is the leverage of the link 65 coöperating with the "1" key, which is the foremost key of each bank, is less than the leverage of the adjacent link 65 which coöperates with the "2" key, this leverage increasing with each higher amount key and being so proportioned that the slide or driven member 66 has nine degrees of movement.

Each of the slides 66 is connected at its rear end to a stud 75 (Figs. 4 and 6) projecting from the upper end of an arm 76 loosely mounted upon the foremost one of a series of cross shafts 77. Also connected to each of the arms 76 by the stud 75 is the forward end of a plate 78 which at its rearward end is supported by an upright arm 79 loosely mounted upon the rearmost shaft 77. The plates coöperating with the members 66 that are controlled by the amount manipulative devices 2 are provided with rack teeth 80, which engage and drive the totalizer elements as hereinafter described, while the upper edges of the plates 78 connected to the driven members 66, which are controlled by the other banks of manipulative devices, are smooth, as it is not intended that these plates should actuate the totalizer elements.

From this description it will be seen that the plates 78 receive the same degree of movement as the driven members 66, the extent of movement of the latter being determined by the keys depressed. The timing of the actuation of the driven members by the links 61, which may be termed the driving members, is such that the parts driven thereby are returned to their normal positions before the previously described key release mechanism is brought into operation. This is quite essential as otherwise there would be a likelihood of the driven members not being returned to their normal position if the keys were released previous to the complete return movement of the driving links 61. The slots 64 formed in the lower ends of the links 65 connecting the driving members 61 with the driven members 66 are so shaped that the latter part of the movement of the driving links 61 is negligible upon the driven members 66.

In order to prevent any possible damage being done to the machine by the depressing of a plurality of keys of the same bank and thereby engaging the driving and driven members by links of different leverages and then operating the machine, a series of pawls 81 are pivotally mounted upon the lower edge of each key frame, which pawls permit the operation of only a single key of each bank in a manner well known in the art.

Registering mechanism.

The registering mechanism comprises two totalizers, the denominational elements of which are grouped and are mounted in axial alinement upon a transverse shaft, which is supported in the end plates of a rocking frame, the totalizers being capable of being shifted within the rocking frame so as to bring the totalizer elements of either totalizer into operative relation with the previously described actuating racks. The frame carrying the totalizers is only rocked when a cash transaction is entered upon the machine, whether the cash transaction is made by one of the clerks assigned to the cashier operating the machine, or by a foreign clerk. All of the cash transactions made by the clerks operating under the cashier operating the machine are accumulated upon one of the totalizers, while the sales made by clerks foreign to the cashier operating the machine are accumulated upon the other totalizer.

When a cash transaction is made by one of the regular clerks operating under the cashier, the cashier depresses the "cash" key 1, the amount keys 2 corresponding to the total of the sale, and the clerk's number keys 3, and one of the department keys 4, there being no need of depressing the station number keys 5 as these keys are depressed at the beginning of the day's business and remain in depressed position as long as the machine is used at that particular station. The depressing of the "cash" key 1 (Figs. 2, 3 and 52) causes a pin 82 projecting from the lower end of said key to contact with an arm 83 extending forwardly from a stub shaft 84. Secured to this shaft is another forwardly extending arm 85 which engages with a pin 86 projecting inwardly from a plate 87 secured to the forward end of a lever 88 which, at its rearward end, is pivotally mounted on an arm 89 secured to and extending downwardly from a rock shaft 90 suitably secured in the machine frames. This shaft 90 has another arm 91 extending downwardly therefrom, which is secured to the rearward end of a link 92, the forward end of the latter being secured to an arm 93 (Fig. 4) which in turn is secured to and extends upwardly from a rock shaft 94 suitably secured in the frame work of the machine. Extending rearwardly from this shaft 94 (Figs. 2, 4, 35 and 38) are a pair of arms 95 which have pins 96 projecting into recesses 97 formed in the forward ends of the side plates 98 forming the rocking frame carrying the totalizers. These side plates 98 of the rocking frame are pivoted at their rearward ends to a stationary frame work 99 as at 100, which frame work is suitably secured to the side frames 22 of the machine.

By this depression of the key 1 the plate 87 carried by the arm 88 will be lowered against the tension of a spring 101 (Figs. 2 and 52), the ends of which are connected to an arm 88 and the frame work 99. The lowering of the plate 87 will cause the horizontal portion of an inverted L-shaped slot 102 to present itself to the stud 84, which normally rests in the vertical portion of said slot. This lowering of the plate will also cause a pin 103 projecting from the upper end of an arm 104 loosely pivoted as at 105 to enter the vertical portion of an L-shaped slot 106. This arm 104 is provided with a roller 107 which plays in a cam groove 108 formed in the gear 29 which is secured to the shaft 28. The shape of this cam groove is such that upon the beginning of the operation of the crank handle 31 the arm 104 will be rocked in a clockwise direction, and through the pin 103 engaging the vertical portion of the L-shaped slot 106 of the plate 87, move said plate and the arm 88 to which it is connected rearwardly, by which movement the shaft 90 located at the rear part of the machine will be rocked in an anti-clockwise direction. This rocking of the shaft 90, through arms 91 and 93 and link 92, causes the shaft 94 to be rocked, which shaft through the arms 95 projecting rearwardly therefrom, will rock the frame 99 supporting the totalizers so that the rack portion 80 of the amount actuating racks 78 will drive the elements of the selected totalizer, when said racks are moved rearwardly, in the manner previously described. After the totalizer elements are actuated by the racks 80 the totalizer frame will be rocked back to normal position by the cam groove 108 formed on the gear 29 and intervening connections. Near the end of the operation of the machine and after the "cash" key is released the spring 101 will return the parts to the position shown in Fig. 2, in which position neither of the totalizers will be engaged with the actuating racks if the machine is operated.

As previously stated, the machine herein shown is provided with two totalizers for recording the cash sales made by the clerks operating under a particular cashier and the cash sales made by clerks not operating under said cashier, and which clerks are classified as foreign to the departments under the supervision of the cashier.

The denominational elements 109 of these totalizers are grouped as shown in Figs. 35, 36, 37 and 40 and are mounted upon a shaft 110 suitably supported in the end plates 98 of the rocking frame. The purpose of grouping these denominational elements of the different totalizers is to reduce to a minimum the extent of movement necessary to bring either of the totalizers into coöperative relation with the actuating racks 78 therefor. Each of the totalizer elements 109 is provided with a pinion 111, which pinions mesh with gear wheels 112 of twice the diameter of said pinions and which gear wheels are loosely mounted upon a transverse shaft 113 suitably supported in the side plates 98 of the rocking frame. Fast to each of these gear wheels 112 is a pinion 114 having the same number of teeth as the gear wheels 112, and which are arranged to be brought into engagement with the rack portions 80 of the plates 78 controlled by the amount manipulative devices 2 when the frame carrying the totalizer elements is rocked, as previously described.

Figure 35:
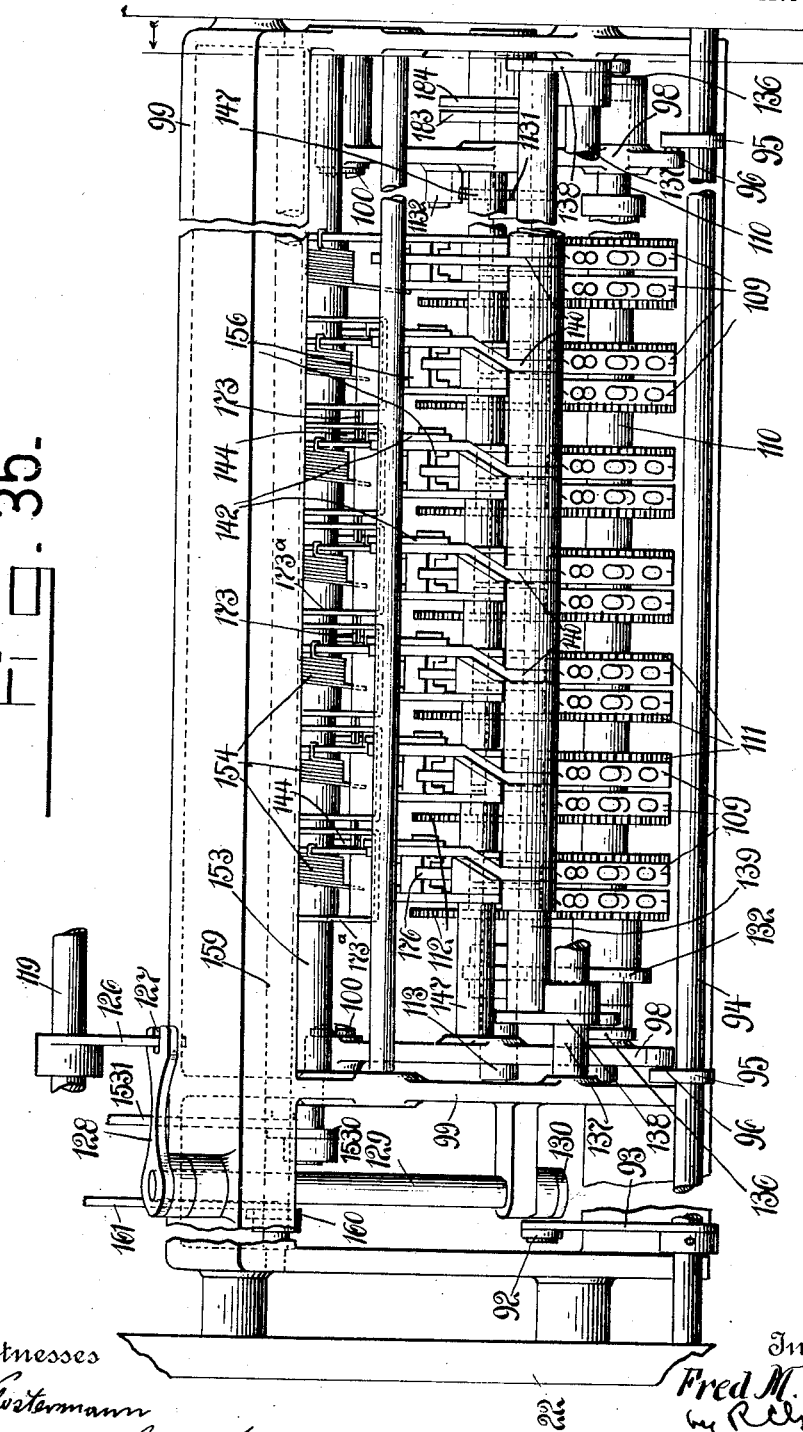
Fig. 35 is a top plan view of the registering mechanism.

The right hand one of each group of totalizer elements 109 as viewed in Fig. 35, represents the totalizer upon which are accumulated the sales made by the clerks assigned to the cashier operating the machine, while the left hand elements 109 of each group represent the totalizer upon which are accumulated the sales made by the foreign clerks. The elements 109 of the totalizer which are arranged to accumulate the regular clerks' sales are in position to engage with the actuating racks 80 when the frame carrying the totalizers is rocked.

When it is desired to register a foreign cash sale the "foreign" key 6 is depressed in connection with the amount keys representing the sale and the "cash" key. The operation of the "foreign" key by a pin 115 projecting therefrom (Figs. 2 and 52) causes the lowering of a plate 116 secured to the forward end of an arm 117, which arm at its rearward end is pivoted to an arm 118 projecting downwardly from a rock shaft 119 suitably supported in the machine frame. The plate 116 lowered by the operation of the "foreign" key causes the vertical portion of a slot 120 formed in said plate to pass over a pin 121 projecting from the upper end of an arm 122 pivotally mounted upon the shaft 105. This arm 122 approximately at its center has projecting therefrom a roller 123 (Fig. 52) which plays in a cam groove 124 formed in a disk 125 secured to the shaft 28 near the center of said shaft (Fig. 8). The shape of the cam groove 124 formed in the disk 125 is such that upon the very beginning of the rotation of the shaft 28 carrying the disk 125, the arm 122 (Figs. 2 and 52) will be rocked in an anti-clockwise direction. This movement of the frame 122 will cause the plate 116 and the arm 117 carrying said plate to be moved toward the front of the machine, which movement through arm 118 will rock the shaft 119. The shaft 119 has secured thereto and extending forwardly therefrom an arm 126 (Fig. 35), the forward end of which plays in a recess 127 formed in the end of an arm 128 secured to the rearward end of a rock shaft 129, which is suitably secured in the previously described stationary frame work 99. The forward end of the shaft 129 (Figs. 36 and 37) has extending downwardly therefrom an arm 130 to which is connected one end of a rod 131, the other end of said rod being screw threaded into a plate 132 supported by the shafts 110 and 113. This plate is mounted upon the shafts 110 and 113 between collars 133 which are secured to said shafts. From this construction it will be seen that when the shaft 119 is rocked the shaft 129, (Fig. 35) will also be rocked and by the rod 131 secured to the arm 130 projecting from the shaft 129 the shafts 110 and 113 will be shifted toward the right (Fig. 36), which will cause the totalizer elements 109 and the actuating gears 112 therefor mounted upon said shafts also to be moved laterally thereby bringing the pinions 114 of the foreign cash totalizer into position to be rocked into engagement with the actuating racks 80 controlled by the amount manipulative devices. After the amount of the transaction is registered in the foreign totalizer the shafts 110 and 113 will be returned to their normal position as shown in Fig. 36 by the cam disk 125, (Fig. 52) due to the fact that the inner end of the rod 131 connecting the arm 130 with the plate 132 is screw threaded into said plate so that said plate and shafts supporting the plate will be moved positively in both directions by the rod 131. The elements 109 of the totalizers and the actuating gears 112 therefor are returned with the shafts 110 and 113 because said shafts are provided with collars near the right hand ends, which in connection with spacing collars on said shafts cause said elements and actuating gears therefor positively to return therewith.

The totalizer elements out of position to engage with the actuating racks 80 are prevented from being accidentally displaced by projections 134 (Figs. 38 and 41) extending inwardly from a bar 135 supported by arms 136 pivotally mounted about the totalizer shaft 110, which projections engage with the actuating gears 112 for the totalizer elements that are out of operative relation with the actuating racks 80. When the totalizers are shifted, as previously described, to bring the foreign cash totalizer into operative relation with the actuating racks the actuating gears 112 for the foreign cash totalizer elements pass out of engagement with the projections 134 and the actuating gears 112 for the elements of the regular cash totalizer into engagement with the projections 134 thereby locking said actuating gears while unlocking the gears of the foreign cash totalizer.

The amounts on the totalizers are arranged to be read through openings 1090 formed in a slide 1092 suitably mounted upon the cabinet of the machine above the totalizer (Fig. 1). An opening 1091 at the left hand end of the slide is arranged to disclose characters F and R suitably inscribed upon the shiftable frame carrying the totalizers, (Figs. 1 and 35,) which characters represent foreign and regular totalizers respectively. The slide 1092 is under the control of the key lock 1093 and as shown in Fig. 1 is in an intermediate position, in which position the character indicating the regular totalizer is seen through the opening 1091 and the amount on said totalizer is seen through the openings 1090. If the key lock is rotated in an anti-clockwise direction the slide will be shifted to disclose the F character and the amount on the foreign totalizer, while if the lock is rotated in a clockwise direction the slide will be so shifted as to conceal both the F and R characters and the indicia on the elements of the totalizers.

*Transfer mechanism.*

A novel form of transfer mechanism is provided whereby two or more transfers are simultaneously effected instead of being turned in consecutively as is commonly done in the art, thereby effecting a saving in the time required for turning in the transfers, these transfers being effected after the actuating racks have imparted differential movement to the totalizer elements.

Supported in the stationary frame 99 within which is mounted the totalizer rocking frame is a shaft 137 which has secured thereto arms 138 (Figs. 35 to 39 inclusive). These arms support a rod 139 upon which rod are pivotally mounted a series of bell crank levers 140, of which there is one for each element above the units element of the totalizer that is in position to be actuated by the actuating racks. The lower ends of the vertical arms of each of the bell crank levers 140 is provided with a rack portion 141 which engages one of the pinions 114 when said pinions are out of engagement with the actuating racks 80. Depending from the rearward end of the horizontal arm of each bell crank lever 140 is an arm 142 which has a cut out portion 143 approximately at its center and a rearwardly extending nose 144 at its lower end. The forward edge of each of the depending members 142 normally rests against a roller 145 extending laterally from an arm 146, which is pivotally mounted upon a shaft 147 and connected to a similar arm 148 by a sleeve 149 (Figs. 35, 38, 39 and 40), the latter arm having a rearward extension 150 coöperating with steps 151 of a plate 152 pivotally mounted upon a rock shaft 153. When the parts are in normal position the plate 152 is held by a coil spring 154 so that its lower step will engage with the rearward extension 150 of the arm 148. A rod 155 is supported by the lower end of the arms 146 and 148 and pivotally mounted upon this rod is a frame 156, the forward end of which is arranged to be engaged by pins 157 projecting from one of the actuating gears 112, it being understood that these actuating gears being of twice the size of the gears 111 connected to the accumulator elements impart a full rotation to said element by a half rotation of the gear and consequently said gears are provided with two pins 157 for the purpose of tripping the transfer mechanism at the proper time. The rearwardly extending arm of the frame 156 is forked and straddles an oscillatory plate 158, which plate is arranged to have an invariable movement at each operation of the machine.

Figure 53:
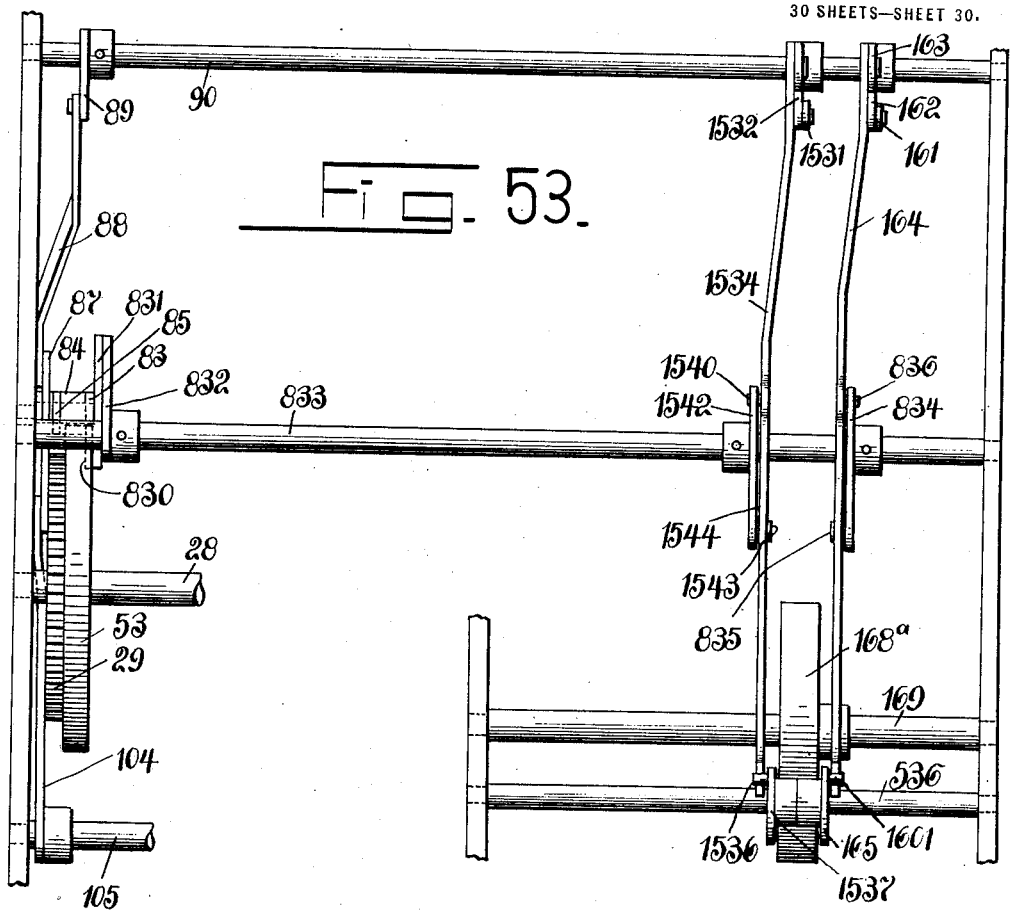
Fig. 53 is a rear elevation of a part of the transfer operating mechanism.
Figure 54:
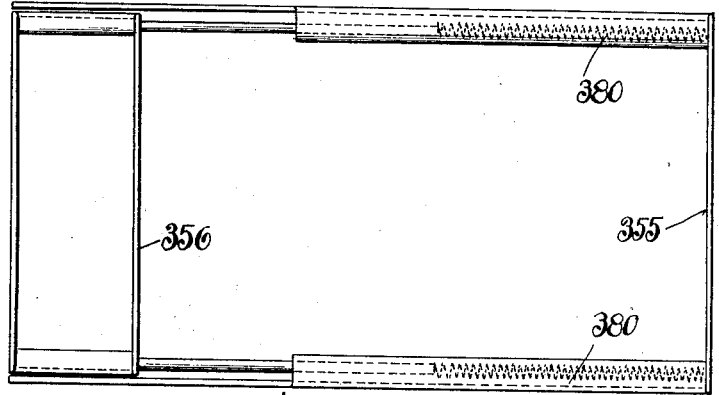
Fig. 54 is a top plan view of the voucher receptacles.

Projecting laterally from this plate 158 (Fig. 6) is a stud 159 supported in the stationary frame 99 and near its outer end having extending downwardly therefrom an arm 160 which is connected by a link 161 to an arm 162 loosely mounted upon the shaft 90. Connected to this arm 162 and projecting rearwardly therefrom is another arm 163 which is connected to the upper end of a link 164, the latter having at its lower end a recess 1600, (Figs. 4 and 50) arranged to engage a pin 1601 projecting from the rearward end of a lever 165 pivoted upon a shaft 536 mounted in the frame work of the machine. The link 164 is connected to the lever 165 upon the depressing of the "cash" key in the following manner:

The arm 83 (Fig. 52) engaged by the pin 82 of the "cash" key has a downwardly extending member 830 to which is connected the forward end of a link 831, the latter being connected at its rearward end to the upper end of an arm 832 secured to a rock shaft 833. This shaft near its right hand end (Fig. 53), which is a rear elevation, has secured thereto a lever 834, the lower end of which is provided with a roller 835, while the upper end is slotted to receive a pin 836 from the link 164. The roller 835 normally supports the link 164 by engaging the underside of a forward extension of said link. When the "cash" key is depressed the shaft 833 through the above described connections will be rocked in a clockwise direction, (Fig. 52), and through its connection with the link as above described rock said link so that the recess 1600 formed therein will engage with pin 1601 projecting from the lever 165. The forward end of the lever 165 is provided with a roller 167 which plays in a cam groove 168 of a disk 168ᵃ secured to one of the main operating shafts 169. The shape of the cam groove 168 is such that shortly after the beginning of the operation of the machine the lever 165 will be rocked in an anti-clockwise direction and if the link 164 is connected thereto the plate 158 will be rocked in a similar direction. By this movement of the plate 158 the frames 156, of which there is one for each denominational element of the totalizer below the highest, will be rocked so that the forward ends of said frame will be positioned to be acted upon by the pins 157 of the actuating gears 112. When one of the pins acts upon the forward end of one of the frames 156 the said frame and arms 146 and 148 carrying said frame will be forced rearwardly due to the yoke formation of the rearward end of the frame engaging with the plate 158. This rearward movement of the frame and the arms carrying it will cause the roller 145 projecting from the arm 146 to engage with the depending arm 142 carried by the lever 140 coöperating with the denominational element of next higher order of the totalizer, and force the hook portion 144 of the depending member in the path of the frame 158.

This rearward movement of the frame 156 is caused during the direct actuation of the gears 112 by the actuating racks 80 and as the transfer is not effected until a time subsequent to this direct operation, the arms 146 and 148 will be held in their adjusted position by the stepped plate 152 at which time the uppermost step engages with the extension 150 of the arm 148. This latching of the extension 150 of the arm 148 by the stepped plate 152 will, through the roller 145 projecting from the arm 146, hold the hook portion 144 in the path of the oscillatory plate 158 so that when the latter is returned to normal position after the direct actuation of the gears 112 by the racks 80, it will engage with the hook portion 144 and lower the depending member 142, which will cause the bell crank 140 to which said member 142 is pivoted to rock in an anti-clockwise direction, by which movement the rack portion 141 of the bell crank 140 will rotate the pinion 114 and gear 112 of the next higher denomination one step in a direction similar to that in which it is driven by the actuating rack. This movement of the gear 112 will impart one degree of movement to the totalizer element 109 through the pinion 111 fastened thereto.

This form of transfer mechanism so far described would answer if in every instance the transfer devices were tripped or set during the direct actuation of the totalizer elements by the actuating racks, but it frequently happens that the transfer devices of one element are set or tripped by the actuation of the transfer devices of the next lower denomination and for this reason it has been found necessary in a great many prior patents successively to actuate the transfer devices of the several elements of the totalizer, but with the devices about to be described all of the transfer devices that are to be effectively actuated are simultaneously instead of consecutively operated.

Whenever a transfer from one element to another element causes the latter element to render effective the transfer devices for the next higher element, it is necessary that the element to which the first transfer is made should stand one step removed from the transferring point which in the decimal system herein shown is at "9," in which position the transfer devices for the next higher element are partially positioned so as to be actuated by a coupling device operated by the previously described oscillatory plate. If the first element to which the transfer is to be made should stand at any other position than nine the transfer devices coöperating with the next higher element would not have been partially operated and consequently the coupling device actuated by the oscillatory plate would not operate upon the transfer device of the next higher element, which operation will be clearly apparent from the following detail description.

In Fig. 39 the totalizer element 109 stands with the numeral "9" at the reading point, at which time one of the pins 157 of the actuating gear 112 for the totalizer element 109 is in engagement with the frame 156 and has moved said frame and the arms 146 and 148 carrying the same slightly rearwardly, by which movement the roller 145 imparts to the depending member 142 of the transfer devices of the next higher denomination a similar movement. This movement of member 142 is sufficient to bring the lower shoulder 143$^a$ formed upon said member by reason of the recess 143 therein to pass beneath a lug 173 projecting from a yoke frame 173$^a$ pivotally mounted upon the shaft 153, but which movement is not sufficient to bring the hook portion 144 of the member in the path of movement of the oscillatory frame 158. The transverse bar of the yoke member 173$^a$ is held in engagement with the shoulder 174 of the depending member 142 of the next lower denomination from that member 142 of the transfer devices with which the lug 173 of the yoke frame 173$^a$ engages. The parts are held in the position in which they appear in Fig. 39, in which position the extension 150 of the arm 148 engages with the second step 151 of the plate 152, by a spring 175, the ends of which are fastened to the depending member 142 and a rearward extension 176 of the bell crank 140.

From this description it will be apparent that the transfer devices that have been completely tripped or set by the totalizer elements passing to zero or beyond will be actuated by the movement of the oscillatory frame 158. This movement of the completely set transfer devices will cause the shoulder 174 formed on the member 142 to rock the yoke frame 173$^a$ in a clockwise direction against the tension of the spring 154 and through the lug 173 projecting from said frame engaging with the shoulder 143$^a$ of the partially set member 142 of the transfer devices of the next higher denomination cause the lowering of said member 142 and thereby the operation of the transfer devices, which operation occurs simultaneously with the operation of the transfer devices of the next lower denomination. By this means it is apparent that the transfer may be simultaneously effected to all of the elements of the totalizer, thereby effecting a considerable saving of time over the transfer devices which are consecutively operated.

Secured to and projecting downwardly from the left hand end of the shaft 153 (Fig. 6) is an arm 1530 to which is connected one end of a link 1531, the other end of the latter being connected to an arm 1532 loosely mounted upon the shaft 90. This arm has extending rearwardly therefrom a member 1533 (Figs. 52 and 53) to the extreme rearward end of which is connected the upper end of a link 1534. At its lower end this link is provided with a recess 1535 arranged to engage with a pin 1536 projecting from a lever 1537 centrally pivoted upon the shaft 536. At its forward end this lever is provided with a roller 1538 that plays in a cam groove 1539 formed in the disk 168ª, in which is also formed the cam groove 168 but on the opposite side of said disk from the groove 1539. The link 1534 has projecting forwardly from the center thereof an extension which is provided with a pin 1540 that plays in a slot portion 1541 formed in the upper end of a lever 1542 secured to the previously described shaft 833. This lever 1542 at its lower end is provided with a roller 1543, which normally rests beneath an extension 1544 of said link. Upon the depression of the cash key 1, the shaft 833 will be rocked, as previously described and through the connections clearly shown in Fig. 52, will cause the lower end of the link 1534 to move rearwardly so that the recess 1535 formed therein will engage with the pin 1536 projecting from the lever 1537. With the parts in this position, the link 1534 will be lowered shortly after the beginning of rotation of the shaft 169, by which means the shaft 153 (Figs. 6 and 38) will be rocked in an anti-clockwise direction. This shaft 153 is provided with recesses 177 into which project pins 178 extending inwardly from the hubs of the step plates 152. As this shaft is rocked, as above described, the forward walls of the recesses 177 formed therein will engage with the pins 178 and rock said plates 152 so as to permit the extensions 150 of the arms 148 to engage with the lower steps of the plates 152. At this same operation the pinions 114 of the selected totalizer are rocked into engagement with the actuating racks 80 and as these pinions are thus moved, they will pass out of engagement with the rack portions 141 of the bell crank transfer devices 140 and thereby permit the springs 175 to return the transfer devices that were operated upon a previous operation.

As the shaft 153 and the plate 158 are not oscillated upon any other transaction but a "cash" transaction, it is obvious that any of the transfer bell cranks 140 that were operated upon a previous operation of the machine will not be permitted to return to their normal position, as shown in Fig. 38, unless a "cash" transaction is to be entered in the machine, due to the fact that the connections for oscillating the shaft 153 and the plate 158 are rendered operative only on the depressing of the cash key. If the shaft 153 and plate 158 were oscillated upon each operation of the machine, regardless of the class of transaction entered therein, the springs 175 would be permitted to return the transfer bell cranks to their normal position, although the pinions 114 were not disengaged from the rack portions 141 of said transfer devices, thereby losing said transfer by the return of the pinions and the totalizer elements connected therewith.

*Turn to zero mechanism.*

All of the totalizer elements are arranged to be simultaneously reset to zero by the operation of a rotary member. Means are also provided for disabling the transfer devices and for withdrawing the locking plate for the totalizer elements that are normally out of coöperative relation with the actuating racks therefor.

The shaft 113 upon which the actuating gears 112 are mounted is provided with two longitudinal recesses 180 (Figs. 38 and 39) with which pawls 181 carried by the actuating gears 112 engage. The pawls 181 are bell crank in formation and springs 182 are interposed between one member of each pawl and the hubs of the actuating gears 112 by which means the other members of the said pawl are held in engagement with the shaft 113. This shaft 113 (Fig. 36) has secured near its right hand end a disk 183 and adjacent to this disk is a similar disk 184 which is provided with a pin 185 (Figs. 42 and 43) that projects into a recess 186 formed in the disk 183. The disk 184 is provided with a hub 187 into which the extreme end of the shaft 113, projects, as shown in Fig. 36. The hub 187 of the disk 184 carries a pin 188, which extends into a groove 189 in said shaft near its right hand end. This pin and groove connection between the hub and shaft enables an independent rotary movement of the hub and at the same time prevents any independent movement of the hub or shaft in a lateral direction. The outer end of the hub or shaft is provided with notches 190 into which notches pins 191 (Fig. 44) carried by a suitable wrench 192 are arranged to enter when the wrench is inserted into the recess of the hub 187 preparatory to the turning of the totalizer elements to zero. The disk 184 is turned by the wrench 192 in the direction of the arrow (Fig. 42) to reset the totalizer elements to zero. The first movement of this disk 184 is independent of the disk 183 carried by the shaft 113 because of the pin and slot connection 185 and 186 respectively, previously described. This movement of the disk 184 independent of the disk 183 causes one of the notches 193 (Fig. 42) to cam an arm 194 in a clockwise direction about its pivot 195 through the agency of a plate 196 carried by said arm. The upper end of the arm 194 is provided with a slot 197 into which projects a pin 198 (Figs. 42 and 43) extending from one of the previously described plates 138, which is secured to the rock shaft 137. This rock shaft extends across the machine and is supported at both ends by the stationary frame 99. Near its other end this shaft is provided with another plate 138, which plates, as previously described, carry the rod 139 upon which rod are mounted the bell crank members 140 of the transfer devices. This rocking of the plates 138 causes the rod 139 to disengage the rack portion 141 of the members 140 of the transfer devices from the pinions 114 (Figs. 38, 39, 42 and 43). The plates 138 (Figs. 36, 38, 39, 42 and 43) have also projecting therefrom pins 199, which pins enter recesses 200 formed in the upper ends of the plates 136 carrying the locking bar 135. As the plates 138 are rocked as above described the projections 134 of the locking bar 135 will be withdrawn from engagement with the teeth of the actuating gears 112 so that the same may be free to be rotated.

Upon the continued rotation of the disk 184 the pin 185 will engage with the end of the slot 186 formed in the disk 183 and thereby cause said disk to be rotated therewith, which disk being fast to the shaft 113 will also cause the rotation of said shaft. As the shaft is rotated one of the longitudinal grooves 180 formed therein will engage with the pawls 181 carried by the actuating gears 112 and cause said gears to be rotated until the totalizer elements 109 are brought to zero position, at which time the disk 184 will be arrested by one of the pins 201 projecting from said disk coming into contact with the hook portion of an arm 202, which arm is suitably mounted upon the stationary frame 99. The hook portion of this arm is normally out of the path of the pins 201 as shown in Fig. 42, but as said disk nears the end of a half rotation one of the pins 201 will engage with the forward edge of an arm 203 pivotally mounted upon the arm 202 and cam said arm rearwardly and upwardly, which movement will be conveyed to its supporting arm 202 by means of a spring 204 thereby bringing the hook portion of the latter arm into the path of movement of the pin 201.

Owing to the slot and pin connection between the disks 183 and 184 the latter disk is given a slight movement greater than a half rotation so as to insure a half rotation being imparted to the disk 183 and the shaft 113 carrying said disk so as to insure the resetting of the totalizer elements. The flowing devices are provided for compelling this excess movement of the disk 184.

The right hand side frame 22 of the machine is provided with a recess 205 having radial notches 206. The pins 191 of the wrench 192 pass through the notches 206 when said wrench is attached to the hub 187 of the disk 184. As the pins 191 enter the notches 190 of the hub 187 the pin 191 extending upwardly from the wrench 192 will engage with the forward end of a spring member 207 (Fig. 44) which is pivoted to the frame 22. As the wrench 192 and devices operated thereby are rotated in an anti-clockwise direction the pin 191 will pass out of engagement with the member 207 and as the shaft and connected parts nears the completion of a half revolution the other pin 191 will engage with the opposite side of the member 207 from that in which the pin engages when the wrench is placed in position to turn the shaft 113 and cause the said member to be rocked about its pivot against the tension of a spring 208. At the end of its half rotation one of the pins is in engagement with the rear edge of the member 207 which partly covers the notch 206 and consequently the wrench 192 cannot be withdrawn. At this time the shaft 113 has not completed a half revolution due to the lost motion between the disks 183 and 184. As the wrench 192 moves the disk 184 slightly beyond the half rotation the pin will pass out of engagement with the member 207 and said member will be rocked about its pivotal point by spring 208 so that the wrench and disk 184 may be given a slight rearward movement, during which movement the pin extending upwardly from the wrench will pass to the forward side of the member 207 thereby permitting the withdrawal of the wrench. This rearward movement of the wrench and disk 184 permits the cam plate 196 (Figs. 42 and 43) to become seated in one of the notches 193 of the disk 184 thereby permitting the return of the locking bar 135 and the restoration of the members 140 of the transfer devices to normal position, as shown in Figs. 38, 39, and 42.

In order to prevent a reverse movement of the shaft 113 while turning the totalizers to zero, said shaft has secured thereto a ratchet 1131 (Figs. 35 and 36) with which a pawl 1132 engages, this pawl being pivoted upon one of the rocking frames 98 supporting the totalizer elements 109.

The cabinet of the machine is provided with an opening 1920, (Fig. 1) through which the turn-to-zero wrench 192 is arranged to be inserted. This opening 1920 is normally covered so as to prevent the insertion of the wrench by the rearward end of an arm 1921, (Fig. 2) which is pivoted to the main frame of the machine as at 1922. This arm 1921 is provided near the center portion thereof with an elongated slot 1923 in which projects a pin 1924 extending inwardly from a lock barrel 1925 suitably secured in the cabinet of the machine, (Fig. 1), and which is arranged to be rotated by a key in the hands of an authorized person. As this lock barrel is rotated, the end of the lever 1921 covering the opening 1920 will be withdrawn so as to permit the insertion of the turn-to-zero wrench. Incidentally with the withdrawal of the end of the lever 1921 from the opening 1920, an arm 1926 secured to and extending downwardly from the lever 1921 passes into engagement with a shoulder 1927 (Figs. 2 and 34) of a disk 1928 secured to the gear 504 and thereby prevents the rotation of said gear and consequently the operation of the machine. When the machine is operated with the lever 1921 covering the opening 1920, the surface of the disk 1928 will engage with the gear edge of the arm 1926 and thereby prevent the withdrawal of the lever 1921 from the opening 1920 so as to prevent tampering with the registering mechanism during an operation of the machine.

*Sales slip printer.*

As previously stated, this machine is designed to print in triplicate upon a sales slip the amount of the transaction, the date and consecutive number, as well as a symbol for designating the cashier. A portion of this slip is arranged to be severed and deposited in one of a plurality of receptacles depending on whether the sales are made by a clerk assigned to a particular cashier or made by a clerk foreign to that cashier.

Extending upwardly from the second, third, fourth, fifth and sixth shafts 77 from the front of the machine (Figs. 4 and 6) are arms 2055 the upper ends of which are slotted as at 2066 so as to engage pins 2077 projecting from the rack plates 78 operated under the control of the amount manipulative devices 2. Near the left hand end of these shafts 77 looking from the front of the machine are secured arms 2088 (Figs. 4, 6 and 47) which extend downwardly therefrom and at their lower ends are connected to the rearward ends of links 209, the latter being connected to type segments 210 pivotally mounted upon a rod 211 (Figs. 4, 23 and 28) which rod is suitably supported by intermediate frames 212. From this description it will be seen that the type segments 210 are adjusted in accordance with the extent of movement imparted to the rack plates 78 under the control of the amount manipulative devices.

The center shaft 77 or the seventh one from the front of the machine is differentially adjusted under the control of the transaction keys 1 and upon this shaft is loosely mounted a sleeve 213, which sleeve is adjusted under the control of the foreign key 6 in a manner similar to the shafts controlled by the amount and transaction manipulative device. This sleeve (Figs. 10 and 47) has extending downwardly therefrom an arm 214 which is connected to the rearward end of a link 215, the latter being connected at its forward end by a type carrier 216 mounted upon the rod 211 adjacent to the amount type carriers 210 (Fig. 28). This type carrier 216 is provided with a single character F for designating upon a sales slip that the transaction is made by a clerk foreign to the cashier operating the machine.

Adjacent to the amount and foreign type carriers are located type carriers 217 and 218 for printing the days and months, respectively which type carriers are loosely mounted upon a rod 219 suitably supported by the intermediate frames 212 (Fig. 28). Each of these type carriers is provided with a pinion 220 with which similar pinions 221 engage, these latter pinions being loosely mounted upon the aforementioned rod 211. Meshing with the pinions 221 are pinions 222 (Figs. 8 and 23), the said pinions in the latter view being shown by pitch lines only. These pinions 222 are loosely mounted upon a rod 223 suitably supported in the intermediate frames 212 and located above said pinions is a shaft 24 which has fast thereon a pinion 225, this latter pinion being normally out of engagement with any of the pinions 222. The shaft 224 extends through the left hand side of the machine and is provided with a knurled knob 226, by which said shaft may be rotated. When it is desired to adjust the dating wheels, the shaft 224 is moved toward the left (Fig. 8) by the operator, so as to bring the pinion 225 into engagement with either of pinions 222 which are connected to the dating wheels 217 and 218. The shaft 224 is held in the position shown in Fig. 8 by a coil spring 227 which surrounds said shaft with the ends thereof abutting against the hub of pinion 225 and one of the intermediate frames 212. In order to indicate when a pinion 225 is in engagement with one of the pinions 222 the said shaft 224 is provided with annular recesses 228 with which engages a spring member 229. When the shaft is withdrawn toward the left of Fig. 8, the spring member 229 engages one of the recesses 228 formed in said shaft and by offering a slight resistance to the further withdrawal of said shaft indicates the fact that the pinion 225 is in engagement with one of the pinions 222. Connected to the pinions 222 are similar pinions 230 which are suitably connected to indicating wheels 231 for indicating the month and day through an opening 232 formed in the front of the cabinet of the machine as shown in Fig. 1.

Mounted upon the rod 219 (Fig. 28) adjacent to the dating wheels are a series of consecutive numbering wheels 234, each of which is provided with a pinion 235 that engages with a similar pinion 236 mounted upon the rod 211. Adjacent to the consecutive numbering type carriers 234 is a type carrier 237 carrying symbols for designating the cashier operating the machine. This type carrier 237 is provided with a pinion 238 which meshes with a similar pinion 239 loosely mounted upon the rod 211 (Figs. 28 and 29). The pinion 239 engages with a pinion 240, the latter in turn engaging with a similar pinion 241 secured to a shaft 242, which shaft is supported by the frame work of the machine. Near its left hand end (Figs. 8, 29 and 30) the shaft 242 is provided with a disk 243, the latter having radial recesses 244 formed therein. Secured to the left hand side frame 22 are two lock barrels 245 each of which carries a pin 246 arranged to coöperate with one of the recesses 244 formed in the disk 243. These lock barrels are under the control of cashiers who may be designated as A and B. When cashier A inserts the key in the lock barrel 245 and turns it in a clockwise direction, the pin 246 formed thereon will engage the slide of the slot 244 and rotate the disk 243 in an anti-clockwise direction. This disk being secured to the shaft 242 will rotate said shaft in a similar direction and through the pinions 238, 239, 240 and 241 rotate the type carrier 237 so as to bring the A type into printing position. This rotation of the disk 243 will bring the periphery of said disk into contact with the pin 246 of the lock barrel 245 of cashier B and thereby prevent rotation of this lock barrel by its key. The disk 243 has pivoted thereto a link 247, the upper end of which is connected to an arm 248 which is loosely mounted upon the shaft 58 and extending rearwardly therefrom. The rearward end of this pawl 248 when the parts are in the position as shown in Fig. 29, engages the shoulder 249 of a disk 250 secured to the gear 25 and thereby prevents rotation of said gear and consequently the operation of the crank handle to which said gear is connected, as previously described. Upon the rotation of the disk 243 by cashier A, the pawl 248 will be withdrawn from engagement with the shoulder 249 by the link 247, thereby freeing the disk 250 and gear 25. Upon the operation of the lock barrel 246, by cashier B, the disk 243 is rotated in the opposite direction from that in which it is rotated by the operation of the lock barrel belonging to cashier A and consequently rotates the type carrier 237 so as to bring the B character into printing position. This movement of the disk 243 by the lock barrel B withdraws the pawl 248 from engagement with the shoulder 249 in the manner described in connection with the operation of the disk by the lock barrel A.

The pinions 221, 236 and 239 mounted upon the rod 211 (Figs. 8 and 28) are connected through a train of pinions 251 (Figs. 8 and 23) to pinions 252 connected to the ends of a series of nested sleeves 253 which are mounted upon a shaft 254 suitably supported in the frame work of the machine. These nested sleeves at the other end are connected to type carriers for recording the date, consecutive number and the cashier symbols on a record strip, as hereinafter more particularly described.

The consecutive number pinions of the gearing 251 that mesh with the pinions 252 secured to the nested sleeves 253 (Figs. 23 and 33) are provided with ratchet wheels 255 which are actuated by a multiprong pawl 256 carried by a yoke shaft frame 257, which is fast to a shaft 258 supported by the intermediate frames 212. This shaft 258 (Fig. 8) has secured thereto an upwardly extending arm 259 (Fig. 33) having a slot 260 in which plays a pin 261 projecting from an arm 262 which is pivotally mounted at its lower end upon a shaft 105 mounted in the intermediate frame 212. At its upper end this arm 262 carries a roller 264 which plays in a cam groove 265 formed in a disk 266 secured to the shaft 28. The shape of this cam groove is such that the arm 262 is reciprocated at each rotation of the shaft 28 and through the slot and pin connection with the arm 259 rocks the shaft 258 so that the yoke shaped frame 257 carrying the multiprong pawl 256 will actuate the ratchet wheel 255 connected with the units pinion 251. This movement of the pinion 251 will be transmitted through the intermediate gear to the units type wheel of the group of consecutive numbering type carriers 235 for printing upon the sales slip and also to a similar type carrier for printing upon the record strip, as hereinafter described.

Before an impression is taken from the adjusted type carriers alining devices for the different series of type carriers are brought in operation so as correctly to aline the type carriers that are in printing position. This mechanism is operated as follows.

Meshing with the gear 26 (Fig. 4) is a similar gear 267 mounted upon a stub shaft 268 projecting from the left hand side frame of the machine. This gear 267 has secured thereto a disk 269 (Figs. 8 and 32) having a cam slot 270 formed therein in which slot plays a roller 271 projecting from an arm 272 pivotally mounted upon a stud 273 screwed into the left hand side frame of the machine. Contacting with the rearward edge of the arm 272 is a pin 274 which projects from an arm 275 also mounted upon the stud 273. To the upper end of this arm 275 is connected the rearward end of a link 276 (Figs. 23 and 31) which link at its forward end is connected to a yoke frame 277 which is pivotally mounted on two of the intermediate frames as shown in Fig. 31. The horizontal arm 278 of this yoke frame 277 is arranged to engage with teeth 279 formed in the amount type segments 210 and thereby aline said segments. A spring 280 (Figs. 8 and 31) surrounding the stud 273 tends normally to force the alining frame 277 in engagement with the teeth 279 of the type segments 210 but is restrained by the pin 274 projecting from the arm 275 contacting with the rearward edge of the arm 272 which, as previously described, is mounted upon stud 273. When the cam groove 270 formed in the disk 269 moves the arm 272 forwardly, the spring 280 causes the arm 275 to follow the arm 272 and through the link connection 276 causes the alining frame 277 to engage with the teeth of the amount type carriers 210.

This yoke frame 277 has extending forwardly therefrom an arm 281 provided with a pin 282, which projects into a slot 283 formed in one of the arms of a yoke frame 284 pivotally mounted between two of the intermediate frames 212 (as shown in Figs. 23 and 31). When frame 277 is moved forwardly to engage the teeth of the amount type carriers, the pin 282 will engage the end of the slot 283 and carry the yoke frame 284 forwardly so that fingers 285 projecting from said frame will engage with alining wheels 286 secured to the pinions 221, 236 and 239 which mesh with companion pinions secured to the dating, consecutive numbering and cashiers' type carriers and thereby properly aline said type carriers. The link 276 is provided with a cam slot 287 (Fig. 23) in which plays a pin 288 projecting from an alining frame 289 pivotally mounted in two of the intermediate frames 212 shown in Fig. 31. A cross bar of this frame 289 is cammed upwardly when the link 276 moves forwardly so that said cross bar will engage recesses 290 formed in disk 291 secured to the pinions 252 which are fast to the nested sleeves 253 and thereby aline the consecutive numbering, dating and cashiers' type carriers that record upon the record strip.

Three impressions are arranged to be taken upon the sales slip 292 (Fig. 49) one of said impressions being upon the original of the sales slip, the remaining two upon the duplicate portion of the slip, the duplicate portion of the slip being severed between the impressions thereon and the severed portion deposited in either one of two receptacles, depending on whether the transaction is made by a clerk operating under the cashier in charge of the machine or a clerk foreign to the cashier. The slip 292 is placed upon a table 293 and moved rearwardly until its lower edge contacts with the movable knife 294 (Fig. 23) the slip being guided upon the table 293 by flange 295 projecting upwardly from the inner edge of the table and a plate 296 secured to and suitably elevated from the table 293 so that a slip when placed upon the table passes beneath the plate 296.

The gear 26 (Fig. 4) has formed in the outer face thereof a cam groove 297 in which plays a roller 298 mounted upon the rearward end of an arm 299 secured to a rock shaft 300 suitably supported by the machine frame. At its inner end this rock shaft has extending downwardly therefrom an arm 301 (Figs. 8 and 23) which arm is forked at its lower end as at 302 and into which forked portion a pin 303, projecting from the vertical arm of a bell crank lever 304, extends. This bell crank 304 is loosely mounted upon a rock shaft 305 and the outer edge of the horizontal arm of said bell crank is provided with rack teeth 306 (Figs. 23 and 25), which mesh with a pinion 309$^a$ secured to a shaft 308 to which is also secured a feeding roller 309 for the sales slip. The shape of the cam groove 297 formed in the gear 26 is such that the segmental rack portion 306 of the bell crank 304 will first rotate the roller 309 in a clockwise direction and then rotate said roller in the opposite direction a greater distance than which it is first rotated.

Previous to the rotation of the roller 309 by the segmental rack portion 306 of the bell crank 304, the said roller is moved into contact with another roller 310 suitably supported in the frame work of the machine by the following described mechanism:

Pivoted upon a stub shaft 311 (Fig. 4), is a lever 312, the upward extending member of which is provided with a roller 313 that plays in a cam groove 314 formed in the side of a gear 315, which gear meshes with the aforementioned gear 267. Pivoted to and extending forwardly from the downwardly extending member of lever 312 is a link 316 having pins 317 thereon, which project into elongated slots 318 formed in a companion link 319 which link is connected to the lower end of an arm 320 secured to a shaft 321, upon which shaft are loosely mounted arms 322 carrying the lower feed roller 309. The arms 322 are connected by a cross rod 323 (Figs. 4, 9 and 23), which cross rod rests upon an arm 324 secured to and projecting forwardly from the rock shaft 321. The shape of the groove 314 formed in the gear 315 (Fig. 4) is such that upon the beginning of operation of the machine, the lever 312 is rocked in an anticlockwise direction, thereby moving the link 316 forwardly. This link 316 is connected with the link 319 by a coil spring 325 which spring, as the link is moved forwardly causes the link 319 also to be moved forwardly and thereby rock the shaft 321, which shaft through the arm 324 engaging with the cross rod 323 will carry the feed roller 309 through an opening 326 formed in the table 293 and into contact with the companion feed roller 310 thereby gripping the slip 292 between said rollers. After the rollers are brought into contact with each other, the cam groove 297 formed in the gear 26 (Fig. 4) comes into operation and through intermediate connections, as previously described, first moves the bell crank lever 304 in an anticlockwise direction, which lever through the rack 306 formed thereon will rotate the roller 309 in a clockwise direction and thereby feed the sales slip forwardly upon the table 293 so that the lower portion of the duplicate part of the sales slip will be brought into position to receive an impression from the alined type carriers by the hammers 326 and 327. After this impression has been taken, the roller 309 is rotated reversely a short distance carrying the slip rearwardly upon the table 293 so as to be in position to receive a second impression upon the duplicate portion of the sales slip, after which impression the roller 309 is rotated farther in an anticlockwise direction which results in the sales slip 292 being carried farther rearwardly upon the table 293 so that a third impression may be taken, which impression is taken upon the original portion of the sales slip. During the feed of the sales slip between the taking of the second and third impressions thereon, the extreme lower end of said strip bearing the first impression will be fed through a stationary knife 328 and beneath a movable knife 294, after which feeding operation the movable knife is lowered and that portion of the duplicate part of the slip bearing the first impression is severed and deposited in one of two receptacles, as hereinafter described.

The movable knife 294 is frictionally held in engagement with the stationary knife by springs 329 (Figs. 9 and 23) which springs are interposed between said knife and a frame 330 mounted upon a stub shaft 331. This frame 330 has secured thereto an upwardly extending arm 332 which is provided at its upper end with a roller 333 that plays in a cam groove 334 formed in a disk 335 secured to the gear 315. Projecting forwardly from the frame 330 are pins 336 which extend into recesses 337 formed in movable knife 294. As previously stated, knife 294 forms an abutment against which the inner end of the slip contacts when said sales slip 292 is first placed upon the table 293. The shape of the cam groove 334 formed in the disk 335 is such that the knife is first elevated above the opening formed in the stationary knife 328 through which the sales slip passes when first placed upon the table 293, in which position the movable knife is held until the sales slip is fed rearwardly into position to receive the third impression thereupon, at which time, as previously stated, the extreme lower end of the slip having the first impression thereon is carried beyond the movable knife, and the knife then lowered to sever that portion of the slip containing the first impression.

As has been described, the amount type carriers 210 are pivotally mounted upon the rod 211 while the dating, consecutive numbering and cashiers' type carriers are mounted upon the rod 219. This mounting of the type carriers upon separate supporting devices might possibly cause a slight misalinement of said type carriers whereby an uneven pressure might be obtained if a single platen were employed to take an impression from the various sets of type carriers, and for this reason separate platens are employed with an equalizing device between said platens whereby a common actuating means may be employed for the different platens and still a perfect impression obtained from the various sets of type carriers.

The platens 326 and 327 are carried by yoke frames 338 and 339, respectively, (Figs. 9 and 23) which are loosely mounted upon a cross rod 340 supported by the frame work of the machine. The platen 326 is arranged to take an impression from the amount and foreign type carriers, while the platen 327 is arranged to take impressions from the remaining type carriers that print upon the sales slip. An equalizing device in the form of a centrally pivoted arm 341 extends beneath the cross bars of the yoke shaped frames 338 and 339 which support the platens 326 and 327 respectively. This arm 341 is pivotally mounted upon a member 342 loosely mounted upon the previously described rock shaft 305. Secured to this rock shaft is a yoke shaped frame 343 (Figs. 23 and 24) against the cross member of which frame an adjusting screw 344 mounted in the member 342 contacts. The outer end of this shaft 305 (Fig. 4) has extending rearwardly therefrom an arm 345, which arm is connected by a link 346 to an arm 347 projecting forwardly from the screw stud 273. The arm 347 at its extreme forward end is provided with a roller 348 which plays in a cam groove 349 formed in the previously described gear 267. The shape of this cam groove 349 is such that the shaft 305 is rocked three times during a rotation of the gear 267 so as to carry the platens 326 and 327 into contact with their respective type carriers. From this description it will be seen that if one set of type carriers should happen to be a fraction lower than the remaining set of type carriers, the equalizing bar would be so tilted as to carry both platens against their respective type carriers with an equal pressure. Springs 350 (Figs. 23 and 24) return the platens to the position shown in Fig. 23 after said platens have been moved to take the impression from their type carriers.

An inking ribbon 351 (Figs. 4, 23, and 25) is arranged to be fed from a spool 352 to a spool 353 and automatically reversed. This ribbon in passing from one spool to another is guided by guide rolls 354 suitably supported by the frame work. The mechanism for automatically reversing the feeding of the ribbon is clearly shown in Fig. 25, but as it is not to be claimed in the present application a detail description of same will not be given, it being sufficient to state that the shifting of the feed pawls for the spools is controlled by the diminishing diameters of said spools.

As previously stated the voucher portion of all slips used for sales made by the clerks operating under a particular cashier are deposited in one receptacle and the voucher portion of slips used for sales made by clerks foreign to the cashier are deposited in a separate receptacle, so that at the end of the day's business, these foreign sales, as indicated by the foreign vouchers, may be taken to the proper cashiers under which these foreign clerks operate and be recorded upon their respective machines so that the total sales of the foreign clerks may be subsequently accumulated when the record strips, as hereinafter described, are passed through the auditing machine. These receptacles for the vouchers are arranged so that one is slidingly mounted within the other and the vouchers of the sales of the regular clerks are deposited in the foremost one of the receptacles, during the depositing of which the rearmost or foreign receptacle is given a vibratory movement for the purpose of distributing the vouchers in the foremost or regular receptacle. When a sale is made by a foreign clerk, the foreign receptacle is shifted so as to bring said receptacle into position to receive the voucher severed from the sales slip.

Referring to Figs. 9, 18, 20 and 54, it will be seen that the large receptacle 355 which is the one that receives the vouchers of the sales made by the regular clerks, has its rearmost wall cut away and the foreign receptacle 356 located in the rear end of the receptacle 355. A roller 357 carried by the lower end of an arm 358 (Figs. 18 and 20) bears against the rear wall of the foreign receptacle 356. This arm 358 is mounted upon a cross rod 359 supported by the intermediate frames 212 and projecting from its center is a pin 360 which plays in the forked upper end of an arm 361 loosely mounted upon the shaft 311. This arm 361 is secured to one end of a sleeve 362 surrounding the shaft 311 and the other end of which sleeve has an upwardly extending arm 363 secured thereto, which arm at its upper end carries a roller 364 resting upon the surface of a cam disk 365 secured to the gear 315 and the cam disk 335 for operating the movable knife 294. The cam portion of the disk 365 is just slightly higher than the remaining surface of the disk 365 so that as the said disk revolves it will impart a slight vibratory movement to the arm 363 carrying the roller 364 and through the above described connection, as shown in Fig. 18, impart a vibratory movement to the arm 358 which will cause the foreign box 356 to receive a similar movement within the regular receptacle 355, by which action the vouchers deposited in the regular receptacle will be distributed, instead of piling up on top of each other.

It will be recalled that the plate 78 adjusted under the control of the foreign key is connected by one of the arms 2055 (Figs. 4 and 6) to the sleeve 213 which surrounds the center shaft 77. This sleeve (Figs. 4, 6 and 10) has projecting downwardly therefrom an arm 366 to which is pivoted one end of a link 367, the other end of said link being attached to the arm 368 secured to the rearmost shaft 77. This shaft at its extreme right hand end (Fig. 10) has extending rearwardly therefrom an arm 369 (Figs. 4, 6 and 10) which is connected to the upper end of a link 370, the lower end of the latter being connected to an arm 371 loosely mounted upon a stud 372 projecting from the left hand side frame (Figs. 18 and 20). This arm 371 is connected by a sleeve 373 to a forwardly extending arm 374, the extreme forward end of which is inclined as at 375 for the purpose of imparting a camming action to the sleeve 362 carrying the arms 361 and 363.

When the sleeve 213 is rocked under the control of the foreign key 6, the rearmost shaft 77 (Figs. 4, 6 and 10) will be rocked in a similar direction and through the arm 369 and link 370 rock the arms 371 and 374 about the stud 372 in an anti-clockwise direction. This movement of the arm 374 will raise the inclined portion 375 slightly above an offset 376 of the arm 363 so that a coil spring 377 interposed between a collar 378 secured to the shaft 311 and the arm 361 will shift the sleeve 362 carrying the arms 361 and 363 to the left (Fig. 18) so that the roller 364 will be brought upon the surface of a cam disk 379, the latter, as well as the cam disk 365, being secured to the gear 315 and the disk 335. The camming portion of the disk 379 is much greater than that of the disk 365 so that as the gear 315 is rotated with the roller 364 in engagement with the cam disk 379, the arms 363 and 361 will be rocked a corresponding greater distance than when the shoulder is in engagement with the disk 365. This rocking movement of the arms 363 and 361 will be conveyed to the arm 358 which movement will cause the foreign voucher receptacle 356 to be moved forward within the regular voucher receptacle 355, so as to be in position to receive the voucher portion of the severed slip. Toward the end of the operation, the foreign voucher receptacle 356 and actuating mechanism therefor will be forced back to their normal positions by springs 380 (Figs. 9 and 54) mounted within the regular voucher receptacle and bearing against rods 3800 projecting forwardly from the foreign voucher receptacle. The sleeve 213 actuated by the plate 78 controlled by the foreign key will be positively returned to its normal position in the same manner as that described in connection with the shafts 77, which are connected to the actuating racks driven under the control of the amount keys. This return of the sleeve 213 will, through the connections previously described, restore the rearmost rock shaft 77 to its normal position and through the arm 369 and link 370 force the arms 371 and 374 in a clockwise direction and through the inclined portion 375 of the arms 374 cam the sleeve carrying the arms 361 and 363 to the right (Fig. 18) against the tension of spring 377, thereby bringing the roller into coöperative relation with the cam disk 365, in which position the parts will remain until another sale is made by a foreign clerk, at which time the parts will assume the position just previously described.

*Record strip printer.*

This machine is also provided with a record strip upon which is recorded the amount of each transaction, the class of transaction, and a composite number representing the clerk, department and station, a symbol designating the cashier, consecutive number and the date. This data is recorded from independent groups of type carriers and between the different recorded data the strip is arranged to be perforated with characters designating the class and amount of transaction, the department in which the sale is made and the clerk making the sale. A novel form of feeding devices for the record strip is also provided, whereby the strip is fed in one direction to a position to receive the perforated characters and then fed intermittently in a reverse direction to receive the printed data from the different groups of type carriers. In the rearward feed of the strip to the type carriers the same amount is not fed as when the strip is moved forward to the perforating devices and to take up this slack in the strip a suitable winding device is provided.

A movable frame 381 (Figs. 2, 9, 12, 16 and 17) carries the supply roll 382 and the storage roll 383 for the record strip 384. The frame 381 has anti-friction rollers 385 projecting therefrom, which rollers play within tracks 386, which tracks are in turn slidingly supported by rollers 387 projecting from the rear frame of the machine and from uprights 388 projecting from the base of the machine. To prevent sagging of the movable frame 381 carrying the supply and storage rolls for the record strip, the said frame has projecting toward the left therefrom brackets 389 which brackets at their extreme left hand end are provided with rolls 390 that play within the tracks 386 in a manner similar to the rollers 385. From this it will be apparent that the frame 381 is telescopically mounted, that is the frame 381 rides within the tracks 386 and the tracks ride within the stationary rollers 387 projecting from the rear frame of the machine and from the uprights 388. As the frame 381 is withdrawn from the machine, the right hand rollers 385 (Figs. 16 and 17) after the frame has been withdrawn a certain distance will contact with the flanges of the tracks 386 and by continued movement of the frame 381, the rollers will carry the tracks with said frame, the said tracks being guided by the aforesaid rollers 387. The right hand end of the cabinet of the machine is cut out, as shown in Fig. 1, and is provided with a plate 392 which plate is securely held in position by a lock 393 so as to prevent the unwarranted withdrawal of the frame 381 carrying the record strip 384. This telescopic mounting of the record strip frame is for the purpose of permitting the withdrawal of said frame a considerable distance to one side of the machine proper so that the record strip may be readily adjusted upon said frame. When the frame is returned within the machine, the rollers 390 projecting from the brackets 389 will contact with the flanges 394 projecting from the tracks 386 and thereby move said tracks inwardly as the frame 381 continues its inward movement. As the frame 381 moves to its inner position tapered pins 395 pass into recesses 396 formed upon the side plates of the movable frame and thereby rigidly support said frame and mechanism carried thereby in proper alinement to coöperate with other mechanisms hereinafter described. These tapered pins 395 are carried by brackets 397 extending from the base and rear frame of the machine.

Referring now to Figs. 4 and 9 the novel form of feeding mechanism heretofore mentioned will be described.

Secured to a shaft 398 is a disk 399 having notches 400 cut in the periphery thereof. Adjacent to this disk and loosely mounted upon the shaft 398 is an arm 401, at the outer end of which arm is pivotally mounted a spring pressed pawl 402, which engages with the notches 400 of the disk 399. A link 403 connects the arm 401 with the lever 404, the latter being pivotally mounted as at 405 to the left hand side frame of the machine. The upper end of the lever 404 is provided with a roller 406 which plays in a cam slot 407 formed in a gear 408, the latter meshing with the previously described gear 267. The shape of the cam groove 407 is such that during the first half rotation of the gear 408, the notched disk 399 will be rotated in an anti-clockwise direction to the extent of approximately three notches or about three tenths of a rotation. The feeding pawl 402 will be temporarily held in this advanced position, due to the shape of the cam groove 407, and while in this position, a bell crank lever 409 pivotally mounted upon the left hand side of the machine frame will be rocked in an anti-clockwise direction by a pin 410 projecting from the gear 315 contacting with the horizontal arm of said bell crank 409. This rocking of the bell crank 409 will cause the vertical member thereof to contact with a pin 411 projecting from the feed pawl 402 and withdraw said pawl from engagement with one of the notches 400 of the disks 309. Immediately after the disengagement of the pawl 402 from its notch 400, the arm 401 carrying said pawl will start on its return movement and will ride upon the surface of the disk 399 until the pawl is forced into the next notch 400 of said disk by its spring, the remainder of the return movement of said pawl being then imparted to the disk 399. This disk 399 (Fig. 9) has secured thereto a smaller disk 412, the latter having extending laterally therefrom pins 413 which, when the parts are in normal position, rest in recesses formed in a disk 414 secured to one end of a tube 415 surrounding shaft 398, the other end of said tube having secured thereto a gear wheel 416. This gear wheel 416 (Figs. 2, 9, 12 and 21) engage with a pinion 417 mounted upon one of the side frames of the movable record strip frame 381 previously described. The pinion 417 meshes with another pinion 418 secured to a shaft 419 which shaft carries the lower set of feed rollers 420 for the record strip. The upper set of feed rollers 421 are carried by a shaft 422 which has secured thereto a pinion 423 meshing with the pinion 418. The shaft 422 carrying the upper set of feed rollers 421 is mounted in side plates 424 (Figs. 14 and 21) which are slidingly mounted in the side frames of the record strip frame 381. Springs 425 are interposed between offsets of the plates 424 and pins 426 of the side frames and the movable record strip frame, so as normally to hold the upper set of feed rollers 421 in contact with the lower set of feed rollers 420. A rod 427 is suitably supported within the record strip frame and at its outer end has secured thereto a plate 428 (Figs. 2 and 21) which plate is provided with a knob 429 so that said shaft 427 may be rocked when desired. A pin 430 extends through a recess 431 and limits the movement of said plate and the shaft 427. The shaft 427 has notches 432 cut therein, as shown in Fig. 21, into one of which notches the lower end of one of the said plates 424 supporting the shaft for the upper feed rollers projects, while into the other one of said notches the lower end of a plate 433 projects, which plate is slidingly mounted upon one of the frames of the record strip holder by a suitable slot and pin connection 434. When the shaft 427 is rocked by the movement of the plate 428, the notches 432 will cam the plates 424 and 433 upwardly by which movement the shaft 422 carrying the upper set of feed rollers 421 will be slightly elevated, thereby withdrawing the upper set of feed rollers from engagement with the lower set of feed rollers so that the record strip may be readily adjusted between said feed rollers. Upon the movement of the shaft 427 back to its normal position, as shown in Fig. 21, the springs 425 will return the upper set of feed rollers 421 into engagement with the lower set of feed rollers, it being understood that the pinions 423 and 418 remain in engagement during the movement of the feed rollers into and out of engagement with each other.

The record strip 384 is fed from the supply roll 382 between the feed rollers 420 and 421 and thence over a guard plate 435 to the storage roll 383. Previous to the passing of the record strip between the feed rollers 420 and 421, the said strip passes below type carriers 436, 437, 438 and 439, which record upon said strip a symbol designating the cashier, the consecutive number, the date and the amount of the transaction, respectively. As the strip passes beyond the before mentioned feed rollers it passes beneath type carriers 440, 441 and 442 which record, respectively, upon said strip a composite number designating the clerk, department and station; a character representing whether the transaction is made by a foreign or regular clerk and the kind of transaction. Beyond this last group of type carriers is located the perforating means, hereinafter more particularly described, which perforating means is arranged to perforate characters in the record strip between the data recorded by the two groups of the before mentioned type carriers.

The record strip 384 passes between guide plates 3840 (Figs. 12, 14 and 15) which plates are supported upon a cross rod 3841 mounted in the sides 381 of the movable frame carrying said record strip, one of which plates is drawn toward the other by a spring 3842. The purpose of these guide plates is to hold the strip in true alinement as it is fed by rollers 422 and 423 to the printing and perforating means hereafter described in detail.

The amount type carriers 439 for recording upon the record strip are similar to the amount type carriers 310 for recording upon the sales slips and are connected by links 443 (Fig. 2) to downwardly extending arms 444 secured to the cross shafts 77 that are actuated by the members driven under the control of the amount manipulative devices 2. The type carriers 438 for recording the date (Fig. 8) are connected by the nested sleeves 253 to the pinions 252 which in turn are connected to the date type carriers for recording upon the sales slip through intervening gearing, as previously described in detail. The consecutive numbering type carriers 437 are connected through nested sleeves 253 and intervening gearing to corresponding type carriers for recording upon the sales slip. The type carrier 436 for recording the cashiers designation upon the record strip is connected in a manner similar to the previously described type carriers to its corresponding type carrier for recording upon the sales slip. The type carriers 440 for recording upon the record strip composite characters designating the clerks number, the department and the station number are connected by links 445 (Figs. 2 and 8) to arms 446 extending downwardly from the shafts 77 which are rocked under the control of the manipulative devices 3, 4 and 5 representing the clerks, and the department and stations, respectively. The type carrier 441 for recording whether a transaction is made by a foreign or regular clerk is connected to the sleeve 213 surrounding the shaft 77 which is positioned under the control of the special transaction keys 1, the said sleeve in turn being controlled under the foreign key 6. The transaction type carrier 442 for recording upon the record strip is connected to its shaft 77 in a manner similar to the before mentioned type carriers so that any adjustment of said shaft under the control of the special keys 1 will also be imparted to the type carrier so that a character will be recorded upon the record strip corresponding to the key operated. The above mentioned type carriers for recording upon the record strip are suitably mounted in an auxiliary frame 4390 (Figs. 2 and 8) which frame in turn is supported by the main frame work of the machine. The auxiliary frame 4390 has mounted therein a shaft 4395 (Figs. 2, 8 and 55) which shaft is provided with an alining frame 4396 arranged to aline the type carriers 440, 441 and 442. This shaft has extending upwardly therefrom an arm 4397 having a roller 4398 which plays in a cam groove 4399 formed in the disk 1928 secured to the gear 504. The shape of this cam groove is such that after the type carriers have been properly adjusted, the alining frame 4396 will be rocked into engagement with the above mentioned type carriers and hold said type carriers in proper alinement while an impression is taken therefrom. To the frame 4396 is connected one end of a link 4400, the other end of which is connected to an alining frame 4401 for the amount type carriers 439, which alining frame through this link connection 4400 will be rocked to aline the type carriers 439 simultaneously with the operation of the alining frame 4396 for the rearmost set of type carriers.

In the operation of the machine the type carriers 436, 437, 438 and 439 for recording the cashier's symbol, consecutive number, the date and the amount of the transaction is the group from which the last impression is taken, after which there is no feeding of the strip until the succeeding operation of the machine. By reference to Figs. 2 and 12 it will be seen that these type carriers are the farthest removed from the perforating devices and as it is essential that the perforating characters of the succeeding transaction be entered upon the strip beyond the last recorded item, it is necessary that the last impression from the succeeding operation upon said strip be carried beyond the perforating means, which is accomplished by the feeding operation previously described in connection with Figs. 4, 9, 12 and 21. After the record strip has been perforated, the said strip will be fed reversely, that is toward the front of the machine, (Fig. 2) a slight distance, so that the perforations thereon will come between the two groups of type carriers shown in said figure at which time an impression is taken from the rearmost group of type carriers. After this impression the strip is again fed a slight distance toward the front of the machine so as to bring the record strip in position to receive an impression from the foremost group of type carriers adjacent to the companion perforations, as shown in Fig. 48 of the drawing. In this figure the perforated and recorded data appearing between two of the dotted lines pertain to a single transaction.

It will be recalled that during the reverse movement of the arm 401 (Fig. 4) the feeding pawl carried thereby will be partially disabled so that the reverse feed of the record strip 384 is not as great as the forward feed imparted to said record strip and to take up this slack in the strip the following mechanism is provided:

Secured to the record strip storage roll 383 is a ratchet 447 (Fig. 2) with which a pawl 448 engages, this pawl being carried by an arm 449 loosely mounted upon the shaft 398. Pivotally mounted upon one of the side plates of the frame 381 carrying the record strip is a bell crank 450, the vertical arm of which is connected by a link 451 to the arm 449 carrying the pawl 448. The horizontal arm of the bell crank 450 is provided with a roller 452, which is held by spring 4550 into engagement with the surface of a cam plate 453 secured to a hub 454 (Figs. 2, 18 and 19) which hub has secured thereto one end of a tube 455, the other end of the latter being secured to the hub of a disk 456 which is connected by pins 457ª to the previously described cam disk 365 for imparting the vibratory movement to the foreign voucher receptacle.

As the record strip is fed from a supply roll 382 by the mechanism shown in Fig. 4, the cam plate 453 (Fig. 2) will engage with the roller 452 and rock the bell crank 450 in a counter clockwise direction drawing the feed pawl 448 idly about the ratchet 447. After the record strip has been fed in the reverse direction to receive the impression from the different groups of type carriers, as previously described, the high portion of the cam plate 453 will pass out of engagement with the roller 452 permitting the spring 4550 to rock the bell crank 450 in a clockwise direction and, through the feed pawl 448 connected with said bell crank, rotate the storage roll 383 and thereby wind up on said roll the difference between the backward and forward feed of said strip.

The hub 454, (Figs. 9, 18 and 19) has suitably secured thereto a plate 457 having pins 458 and 459 projecting from the opposite sides thereof. As the cam plate 453 is rotated through its connection with the gear 315 it will rotate the plate 457 in the direction of the arrow, (Fig. 12). Just after the rearmost group of type carriers have been positioned and the record strip fed reversely from the perforating devices, the pin 458 will engage with one member of a bell crank lever 460 which is pivoted as at 461 to one of the side frames of the record strip holder and rock said bell crank in a clockwise direction (Fig. 12). The other member of said bell crank is connected by a link 462 to a pivoted frame 463 carrying a platen 464. An arm 465 pivoted as at 466 extends under the frame 463 and is held in engagement with the under side thereof by a spring 467 which spring is connected to a similar arm 468 pivoted as at 469 to the record strip frame 381. From this it will appear that as the pin 458 rocks the bell crank 460 in a clockwise direction, the link 462 will rotate the frame in a counter clockwise direction against the tension of the spring 467 connecting the arms 465 and 468. When the pin 458 passes beyond the horizontal member of the bell crank 460, the spring 467 will, through the arm 465, throw the platen 464 carried by the plate 463 into contact with the rear set of type carriers and thereby record upon one side of the perforations previously formed in said strip. The movement of the arm 465 by this spring 467 is limited by a pin 470 projecting from one of the sides of the frame 381. After this impression has been taken upon the record strip, said strip is given an additional movement in a direction forward from the perforating devices so as to bring the edges of the perforations adjacent to the printing line of the foremost group of type carriers after which the pin 459 projecting from the plate 457 will engage with the lever 471 centrally pivoted, as at 461, and rock said lever in a clockwise direction. The rear end of this lever is connected by a link 472 to a frame 473 carrying a platen 474 which frame is pivoted as at 469 to one of the sides of the movable frame. The arm 468, previously described as being pivoted as at 469 and connected by spring 467 to arm 465 engages the under side of the frame 473, from which it will be seen that as the said frame 473 is rocked in a clockwise direction through the rocking of the lever 471, it will tension the spring 467 so that when the pin 459 passes from engagement with the forward edge of the lever 471, the spring will throw the frame carrying the platen 474 into contact with the forward set of type carriers and thereby take an impression therefrom upon the record strip. The return movement of the arm 468 is limited by a pin 475 projecting from one of the side frames 381.

The frame 473 carrying the platen 474 is divided, the divisions of which are connected by a slot and pin connection 476 and 477 respectively. The purpose of this slot and pin connection between the different portions of the impression mechanism is to compensate for any slight misalinement in the various sets of type carriers which go to make up the forward group. To assist in the impression stroke of the divided frame 473, an additional spring 478 is provided, the ends of which are connected to the pivotal point 466 for the frame 463 and to an arm 479 pivotally mounted upon the stud 469. This arm 479 contacts with a pin 480 projecting from one side of the frame 473 of the impression mechanism. As the frame 473 is rocked by the above described mechanism the pin 480 will engage the arm 479 and rock said arm against the tension of its spring 478.

An inking ribbon 4500 (Fig. 9) passes between the different groups of type carriers and the platens 464 and 474 for taking impressions therefrom and is wound upon spools 4501 which are suitably mounted upon an intermediate frame. This ribbon as it is fed from one spool to another passes over guide plates 4502 as clearly shown in Fig. 9 of the drawings. The feed of this ribbon may be automatically reversed in the manner described in a general way in connection with the inking ribbon 351 for the sales strip printer or in any other suitable manner.

The tubes 415 and 455 (Figs. 9, 18 and 19) which are driven for the purpose of feeding the record strip and operating the impression mechanism for recording upon said strip, respectively, are substantially identical in construction and a description of one will suffice for both. These tubes are connected to the left hand frame of the movable frame 381 which supports the record strip by lugs 481 (Fig. 19) which play in annular grooves 482 formed in hubs suitably connected to the previously mentioned tubes. A supporting sleeve 483 projects inwardly from the inner frame of the record strip holder 381 and surrounds a shaft 484, it being understood that there is a similar sleeve within the tube 415 and which surrounds the shaft 398. The purpose of these sleeves is to furnish a supporting bearing for the record strip holder when said holder is withdrawn from the machine for the purpose of replenishing the record strip or for any other purpose. From the above it will be seen that when the record strip frame 381 is withdrawn the tubes 415 and 455 (Figs. 9, 18 and 19) will move therewith and consequently be disconnected from the driving disks 412 and 365 respectively.

*Strip perforating mechanism.*

The record strip herein shown is arranged to be perforated with the amount and classes of transaction, as well as the characters designating the clerk making the sale, and the department in which it is made. This strip after the day's business, or at any desired time, is run through an auditing machine, such as shown in a copending application filed by the present applicant and by the perforations in said strip control the selection and actuation of the various totalizers representing departments and clerks with which the auditing machine is equipped.

The mechanism for perforating this strip will now be described. Connecting the extreme right hand frame, looking from the rear of the machine, (Fig. 10), to an intermediate frame, is a tie bar 485 which supports the inner end of a series of shafts 486, the outer or extreme rearward ends of said shafts being supported by the rear frame of the machine. (Figs. 4 and 6.) Yoke shaped frames 487 (Figs. 10, 11 and 47) are mounted upon the two innermost ones of the aforesaid shafts 486 and these frames are connected by rods 488 to arms 489 secured to and extending rearwardly from the five amount shafts 77. (Figs. 4, 6, 10, 11 and 47). The other arms of the yoke frames 487 are connected by rods 490 to slides 491 (Figs. 8, 10, 11, 12, 13 and 47), which slides are arranged to select the punches 492, by which the record strip is to be perforated. These selecting slides 491 are slidably mounted in the free end of an oscillatory frame 493 (Figs. 2, 8 and 13), which frame is pivoted at its rear end to lugs 494 projecting inwardly from the rear frame of the machine. A shaft 495 is suitably supported in the frame work of the machine above the frame carrying the selecting slides 491. This shaft has projecting forwardly from near each end thereof an arm 496, which arms are connected to the frame carrying the selecting slides by links 497. The arm 496 projecting forwardly from the right hand end of the shaft 495 looking from the front of the machine has extending laterally therefrom a pin 498 which projects into a recess 499 formed in the rear end of a lever 500 pivoted as at 501 to the right hand side frame of the machine. The forward end of this lever 500 has a roller 502 which plays in a cam groove 503 formed in the gear 504, which gear meshes with the aforementioned gear 29 and is suitably mounted upon a stud 504ᵃ projecting from the right hand side frame of the machine. The shape of the cam groove 503 is such that after the slides 491 have been adjusted in the frame, the lever 500 will be rocked in a clockwise direction and through the arms 496 and links 497 lower the frame 493, carrying the slides 491, thereby operating the punches 492 for the purpose of perforating the record strip 384. Also mounted in the frame 493 are selecting slides 505, 506 and 507, respectively, selecting punches for perforating the record strip with characters designating clerks' numbers, departments and the classes of transactions. The slides 505 are connected by rods 508 and 509 (Figs. 10, 11 and 47) to arms 510 and 511, respectively, the former being secured to the extreme left hand shaft 486 looking from the front of the machine, while the latter forms one arm of a yoke shaped frame 512 loosely mounted upon the same shaft 486, the other arm of this yoke shaped member being connected by a rod 513 to an arm 514 secured to and extending rearwardly from the shaft 77 controlled by the tens bank of clerks' number keys 3. The shaft 77 controlled by the units bank of clerk's key 3 has projecting rearwardly therefrom an arm 515 which is connected by a rod 516 to an arm 517 projecting from the left hand one of the shafts 486, to which shaft is also secured the previously described arm 510, the latter being secured to rod 508 to the units selecting device 505. The slide 506 for selecting the punches that perforate a character designating the department is connected by a rod 518 to one arm of a yoke frame 519 loosely mounted upon the second one of the shafts 486. The other arm of this yoke shaped frame 519 is secured by a rod 520 to an arm 521 secured to and extending rearwardly from the shaft 77 controlled by the bank of department keys. The transaction selecting slides 506, of which there are two, are connected by rods 522 to arms 522ª secured to the second one of the shafts 486 looking from the front of the machine. This shaft has secured thereto another arm 523 which is connected by rod 524 to an arm 525 loosely mounted upon the shaft 77 which is controlled by the bank of transaction keys 1. On opposite sides of the arm 525, loosely mounted upon the transaction shaft 77, are arms 526 and 527, which, respectively, are fastened to the transaction shaft 77 and the sleeve 213 surrounding said shaft, which sleeve, as previously described, is controlled by the foreign key 6. The arms 526 and 527 have offsets 528 and 529, respectively which extend over the rearward edge of the arm 525 (Figs. 6, 10 and 47). When the keys of the transaction bank are operated, the shaft 77 controlled thereby will be differentially rotated and through the arm 526 transmit a corresponding extent of movement to the arm 525 and, through this latter arm and connections previously described, differentially adjust the selecting slides 507 so that the strip will be perforated in different fields for the purpose of designating the transaction entered in the machine. By these differently located transaction perforations, the totals of the various sales of the particular class of transactions may be accumulated for each item when the strip is run through the machine as fully described in the aforementioned patent application.

The perforating of the record strip in different fields corresponding to the class of transactions entered is only accomplished when sales involving the different classes of transactions are made by the clerks operating or assigned to the cashier in charge of the machine. When sales involving different classes of transactions are made by foreign clerks, the strip is perforated in one field regardless of the class of transaction and this control of the perforating mechanism is accomplished as follows:

It will be noted by reference to Fig. 1 that the foreign key is located in the same row as the keys bearing the numerals 5 are located, whereas the special transaction keys, credit, cash and C. O. D. are located in the rows of keys bearing the numerals 2, 3 and 4, respectively, from which it will be understood that the driven member operating under control of the foreign keys 6 receives one degree of movement greater than the member controlled by the bank of special keys 1 with the result that the sleeve 213 surrounding the transaction shaft 77 is rotated to a greater extent than the greatest movement imparted to the shaft 77 under the control of the transaction keys. From this it is obvious that if a foreign key is operated in connection with a cash key, that the arm 525 loosely mounted upon the transaction shaft and extending downwardly therefrom will be driven by the offset 529 and the arm 527 carried by the sleeve 213 and through the devices connecting the transaction selecting slides with said arm will cause the said selecting devices to be adjusted to a constant position, regardless of the transaction key 1 operated, and thereby cause the perforation involving all sales made by foreign clerks to be made in the same field on the record strip.

The punches 492, of which there are as many as there are amount keys, clerks' number keys, department keys and transaction keys, including the foreign key, are slidably mounted in a frame 530 which is in turn suitably supported by the movable record strip holding frame 381. Within this frame 530 is mounted an auxiliary frame 531 which is supported by arms 532 projecting forwardly from a rock-shaft 533 carried by the frame 530. Extending rearwardly from this rock shaft 533 is an arm 534 having a camming recess 535 formed in the rear end thereof (Fig. 2). A rock shaft 536 (Figs. 2, 4 and 8) is suitably supported in the frame work of the machine and near its inner end has extending upwardly therefrom an arm 537 which carries a pin 538 at its upper end, that is arranged to engage with the cam slot 535 formed in the arm 534 and rock the arm and shaft to which it is secured in an anti-clockwise direction, thereby lowering the auxiliary frame 531, and permitting the plungers 492 supported by the auxiliary frame to be lowered until said plungers contact with the record strip 384. The shaft 536, near its left hand end, has secured to and extending rearwardly therefrom an arm 539, (Fig. 4) the forward end of which is provided with a roller 540 that plays in a cam groove 541 formed upon one side of the previously described gear 408. The shape of this cam groove is such that the shaft 536 is rocked and causes the pin 538 to engage the arm 534 and lower the auxiliary frame 531 supporting the perforating plungers 492. While these plungers are being lowered into contact with the record strip 384, the selecting slides 491 for said plungers are being adjusted, after which adjustment the frame 493 carrying said slides will be lowered by the cam groove 503 formed in the gear 504 and connections previously described, and through the slides 491 operate the selected plungers 492 to perforate the strip with the desired characters. The plungers 492 have recesses 542 formed in the sides thereof, into which recesses plates 543 carried by the auxiliary frame 531 pass. These plates 543 perform the double function of preventing the turning of the plungers 492 in the auxiliary carriers and also act as a support for said plungers.

The record strip 384 passes over a plate 3840, (Fig. 13) having perforations 3841, into which the plungers 492 pass when they are operated by the slides 491 to perforate said strip. A receptacle 3842 is slidingly supported beneath the perforated plate 3840 by angle plates 3843, which are secured to the sides of said perforated plate, and into which receptacle are deposited the pieces punched out of the record strip. The perforated plate 3840 is supported in the movable frame 381 and the latter is provided with an opening 3844, (Fig. 12) through which the receptacle 3842 may be withdrawn when it is desired to remove the accumulated pieces punched out of the record strip.

*Recapitulation.*

Having now described in detail the various parts of the machine a résumé of the operation of the machine outlining the various functions performed thereby will be given.

The cashier on coming on duty operates one of the barrels 245 (Figs. 4 and 29) by which operation the cashier's symbol is brought to the printing line for printing on both the sales slip and the record strip. This turning of the lock barrel 245 by the cashier also withdraws the locking pawl 248 from engagement with the shoulder 249 of the disk 250 secured to the driving gear 25.

A clerk operating under the cashier having made a sale, delivers the sales slip containing the itemized account of the sale to the cashier who depresses a transaction key 1 designating the class of transaction, keys 2 representing the amount of the sale, and keys 3 and 4 designating the clerk and the department respectively, it being understood that the keys 5 designating the stations are depressed at the beginning of the day's business and remain depressed as long as the machine remains at that particular station. The depression of the transaction key 1 rocks the bell crank lever 34 (Fig. 2) in a counter-clockwise direction withdrawing the hook end of the horizontal arm of said bell crank from engagement with the pin 32 projecting from the pinion 30 connected to the operating crank handle 31 and thus frees said handle. Upon the rotation of the operating crank handle 31 the pinion 30 meshing with the gear 29 will rotate the shaft 28, to which said gear is secured, in the direction of the arrow (Fig. 2). This rotation of the shaft 28 will, through the cam disk 53 (Figs. 2 and 51), cause the oscillation of a bell crank 56, which bell crank is connected to a yoked frame comprising arms 59ª and a cross rod 60 and cause said frame to be given an invariable oscillatory movement at each operation of the machine. Connected to the cross rod 60 of the oscillatory movable frame are the forward ends of the driving links 61, the rearward ends of the latter being connected by arms 62 (Figs. 4, 6, and 7), which arms are pivotally mounted upon the keyframes 39ª.

Each of the driving links are connected to the lower ends of a series of levers 65, which are pivotally mounted upon driven members 66, these levers being provided at their upper ends with recesses 69 in which the pins 8 of the operated keys enter. It will be noticed that the levers of each series have different leverages so that the driven slide 66 may have different extents of movement imparted thereto depending upon the key operated. These driven members 66 are normally latched by offsets 71 of pawls 72, which pawls are arranged to be rocked by the operation of the keys and thereby unlock said driven members. The driven members of slides 66 are connected at their rearward ends to plates 78, which are supported by arms 76 loosely mounted upon and extending upwardly from the foremost and rearmost shafts of a series of shafts 77. The plates 78 connected to the driven members 66 which are controlled by the amount keys 2 have five racks 80 formed thereon with which racks pinions 114 of the registering mechanism engage previous to the movement of said racks from normal position so that the movement of the racks will be conveyed to the pinions 114 and through the gears 112 and 111 be conveyed to the totalizer elements 109 (Figs. 38 and 39). The pinions 114 are only brought into engagement with the racks 80 whenever a cash transaction is entered in the machine, which engagement of the pinions 114 with the racks 80 is brought about in the following manner. Upon the depression of the "cash" key 1 (Figs. 2 and 53) a plate 87 carried by the forward end of a link 88 will be lowered so that a pin 103 projecting from the upper end of an arm 104 will pass into the vertical portion of an L-shaped slot 106 formed in said plate. The arm 104 carries the roller 107, which plays in the cam groove 108 formed in the gear 29 so that upon the operation of the crank handle 31 the arm 104 will be rocked first in a clockwise direction and then reversely back to its normal position. This movement of the arm through its pin 103 will be conveyed to the link 88 which link at its rearward end is connected to an arm 89 secured to a shaft 90. This shaft has another arm 91 secured thereto which is connected by a link 92 (Fig. 4) to an arm 93 projecting upwardly from a shaft 94. The shaft 94 has extending rearwardly therefrom arms 95 having pins 96 projecting therefrom into recesses 97 formed in the forward edges of plates 98 carrying the totalizer elements which plates are pivotally mounted as at 100 to a stationary frame 99. This rocking of the shafts 90 and 94 causes the plates 98 to be rocked about the pivots 100 and thereby carry the pinions 114 into engagement with the teeth 80 of the rack plates 78. If another special key instead of the "cash" key were operated the plate 87 carried by the forward end of the link 88 would not be lowered and consequently said plate and link would not be moved rearwardly upon the operation of the machine, thereby leaving the pinions 114 out of engagement with the racks during such operation of the machine.

The registering mechanism is provided with two totalizers, one for accumulating the total of cash sales made by clerks operating under a particular cashier, and the other totalizer for accumulating cash sales made by clerks in departments in charge of the cashier, but which clerks are not assigned to the cashier. The totalizer for accumulating the total of cash sales made by the clerks assigned to the cashier operating the machine is normally in position to be driven by the actuating racks and when a cash sale is made by a foreign clerk the register mechanism has to be shifted to bring the foreign cash totalizer into position to be engaged by the rack plates 80, which shifting of the registering mechanism is accomplished as follows:

A sale made by a foreign clerk requires the operation of the "foreign" key 6 in connection with the other keys. The operation of this "foreign" key lowers a plate 116 (Figs. 2 and 53) carried by the forward end of a link 117 in a manner similar to the lowering of the plate carried by the link 88 when the "cash" key is operated. This lowering of the plate carried by the link 117 causes a pin 121 projecting from the upper end of an arm 122 to pass into the vertical portion of an inverted L-shaped slot 120 so that when the arm 122 is rocked in an anti- clockwise direction, which occurs at the very beginning of the rotation of the shaft 28, the link 117 will be drawn forwardly, by which movement the shaft 119 will be rocked through means of an arm 118 projecting downwardly from said shaft and connected to the rear end of the link 117. This shaft 119 has extending forwardly therefrom an arm 126 (Fig. 35) which engages with an arm 128 secured to a rock shaft 129 mounted in the stationary frame 99 of the registering mechanism. This shaft 129 (Figs. 36 and 37) has an arm 130 secured to the forward end thereof, to which arm is secured a rod 131, the inner end of which is screw threaded into a plate 132 suitably secured to and movable with the shafts 110 and 113 carrying the totalizing elements 109 and actuating gears 112 respectively. This rocking of the shaft 129 through the aforesaid connection from the "foreign" key causes the registering frame to be shifted so as to bring the foreign cash totalizer in position to be rocked into engagement with the racks controlled by the amount manipulative devices 2. The rocking of the shifting totalizer frame occurs immediately after the foreign cash totalizer is brought in position to engage with the actuating racks 80 by the previously described rocking mechanism operating under the control of the "cash" key. After the amount has been registered upon the totalizer the frame carrying said totalizer is rocked back to its normal position and in case the foreign totalizer is the one that is engaged with the actuating racks, the frame carrying the registering mechanism is also shifted so as to bring the regular cash totalizer into position to engage with the actuating racks upon a subsequent operation. After the selected totalizer has been actuated the racks are returned to their normal position by the rod 60 and intermediate connections.

The plates 78 driven under the control of the keys 1, 2, 3, 4 and 5 have pins 2077 projecting therefrom, which enter into notches 2066 formed upon arms 2055 secured to and extending upwardly from the shafts 77. The shafts 77 connected to the plates 78 driven under the control of the amount keys 2, have arms 2088 secured thereto and extending downwardly therefrom, which arms at their lower ends are connected by links 209 (Figs. 4, 6 and 23) to amount type segments 210. Adjacent to these type segments 210 are type carriers for recording the date and consecutive number and whether or not the transaction is made by foreign or regular clerk and also a symbol designating the cashier operating the machine. The dating type carriers are adjusted by a manipulative device 226 which extends outside of the cabinet (Fig. 8), and the consecutive numbering type carriers are the usual form whereby at each operation of the machine the units type carrier of the consecutive numbering device is advanced one step. The cashier's designating type carrier is adjusted, as previously described, by the operation of one of the lock barrels located on the left hand side of the machine. The foreign type carrier is somewhat similar to the amount type carriers and is connected to a sleeve 213 surrounding the shaft 77 actuated under the control of the transaction keys 1 and which sleeve is controlled by the "foreign" key 6. This foreign type carrier is arranged to be printed upon the sales slip only when the "foreign" key is depressed.

Previous to the operation of the machine the sales slip 292 is inserted upon the table 293 so that the rearward edge thereof will contact with the movable knife 294 (Fig. 23). During the operation of the machine and while the previously mentioned type carriers are being adjusted a roller 309 (Figs. 4 and 23) is brought into contact with a roller 310 and thereby grip the sales slip 292. The bringing together of the rollers 309 and 310 is caused by cam grooves 314 (Fig. 4) formed in the gear 315 in which cam groove plays a roller 313 projecting from a lever 312, which lever is connected by links 316 and 319 to an arm 320 projecting from a rock shaft 321. This rock shaft has extending forwardly therefrom (Fig. 23) an arm 324 which engages with the under side of a rod 323 supported by side arms 322 carrying roller 309. After the rollers 309 and 310 are brought into engagement the lower roller 309 is rotated by means of a rack plate 306 (Figs. 9 and 25) engaging with the pinions 309ª secured to the shaft 308 carrying the roller 309. This rack plate is formed on the forward edge of the horizontal arm of a bell crank lever 304 which arm is connected to the lower end of an arm 301 secured to the shaft 300. This shaft at its outer end (Figs. 4, 20 and 25) has extending rearwardly therefrom an arm 299 having a roller 298, which plays in a cam slot 297 formed in the gear 26. The shape of the cam slot is such that the lower roller 309 is first rotated in a clockwise direction which movement feeds the slip forwardly. At the end of this forward feeding of the slip an impression is taken from the type carriers upon such slip by the platens 326 and 327, after which the roller 309 is rotated in an anti-clockwise direction thereby feeding the slip rearwardly a slight distance and a second impression is taken from said type carriers by the platens. After this second impression the slip is again fed rearwardly and a third impression taken upon the sales slip, this third impression being made upon the original of the said slip, while the first two impressions were made upon the duplicate portion of the said slip. During the taking of the third impression upon the sales slip that portion of the slip containing the first impression is severed by the movable knife 294, which knife previous to the taking of the third impression is slightly elevated so as to permit the passage of that portion of the slip containing the first impression beneath said knife so that when said knife is lowered by the cam disk 335 that portion of the slip containing the first impression will be severed and delivered into either the regular voucher receptacle 355 or the foreign receptacle 356, depending whether the sale is made by a regular clerk or a foreign clerk. The hammers 326 and 327 are operated by the cam groove 349 formed in the gear 267 and the intermediate connections shown in Figs. 4, 23, and 24. After the feeding operation above described the rollers are separated so as to permit the withdrawal of the printed sales slip, the original of said slip being detached from the duplicate and wrapped with the goods while the duplicate is retained by the cashier and at the end of the day's business turned over to the auditing department and held as a check upon the sales clerks.

The same information that is recorded upon the sales slip is also recorded upon the record strip 384 and in addition thereto there is also recorded on said record strip the kind of transaction and the composite number representing the clerk making the sale, the department in which it is made and the station at which the machine is located. The amount type carriers 439 (Fig. 2) for recording upon the record strip are connected in the same manner to the shafts 77 which are actuated under the control of the amount manipulative devices, these amount type carriers 439 being located on the opposite side of the machine from the amount type carriers 210 which record upon the sales slip. The cashier's type carrier 436, consecutive numbering type carriers 437, and the dating type carriers 438 for recording upon the record strip are connected to their respective type carriers which record similar data upon the sales slip by the nested sleeves 253 and the intervening gearing as shown in Figs. 4, 8, and 23. The type carriers 440 for recording upon the record strip the composite number designating the clerk, department, and station are connected to the shafts 77 which are driven under the control of the manipulative devices 3, 4, and 5 respectively. The transaction type carrier 442 is connected to the shaft 77 which is actuated under the control of the transaction keys 1, while the foreign type carrier 441 is connected with the sleeve 213 driven under control of the foreign key 6 all of which connections, except the connections for the dating and consecutive numbering wheels, are shown diagrammatically in Fig. 47.

As shown in Fig. 48 the cashier's symbol, the consecutive number, the date, and the amount are printed along one edge of the allotted portion of the record strip containing the data concerning a single transaction, while the class of transaction, the character designating whether it is foreign or regular, and the composite number are printed along the opposite edge of the allotted portion of the record strip and between these two printed lines the strip is perforated with characters designating the amount of the transaction, the class of transaction, the department in which the transaction is made, and the clerk making the same. The record strip 384 is carried upon rollers 382 and 383 which are mounted upon the movable frame, which may be withdrawn from the machine in order that access may readily be had to said strip. This strip is fed toward the rear of the machine to have the perforated data recorded thereon, and is then fed forwardly to the rearmost group of type carriers to have recorded adjacent to the perforated data the class of transaction, whether it is foreign or regular, and the composite number, after which the strip is fed farther forwardly to have recorded thereon adjacent the perforated data the cashier's symbol, the consecutive number, the date, and the amount of the transaction.

The feeding mechanism for the record strip is shown in Figs. 2, 4, 9, 12, and 21 and comprises a gear 416 which meshes with an idler 417 the latter engaging with a pinion 418 secured to the shaft 419, which shaft carries the lower set of feed rollers 420. The pinion 418 meshes with the pinion 423 which is secured to the shaft 422 carrying the upper set of feed rollers 421, the latter engaging with the aforementioned feed rollers 420. The gear 416 is secured to one end of a tube 415 (Fig. 9) which tube is connected at its other end through intervening connections with a disk 399, which disk is driven by a pawl 402 (Fig. 4) carried by an arm 401, this arm in turn being driven by a cam groove 407 formed in the gear 408. The gear 416 is driven first in an anti-clockwise direction (Fig. 4) by the pawl 402 after which the pawl is disabled and returned partly to its normal position without affecting the gear 416, after which the said pawl becomes connected with the disk 399 and during the rest of the return movement of said pawl returns the disk 399 and gear 416 therewith, which feeding movement will be conveyed to the rollers 420 and 421. As the gear 416 is driven in an anti-clockwise direction (Fig. 4) the feed rollers 420 and 421 will be rotated in a direction to feed the record strip rearwardly (Figs. 3 and 12). The feed of the record strip in this direction is greater than the reverse feed imparted to said strip and to wind the difference between the feed of the strip in opposite directions upon the storage roll 383, the mechanism shown in Fig. 2 is provided.

Connected to the storage roller 383 is a ratchet 447 over which a pawl 448 passes idly as the strip is being fed rearwardly. This pawl is carried by an arm 449 which is connected to bell crank 450 by a link 451 and which bell crank is provided with a roller 452 that bears upon the surface of the cam plate 453. After the strip has been reversely fed, as has been mentioned, the roller 452 passes off the high portion of the cam 453 permitting the spring 4550 to rock the bell crank 450 in a clockwise direction, by which movement the pawl will drive the ratchet wheel and the storage roll in a clockwise direction to take up the difference in the feed of the strip.

Platens 464 and 474 (Figs. 2 and 12) are actuated by pins 458 and 459 projecting from the opposite side of the plate 457, which plate is connected to the tube 455, the latter being given a complete rotation during each operation of the machine. During the rotation of the tube 455 and plate the pins 458 and 459 are arranged to engage with arms 460 and 471 and through intermediate connections rock the platens 464 and 474 against the tension of springs 467 and 478, which springs cause the platens to be thrown in contact with the previously mentioned type carriers as said pins 458 and 459 pass out of engagement with the arms 460 and 471.

As previously mentioned, perforating devices are provided for perforating the record strip with character designating the class of transaction, the amount of each transaction, the clerk making the transaction, and the department in which it is made, which perforations are used for controlling the subsequent acounting operations hereinbefore mentioned. The various shafts 77 controlled by the keys 1, 2, 3, and 4 have arms projecting rearwardly therefrom (Figs. 4, 6, 10, and 47), which arms, through suitable connections, are connected to slides 491 carried by a pivoted frame 493. These slides are arranged to be differentially adjusted for the purpose of selecting the punches 492 that are to be operated for perforating the record strip 384. After the slides are adjusted under the control of the previously mentioned keys 1, 2, 3, and 4 the frame 493 carrying said slides is rocked by the cam groove 503 formed in the gear 504 (Fig. 2).

This rocking of the frame 493 will cause the adjusted slides to operate the selected plungers and as the frame 493 continues in its downward movement the selected plungers will be forced through the record strip thereby perforating said strip with data corresponding to the operated keys. By reference to Fig. 48 it will be seen that the perforations representing the different transactions made by the regular clerks are out of alinement with each other, the purpose of which, as fully described in the aforementioned copending application, is to enable the accumulation of the total of the sales made by the various clerks of each class of transactions. From that part of the strip upon which is recorded the different class of transactions made by foreign clerks it will be seen that the transaction perforations are located in alinement but out of alinement with the different transaction perforations made by the regular clerks. This enables the accumulation of the total of the various classes of transactions made by the foreign clerks.

With a machine as herein described taken in connection with the machine embodied in applicant's aforementioned copending application, it will be seen a complete system is provided for department stores which affords maximum amount of protection and at the same time furnishes considerably more detailed information with the minimum amount of labor. By the use of the cashier's machine the record strips are perforated, by which perforations the accounting operations of the auditing machine are controlled. At the end of the day's business all that is necessary to ascertain the total sales of the different clerks and of the different departments is to gather the record strips from the various machines throughout the store and run said strips through the auditing machine, by which operations the clerks' and departmental totals of each class of transaction are automatically accumulated. If there is any discrepancy between the totals accumulated by the auditing machine and the cash turned in by the various cashiers, this discrepancy can be ascertained by checking over the printed data of the record strip of that particular cashier who is short with the sales index kept by the clerks operating under that particular cashier, it being understood that each clerk's book containing the sales slips is provided with a card commonly known as an index, upon which the total of each sale made is entered.

While the form of mechanism herein shown and described is admirably adapted to fulfil the objects primarily stated, it is to be understood that it is not intended to confine the invention to the one form of embodiment herein shown and described, as it is susceptible of embodiment in various forms, all coming within the scope of the claims which follow.

What is claimed is:—

1. In a machine of the class described, the combination with means for entering the kind and amount of a transaction upon a record strip by perforating said strip; of a series of type carriers for printing the amount of the transaction along one side of the perforations; and additional type carrier for printing the kind of transaction on the side of the perforations opposite the printed amount; and means for first feeding the strip to the perforating means, thence to the type carrier designating the kind of transaction, and finally to the amount type carriers.

2. In a machine of the class described, the combination with mechanism for feeding a record strip; of punches for perforating said strip; a movable frame and devices carried thereby for selecting the punches to be operated; manipulative devices controlling the selecting devices and means for moving the frame for the purpose of operating the punches by the selecting devices.

3. In a machine of the class described, the combination with punches for perforating a record strip; a frame carrying said punches; means for moving the frame thereby bringing the punches into contact with the strip; and means for selecting and operating the desired punches.

4. In a machine of the class described, the combination with punches for perforating a record strip; a frame carrying said punches; means for moving the frame thereby bringing the punches into contact with the strip; devices for selecting the punches to be operated; and manipulative devices controlling the selecting devices.

5. In a machine of the class described, the combination with punches for perforating a record strip; a frame carrying said punches; means for moving the frame thereby bringing the punches into contact with the strip; devices for selecting the punches to be operated; a frame carrying said devices; and means for moving the frame carrying the selecting device for the purpose of operating the desired punches by said selecting devices.

6. In a machine of the class described the combination with punches for perforating a record strip; devices for selecting the punches to be operated; a frame carrying said devices means for moving the frame for the purpose of operating the desired punches by the selecting devices; mechanism for recording data upon the record strip corresponding to the perforated data; and manipulative devices controlling the recording mechanism and the selecting devices for the punches.

7. In a machine of the class described, the combination with punches for perforating a record strip; a frame carrying said punches; means for moving the frame thereby bringing the punches into contact with the strip; means for selecting the desired punches and operating the desired punches after said frame has been moved; mechanism for recording data upon the record strip corresponding to the perforated data; and manipulative devices determining the data that is to be perforated and recorded upon the strip.

8. In a machine of the class described, the combination with punches for perforating a record strip, a frame carrying said punches; means for moving the frame thereby bringing the punches into contact with the strip; devices for selecting the punches to be operated and operating the selected punches after said frame has been moved; mechanism for recording data upon the record strip corresponding to the perforated data; and manipulative devices controlling the selecting devices for the punches and the recording mechanism.

9. In a machine of the class described, the combination with punches for perforating a record strip; a frame carrying said punches; means for moving the frame thereby carrying the punches into contact with the strip; devices for selecting the punches to be operated, a frame carrying said devices; means for moving the frame carrying the selecting devices for the purpose of operating the desired punches by said selecting devices; mechanism for recording data upon the record strip corresponding to the perforated data; and manipulative devices controlling the selecting devices for the punches and the recording mechanism.

10. In a machine of the class described, the combination with means for perforating different classes of transactions and the amount of each transaction upon a record strip; the perforations representing the different classes of transactions being located out of alinement with each other; manipulative devices controlling the operation of the perforating means; and mechanism controlling the transaction perforating means in such a manner that all transaction perforations are entered in alinement on said record strip when desired.

11. In a machine of the class described, the combination with punches for perforating amounts in a record strip; of additional punches for perforating characters representing the different classes of transactions; the different transaction perforations being located out of alinement with each other; and means for perforating the transaction characters in alinement regardless of the class of transaction entered.

12. In a machine of the class described, the combination with punches for perforating characters representing amounts in a record strip; additional punches for perforating characters representing different classes of transaction selecting devices for the various punches; manipulative devices controlling the differential adjustment of the selecting devices; and means for adjusting the selecting device for the transaction punches an invariable distance regardless of the transaction manipulative device operated.

13. In a machine of the class described, the combination with punches for perforating characters representing amounts in a record strip; additional punches for perforating characters representing different classes of transactions in said strip in different columns; selecting devices for the various punches; manipulative devices controlling the differential adjustment of the selecting devices; and means for adjusting the selecting device for the transaction punches an invariable distance whereby the transaction perforations are made in one column.

14. In a machine of the class described, the combination with punches for perforating in a record strip characters representing amounts; of additional punches for perforating in different columns of said strip characters representing different classes of transactions, characters representing transactions of similar character being perforated in the same column; means for perforating all of the transaction characters in the same column; and means for recording on said strip the class and amount of each transaction perforated.

15. In a machine of the class described, the combination with punches for perforating in a record strip characters representing amounts; of additional punches for perforating in different columns of said strip characters representing different classes of transactions, the characters representing transactions of a similar character being perforated in the same column whereby the transaction perforations control the segregation of the amounts of different classes of transactions upon subsequent accounting operations; and means for recording on said record strip the class and amount of each transaction perforated.

16. In a machine of the class described, the combination with punches for perforating a record strip with the characters representing amounts; of additional punches for perforating in different columns of said strip characters representing different classes of transactions; the characters representing transactions of similar character being perforated in the same column for the purpose of segregating the amounts of the different classes of transactions upon subsequent accounting operations; means compelling the perforation of all classes of transactions in the same column; and means for recording on said record strip the class and amount of each transaction perforated.

17. In a machine of the class described, the combination with punches for perforating a record strip with characters representing classes of transactions and the amount of each transaction, the transaction characters of each class being perforated in a different portion of the strip than the other transaction characters for the purpose of segregating the amounts of the different classes of transactions upon subsequent accounting operations; means for recording on said strip the class and amount of each transaction perforated; and manipulative devices controlling the punches and the recording means.

18. In a machine of the class described, the combination with punches for perforating a record strip with characters representing classes of transactions and the amount of each transaction; the transaction characters of each class being perforated in a different portion of the strip than the other transaction characters for the purpose of segregating the amounts of the different classes of transactions upon subsequent accounting operations; means compelling the perforation of all classes of transactions in the same column; mechanism for recording on said strip the class and amount of each transaction perforated; and manipulative devices controlling the punches and the recording means.

19. In a machine of the class described, the combination with printing mechanism; of perforating mechanism; means for feeding a record strip in one direction to the perforating mechanism and then in the opposite direction to the printing mechanism; and means for taking impressions upon the record strip from the printing and perforating mechanisms.

20. In a machine of the class described, the combination with two sets of printing devices; of perforating mechanism, means for feeding a record strip in one direction to the perforating mechanism and then in the reverse direction to the printing devices; and means for taking impressions upon the record strip from the printing devices and the perforating mechanism.

21. In a machine of the class described, the combination with printing mechanism; of perforating mechanism; means for feeding a record strip in one direction to the perforating mechanism and then in the reverse direction to the printing mechanism and means for temporarily disabling the feeding means while the latter is operating to feed the strip to the printing mechanism.

22. In a machine of the class described, the combination with a plurality of independent devices for recording data upon a record strip; of means for feeding the strip in opposite directions to the different devices; the same feeding means being constructed to impart a greater movement to the strip in one direction than in the other; a storage roll for the strip; and means for winding upon said roll the difference between the feed of the strip in opposite directions.

23. In a machine of the class described, the combination with a plurality of receptacles of mechanism for recording in duplicate upon a sales slip; means for severing said slip between the duplicate records and depositing a portion of the slip in one of the receptacles, a lever for bringing another receptacle into position to receive the severed portion of the same slip; a cam and a laterally movable member coöperating therewith for operating said lever.

24. In a machine of the class described, the combination with a plurality of receptacles; of mechanism for recording in duplicate upon a sales slip; means for severing said slip between the duplicate records and depositing a portion of the slip in one of the receptacles; means for imparting a reciprocating movement to another receptacle for the purpose of distributing the portions of sales slips deposited in the first mentioned receptacle, and mechanism controlling the means last mentioned so as to cause said means to bring the last mentioned receptacle into position to receive the severed portion of the sales slip.

25. In a machine of the class described, the combination with mechanism for recording in triplicate upon a sales slip; a supporting table for the slip; severing means for the slip, said means also serving as an abutment for the end of the slip when placed upon the table; and means for first feeding the slip away from the severing means to a position to receive the record upon the lower portion thereof and then feeding said slip toward the severing means, during which feeding operation the remaining records are made thereon, the said severing means detaching the lower portion of the slip contemporaneously with the recording of the last record.

26. In a machine of the class described, the combination with mechanism for recording in triplicate upon a sales slip; a supporting table for the slip; severing means for the slip; said means serving as an abutment for the end of the slip when placed upon the table; normally separated rollers for feeding the slip; and means for bringing the rollers together and feeding the slip away from the severing means to a position to receive the first record thereon and then feeding the slip to the severing means, during which feeding operation the remaining records are made thereon, and means operating the severing means contemporaneously with the recording of the last record.

27. In a machine of the class described, the combination with a plurality of axes and a set of type carriers mounted upon each axis; a platen for each set of type carriers; and an operating mechanism for said platens including an equalizing device, the latter being for the purpose of insuring an equal pressure of said platens against the different sets of type carriers.

28. In a machine of the class described, the combination with a plurality of axes and a set of type carriers mounted upon each axis; a platen for each set of type carriers; and an operating device for said platens including a pivoted member; the latter being for the purpose of insuring an equal pressure of said platens against the different sets of type carriers.

29. In a machine of the class described, the combination with a series of type carriers; of a plurality of platens for taking an impression therefrom; and an operating mechanism for said platens including an equalizing device, the latter being for the purpose of offsetting any unevenness of the type carriers at the printing line.

30. In a machine of the class described, the combination with a registering element; of a differentially movable member controlling the actuation of said element; means normally locking said member; an invariably movable driving member; normally ineffective devices pivotally mounted upon the differentially movable member for the purpose of connecting said member with the driving member; and a series of keys for rendering the connecting devices effective and for operating the locking means for the differentially movable member.

31. In a machine of the class described, the combination with a registering element; of a differentially movable member controlling the actuation of said element; a pivoted locking device for said member; a slide coöperating with the locking device; an invariably movable member; normally ineffective devices pivotally mounted upon the differentially movable member for the purpose of connecting said member with the driving member; and a series of keys for rendering the connecting devices effective and for operating the slide thereby operating the locking device for the differentially movable member.

32. In a machine of the class described, the combination with an operating mechanism; of a plurality of amount and special banks of depressible keys; punching mechanism controlled thereby; a detent for each bank of keys; means actuated by the operating mechanism for actuating the key detents thereby releasing the depressed keys; and a manipulative device for shifting a part of the detent actuating means for the purpose of preventing the release of depressed special keys.

33. In a machine of the class described, the combination with an operating mechanism; of a plurality of special and amount banks of depressible keys; punching mechanism controlled by said keys; a detent for each bank for latching the keys in depressed positions; actuating means for the key detents controlled by the operating mechanism whereby the depressed keys are released; a manipulative device adjustable to two positions in one position of which the said device disables a part of the detent actuating means for the purpose of preventing the release of the depressed special keys and in its other position the whole of the detent actuating means is enabled; and a spring for holding said manipulative device in either of its adjusted positions.

34. In a machine of the class described, the combination with a totalizer, of actuating mechanism therefor, a plurality of punches for perforating record material, differentially movable selecting devices for the punches and movable differentially relative to the punches, manipulative means controlling the extent of actuation of the totalizer and the positioning of the selecting devices accordingly and means for lowering the selecting devices to operate the desired punches.

35. In a machine of the class described, the combination with differentially movable type carriers, of a plurality of punches for perforating record material, differentially movable selecting devices for the punches, manipulative means for controlling the extent of adjustment of the type carriers and the selecting devices and means for lowering the selecting devices to operate the desired punches.

36. In a machine of the class described, the combination with a plurality of punches for perforating record material, of a movable frame, differentially movable devices carried by said frame for selecting the punches to be operated, manipulative devices controlling the movement of the selecting devices, and means for moving the frame for the purpose of operating the punches by the selecting devices.

37. In a machine of the class described, the combination with punches for perforating in a record strip characters representing amounts, of additional punches for perforating in different columns of said strip characters representing different classes of transactions, characters representing transactions of similar character being perforated in the same column, manipulative means for determining in which column the additional punches are to perforate, and means for controlling the additional punches in such a manner that the punches will not perforate in the transaction columns regardless of the transaction manipulative device operated.

38. In a machine of the class described, the combination with a recording mechanism, for recording on record material, of a stationary receptacle for normally receiving the record material, and a movable receptacle adapted to be moved into position to receive the record material as an incident to the recording of certain records by the recording mechanism.

39. In a machine of the class described, the combination with a recording mechanism for recording on record material, of a receptacle in position normally to receive the record material, a second receptacle, normally ineffective means which when rendered effective moves the second receptacle into position to receive the record material, and means for rendering said moving means effective as an incident to the recording of certain records by the recording mechanism.

40. In a machine of the class described, the combination with a recording mechanism for recording on record material, of a stationary receptacle for normally receiving the record material, a receptacle slidably mounted in the stationary receptacle, operating means for moving the slidable receptacle into position to receive the record material as an incident to the recording of certain records by the recording mechanism, and spring means for moving the slidable receptacle out of receiving position.

41. In a machine of the class described, the combination with two totalizers, of actuating mechanism for the same, one of the totalizers being normally in operative relation therewith, normally ineffective means for establishing operative relation between the other totalizer and the actuating mechanism, a printing mechanism for printing on record material, a stationary receptacle for receiving the record material when the totalizer normally in operative relation is operated, a movable receptacle, normally ineffective means for moving the latter into position to receive the record material when the totalizer normally out of operative relation is actuated, and means for rendering effective both of said normally ineffective means.

42. In a machine of the class described, the combination with a plurality of axes; of a set of type carriers mounted upon each axis; a platen for each set of type carriers; and a positive operating mechanism for said platens including an equalizing device, the latter being for the purpose of positively insuring an equal pressure of said platens against the different sets of type carriers.

43. In a machine of the class described, the combination with a series of type carriers; of a plurality of platens for taking an impression therefrom; and a positive operating mechanism for said platens including an equalizing device, the latter being for the purpose of positively offsetting any unevenness of the type carriers at the printing line.

44. In a machine of the class described, the combination with a main operating mechanism; of a plurality of rows of punches for perforating record material, devices one for each row of punches moved differentially relative to the punches, means for operating the selecting devices after they have been differentially positioned, and manipulative means controlling the extent of movement of the selecting devices.

In testimony whereof I affix my signature in the presence of two witnesses.

FRED M. CARROLL.

Witnesses:
R. C. GLASS,
CARL BEUST.